(12) United States Patent
Dudley

(10) Patent No.: US 9,912,978 B2
(45) Date of Patent: Mar. 6, 2018

(54) SYSTEMS, METHODS, AND COMPUTER-READABLE MEDIA FOR TRANSITIONING MEDIA PLAYBACK BETWEEN MULTIPLE ELECTRONIC DEVICES

(71) Applicant: Apple Inc., Cupertino, CA (US)

(72) Inventor: James Joseph Dudley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 13/953,643

(22) Filed: Jul. 29, 2013

(65) Prior Publication Data

US 2015/0032812 A1    Jan. 29, 2015

(51) Int. Cl.
*G06F 15/16* (2006.01)
*H04N 21/422* (2011.01)
*H04N 21/4223* (2011.01)
*H04N 21/432* (2011.01)
(Continued)

(52) U.S. Cl.
CPC ... *H04N 21/42224* (2013.01); *H04N 21/4223* (2013.01); *H04N 21/42203* (2013.01); *H04N 21/42219* (2013.01); *H04N 21/4325* (2013.01); *H04N 21/43637* (2013.01); *H04N 21/4431* (2013.01)

(58) Field of Classification Search
CPC ............ G06F 9/4856; H04N 21/42224; H04N 21/4431; H04N 21/4325; H04N 21/43637; H04N 21/42203; H04N 21/4223; H04N 21/42219
See application file for complete search history.

(56) References Cited

U.S. PATENT DOCUMENTS

| 5,479,476 A | * | 12/1995 | Finke-Anlauff | ...... H04M 19/04 455/418 |
| 5,808,662 A | * | 9/1998 | Kinney | ................ G11B 27/002 348/14.1 |
| 7,742,832 B1 | | 6/2010 | Feldman et al. | |

(Continued)

FOREIGN PATENT DOCUMENTS

| WO | 2009/063413 | 6/2010 |
| WO | WO 2013097941 A1 * | 7/2013 |

*Primary Examiner* — Philip Chea
*Assistant Examiner* — Wing Ma
(74) *Attorney, Agent, or Firm* — Blank Rome LLP

(57) ABSTRACT

Systems, methods, and computer-readable media for transitioning media playback between multiple electronic devices are provided. A first electronic subsystem may be configured to playback first media with a first playback value of a first playback characteristic, determine a first relationship value of a first relationship characteristic between the first electronic subsystem and the second electronic subsystem, and transmit a first control instruction that is based on the determined first relationship value and the first playback value. The second electronic subsystem may be configured to receive the transmitted first control instruction and playback second media with a second playback value of the first playback characteristic, where the second playback value may be based on the received first control instruction. This may enable a consistent experience for a user proximate to the first subsystem as the playback of media is transitioned from the first subsystem to the second subsystem.

30 Claims, 13 Drawing Sheets

(51) Int. Cl.
*H04N 21/4363* (2011.01)
*H04N 21/443* (2011.01)

(56) References Cited

U.S. PATENT DOCUMENTS

| | | | |
|---|---|---|---|
| 7,895,378 B2 | 2/2011 | Holden et al. | |
| 8,028,320 B1* | 9/2011 | Shusterman | 725/109 |
| 8,030,914 B2 | 10/2011 | Alameh et al. | |
| 8,044,928 B2 | 10/2011 | Asbury et al. | |
| 8,060,389 B2 | 11/2011 | Johnson | |
| 8,068,925 B2 | 11/2011 | McKillop et al. | |
| 8,264,340 B2 | 9/2012 | Mazzolini et al. | |
| 8,271,037 B2 | 9/2012 | Harmke | |
| 8,880,648 B1* | 11/2014 | Arora et al. | 709/218 |
| 2002/0068537 A1 | 6/2002 | Shim et al. | |
| 2002/0086663 A1* | 7/2002 | Tang | G06Q 30/02 455/414.1 |
| 2002/0100063 A1* | 7/2002 | Herigstad | H04N 7/163 725/141 |
| 2003/0014486 A1 | 1/2003 | May | |
| 2003/0073411 A1* | 4/2003 | Meade, II | G06F 1/1613 455/70 |
| 2004/0176031 A1* | 9/2004 | Haller | H04M 1/7253 455/41.2 |
| 2005/0286546 A1* | 12/2005 | Bassoli | G11B 27/002 370/432 |
| 2006/0120518 A1* | 6/2006 | Baudino | H04L 67/1095 379/91.02 |
| 2006/0123080 A1* | 6/2006 | Baudino | H04L 67/306 709/204 |
| 2006/0123081 A1* | 6/2006 | Baudino | G06Q 30/02 709/204 |
| 2006/0153198 A1* | 7/2006 | Chadha | H04L 67/14 370/395.2 |
| 2006/0233519 A1* | 10/2006 | Narita | H04L 12/2803 386/271 |
| 2007/0250761 A1* | 10/2007 | Bradley | H04L 29/06027 715/203 |
| 2008/0081558 A1* | 4/2008 | Dunko | G11B 27/002 455/41.1 |
| 2008/0133715 A1* | 6/2008 | Yoneda et al. | 709/219 |
| 2008/0162665 A1* | 7/2008 | Kali | 709/217 |
| 2008/0177822 A1* | 7/2008 | Yoneda | H04L 12/282 709/202 |
| 2009/0081948 A1 | 3/2009 | Banks et al. | |
| 2009/0138606 A1* | 5/2009 | Moran | H04L 67/14 709/227 |
| 2009/0143056 A1* | 6/2009 | Tang | H04M 1/7253 455/418 |
| 2009/0172555 A1* | 7/2009 | Braun | G06F 9/4443 715/734 |
| 2009/0305742 A1 | 12/2009 | Caballero et al. | |
| 2010/0100917 A1* | 4/2010 | Chiao | H04N 21/242 725/110 |
| 2010/0260360 A1 | 10/2010 | Strub | |
| 2011/0131332 A1* | 6/2011 | Bouazizi | H04L 65/1093 709/227 |
| 2011/0177802 A1* | 7/2011 | Gupta | H04L 12/66 455/418 |
| 2011/0214056 A1 | 9/2011 | Fleizach et al. | |
| 2012/0002111 A1* | 1/2012 | Sandoval | H04N 5/06 348/521 |
| 2012/0079123 A1* | 3/2012 | Brown | H04M 1/7253 709/228 |
| 2012/0082424 A1* | 4/2012 | Hubner et al. | 386/219 |
| 2012/0082427 A1* | 4/2012 | Andres Del Valle | H04L 65/605 386/230 |
| 2012/0158972 A1* | 6/2012 | Gammill | H04L 67/141 709/227 |
| 2012/0172085 A1 | 7/2012 | Vuppu et al. | |
| 2012/0210343 A1* | 8/2012 | McCoy et al. | 725/25 |
| 2012/0220223 A1* | 8/2012 | Rose | H04M 1/7253 455/41.1 |
| 2012/0303705 A1* | 11/2012 | Park et al. | 709/204 |
| 2013/0007819 A1* | 1/2013 | Choi | H04N 7/147 725/88 |
| 2013/0019321 A1* | 1/2013 | Ferren | G02B 13/0065 726/29 |
| 2013/0051755 A1* | 2/2013 | Brown et al. | 386/241 |
| 2013/0144940 A1* | 6/2013 | Law | H04L 65/4069 709/203 |
| 2013/0318249 A1* | 11/2013 | McDonough | H04L 67/02 709/228 |
| 2013/0331970 A1* | 12/2013 | Beckhardt | G06F 3/165 700/94 |
| 2014/0004839 A1* | 1/2014 | Block | H04M 3/54 455/417 |
| 2014/0086549 A1* | 3/2014 | Davidson et al. | 386/201 |
| 2014/0279889 A1* | 9/2014 | Luna | G06F 17/30575 707/626 |
| 2014/0323036 A1* | 10/2014 | Daley | H04H 20/08 455/3.06 |
| 2014/0359687 A1* | 12/2014 | Froeller et al. | 725/110 |
| 2014/0370817 A1* | 12/2014 | Luna | 455/41.3 |

* cited by examiner

SYSTEMS, METHODS, AND COMPUTER-READABLE MEDIA FOR TRANSITIONING MEDIA PLAYBACK BETWEEN MULTIPLE ELECTRONIC DEVICES

TECHNICAL FIELD

This can relate to systems, methods, and computer-readable media for transitioning media playback between multiple electronic devices and, more particularly, to systems, methods, and computer-readable media for providing a consistent user experience when transitioning media playback between multiple electronic devices.

BACKGROUND

Some systems are configured to terminate the playback of media on a first electronic device and restart the playback of media on a second electronic device. However, the value of one or more playback characteristics of the played back media (e.g., the volume level of played back audio media) often dramatically changes when transitioning from the first electronic device to the second electronic device as each device is often configured to playback media using that device's own internal playback settings.

SUMMARY

Systems, methods, and computer-readable media for transitioning media playback between multiple electronic devices are provided.

In some embodiments, there is provided a system that may include a first electronic subsystem and a second electronic subsystem. The first electronic subsystem may be configured to playback first media with a first playback value of a first playback characteristic, determine a first relationship value of a first relationship characteristic between the first electronic subsystem and the second electronic subsystem, and transmit a first control instruction that is based on the determined first relationship value and the first playback value. The second electronic subsystem may be configured to receive the transmitted first control instruction and playback second media with a second playback value of the first playback characteristic. The second playback value may be based on the received first control instruction.

In other embodiments, there is provided a method that may include playing back first media with a first playback value of a first playback characteristic using a first electronic subsystem of a system, determining a first relationship value of a first relationship characteristic between the first electronic subsystem and a second electronic subsystem of the system, and playing back second media with a second playback value of the first playback characteristic using the second electronic subsystem. The second playback value may be based on the first playback value and the first relationship value.

In yet other embodiments, there is provided a system that may include a first electronic subsystem and a second electronic subsystem. The first electronic subsystem may include a first playback component, a first sensor, and a first communications component. The second electronic subsystem may include a second playback component and a second communications component. The first playback component may be configured to playback first media, the first electronic subsystem may be configured to determine a first playback value of a first playback characteristic of the first media when the first media is being played back by the first playback component, the second playback component may be configured to playback second media with an initial playback value of the first playback characteristic, the first sensor may be configured to determine a second playback value of the first playback characteristic of the second media when the second media is being played back by the second playback component with the initial playback value of the first playback characteristic, the first communications component may be configured to transmit a first adjustment instruction that may be based on a comparison of the determined first playback value and the determined second playback value, the second communications component may be configured to receive the transmitted first adjustment instruction, the second playback component may be configured to adjust the playback value of the first playback characteristic of the second media from the initial playback value of the first playback characteristic to an adjusted playback value of the first playback characteristic when the second media is being played back by the second playback component, and the adjusted playback value of the first playback characteristic may be based on the received first adjustment instruction.

In still yet other embodiments, there is provided a method that may include playing back first media using a first playback component of a first electronic subsystem, determining a first playback value of a first playback characteristic of the played back first media, playing back second media with an initial playback value of the first playback characteristic using a second playback component of a second electronic subsystem, and, during the playing back of the second media with the initial playback value, determining a second playback value of the first playback characteristic of the played back second media using a first sensor of the first electronic subsystem. The method may also include comparing the determined first playback value and the determined second playback value and, after the comparing, adjusting the playback value of the first playback characteristic of the second media from the initial playback value of the first playback characteristic to an adjusted playback value of the first playback characteristic using the second playback component when the second media is being played back by the second electronic subsystem. The adjusted playback value of the first playback characteristic may be based on the comparing.

In still yet other embodiments, there is provided a first electronic subsystem that may include a sensor component, a playback component, a communications component, and a processor coupled to the sensor component, the playback component, and the communications component. The playback component may be configured to playback first media. The sensor component may be configured to determine a first value of a first playback characteristic of the first media when the first media is played back by the playback component. The sensor component may be further configured to determine a second value of the first playback characteristic of second media when the second media is played back by a second electronic subsystem. The processor may be configured to generate a first adjustment instruction based on a comparison of the determined first value and the determined second value. The communications component may be configured to communicate the first adjustment instruction to the second electronic subsystem.

In still yet other embodiments, there is provided a first electronic subsystem that may include a playback component, a first communications component, and a processor coupled to the playback component and the communications component. The playback component may be configured to playback first media according to a first value of a first playback characteristic. The communications component may be configured to receive a first adjustment instruction from a second electronic subsystem during the playback of the first media according to the first value of the first playback characteristic. The processor may be configured to adjust the value of the first playback characteristic from the first value to a second value based on the received first adjustment instruction. The playback component may be further configured to playback the first media according to the second value based on the adjustment.

In still yet other embodiments, there is provided a method that may include determining a first value of a first playback characteristic of first media for playback with a first media playback component of a first electronic subsystem, playing back second media with an initial value of the first playback characteristic using a second media playback component of a second electronic subsystem when the second media playback component is positioned at a first location, determining a second value of the first playback characteristic of the played back second media using a first sensor of the first electronic subsystem when the first sensor is positioned at a second location, comparing the determined first value and the determined second value, and adjusting the value of the first playback characteristic of the second media from the initial value to an adjusted value using the second electronic subsystem. The adjusting the value may be based on the comparison.

In still yet other embodiments, there is provided a method for use in a system that includes a first electronic subsystem, a second electronic subsystem, and a third electronic subsystem. The method may include playing back first media with a first playback value of a first playback characteristic using the second electronic subsystem and, during the playing back of the first media, detecting an occurrence of a subsystem transition event using the first electronic subsystem. The method may also include, in response to the detection of the occurrence, playing back second media with a second playback value of the first playback characteristic using the third electronic subsystem.

In still yet other embodiments, there is provided a non-transitory computer-readable medium that includes computer-readable instructions recorded thereon for playing back first media on a first electronic subsystem, determining a first value of a first playback characteristic of the first media when the first media is played back on the first electronic subsystem, determining a second value of the first playback characteristic of second media when the second media is played back on a second electronic subsystem, comparing the determined first value and the determined second value, generating a first adjustment instruction based on the comparison, and communicating the first adjustment instruction from the first electronic subsystem to the second electronic subsystem.

In still yet other embodiments, there is provided a non-transitory computer-readable medium that includes computer-readable instructions recorded thereon for playing back first media on a first electronic subsystem according to a first value of a first playback characteristic, receiving with the first electronic subsystem a first adjustment instruction from a second electronic subsystem during the playback of the first media according to the first value of the first playback characteristic, adjusting the value of the first playback characteristic from the first value to a second value based on the received first adjustment instruction, and playing back the first media on the first electronic subsystem according to the second value based on the adjustment.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters refer to like parts throughout, and in which.

DETAILED DESCRIPTION

Systems, methods, and computer-readable media for transitioning media playback between multiple electronic devices are provided and described with reference to FIGS. 1-9.

Figure 1:
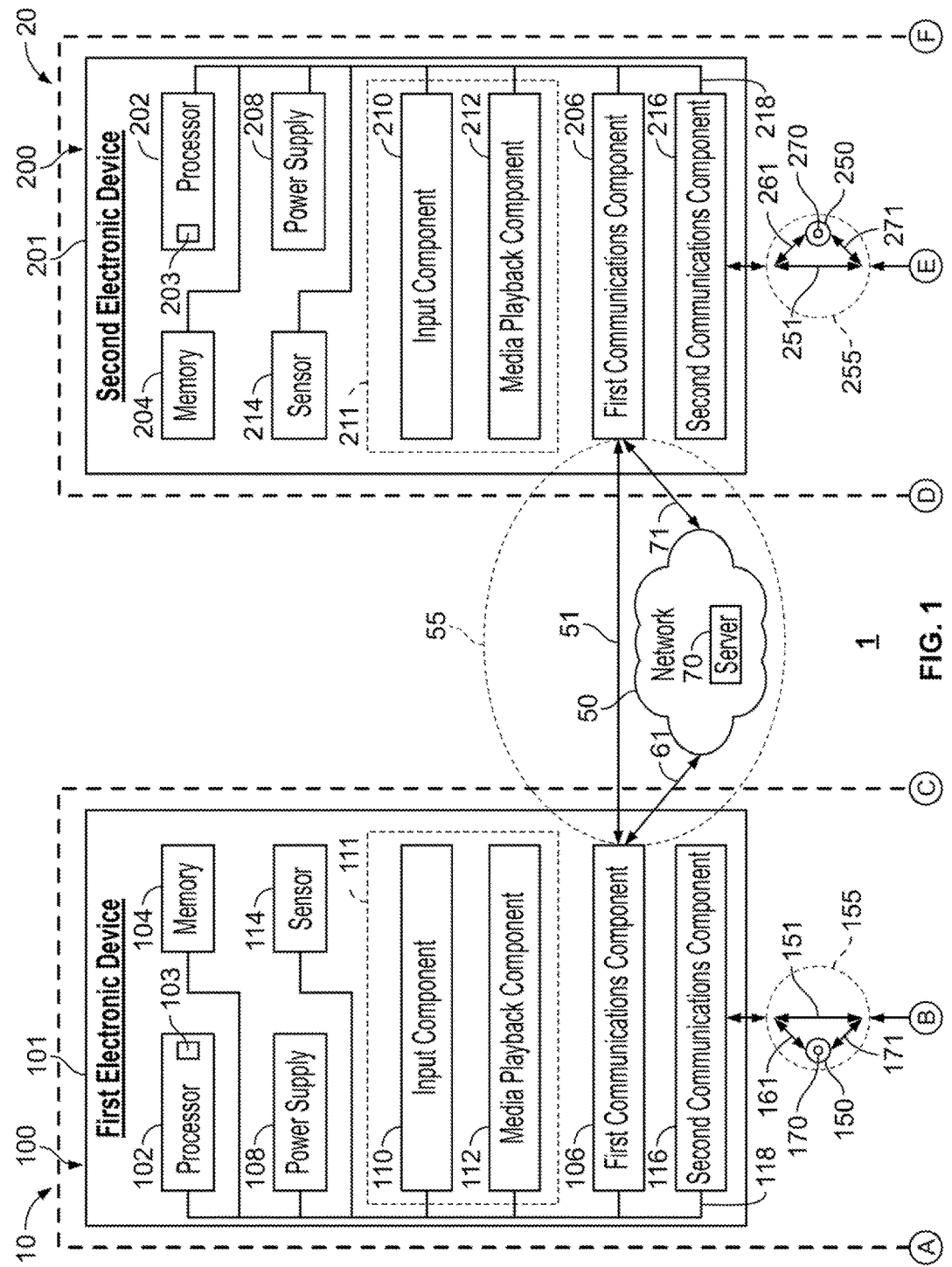
FIG. 1 is a schematic view of an illustrative system for transitioning media playback between multiple electronic devices, in accordance with some embodiments.
Figure 1:
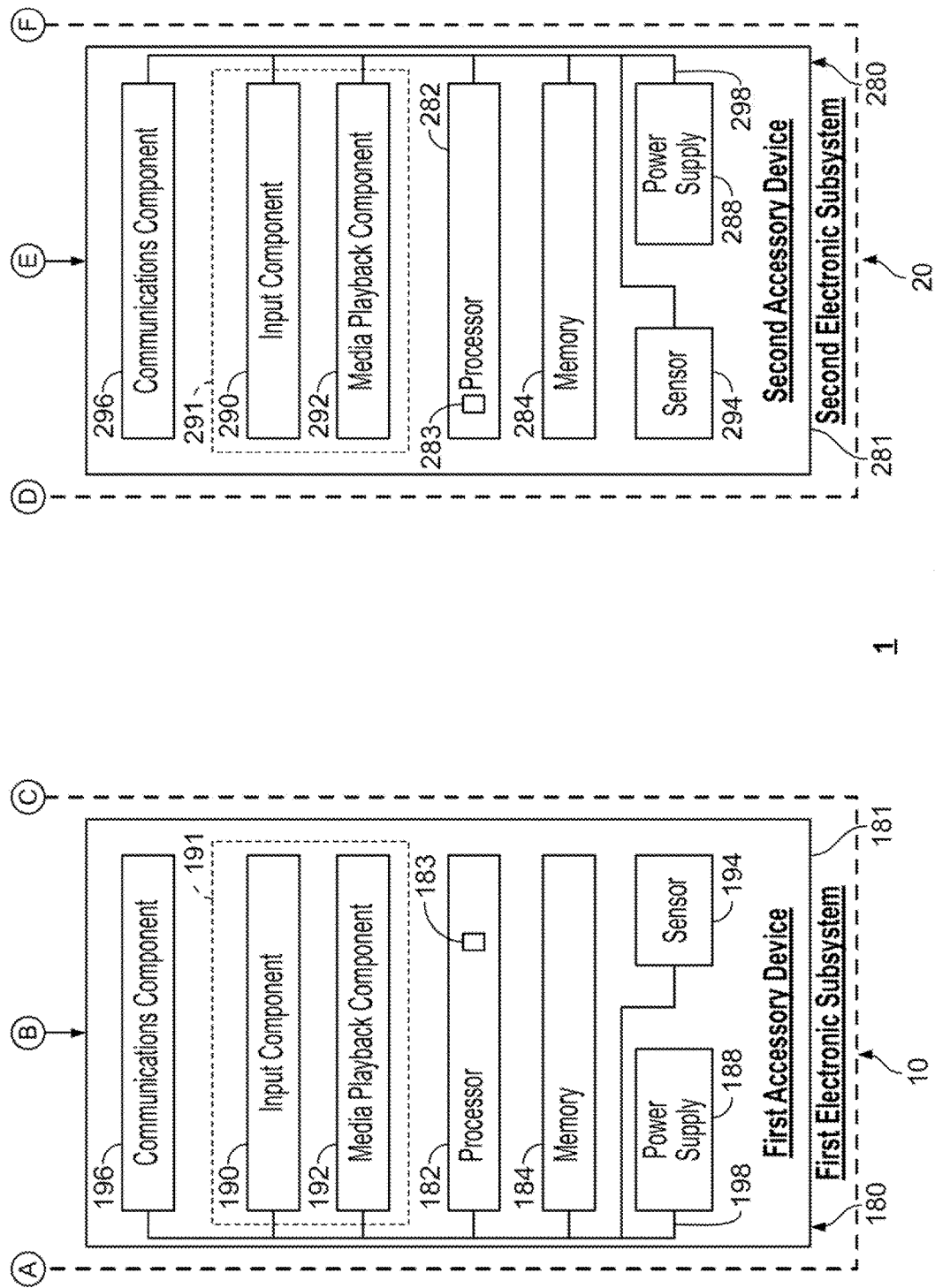

FIG. 1 is a schematic view of an illustrative system 1 for transitioning media playback between multiple electronic devices in accordance with some embodiments of the invention. System 1 may include a first electronic subsystem 10 and a second electronic subsystem 20. System 1 may also include a communications set-up 55, through which first electronic subsystem 10 and second electronic subsystem 20 may communicate with one another. Such communication may facilitate a transition from using first electronic subsystem 10 to using second electronic subsystem 20 for playing back media to a user of system 1.

Each one of first electronic subsystem 10 and second electronic subsystem 20 may be configured to playback media that may be accessible from one or more media sources. Moreover, first electronic subsystem 10 may be configured to detect a first value of a playback characteristic of media played back by first electronic subsystem 10 at a first moment in time before a transition and a second value of the playback characteristic of media played back by second electronic subsystem 20 at a second moment in time after the transition, while second electronic subsystem 20 may be configured to adjust the value of the playback characteristic of the media played back by second electronic subsystem 20 at a third moment in time after the transition based on a comparison of the detected first and second values. This adjustment may allow for the media played back by second electronic subsystem 20 at the third moment in time to have at least one playback characteristic value in common with the media played back by first electronic subsystem 10 at the first moment in time. For example, this adjustment may allow for the volume level of the media played back by second electronic subsystem 20 as detected by first electronic subsystem 10 at the third moment in time to be the same as the volume level of the media played back by first electronic subsystem 10 as detected by first electronic subsystem 10 at the first moment in time, thereby providing a consistent experience for a user of system 1 (e.g., a user proximate to first electronic subsystem 10) as the playback of media is transitioned from first electronic subsystem 10 to second electronic subsystem 20.

For example, in some embodiments, as shown in FIG. 1, first electronic subsystem 10 may include a first electronic device 100 and second electronic subsystem 20 may include a second electronic device 200. Either one or both of first electronic device 100 and second electronic device 200 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, or any combination thereof. In some embodiments, either one or both of first electronic device 100 and second electronic device 200 may perform a single function (e.g., a device dedicated to playing back media) and, in other embodiments, either one or both of first electronic device 100 and second electronic device 200 may perform multiple functions (e.g., a device that plays back media, and receives and transmits telephone calls).

Either one or both of first electronic device 100 and second electronic device 200 may be any portable, mobile, hand-held, or miniature electronic device that may be configured to playback media wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, either one or both of first electronic device 100 and second electronic device 200 may not be portable at all, but may instead be generally stationary.

As shown in FIG. 1, for example, first electronic device 100 of first electronic subsystem 10 may include a processor 102, memory 104, first communications component 106, power supply 108, input component 110, media playback component 112, sensor 114, and second communications component 116. First electronic device 100 may also include a bus 118 that may provide one or more wired or wireless communications links or paths for transferring data and/or power to, from, or between various other components of first electronic device 100. In some embodiments, one or more components of first electronic device 100 may be combined or omitted. Moreover, first electronic device 100 may include other components not combined or included in FIG. 1 and/or several instances of the components shown in FIG. 1. For the sake of simplicity, only one of each of the components of first electronic device 100 is shown in FIG. 1.

Memory 104 of first electronic device 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on first electronic device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable first electronic device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

First communications component 106 of first electronic device 100 may be provided to allow first electronic device 100 to communicate with one or more other electronic subsystems, electronic devices, or servers (e.g., second electronic device 200 and/or a server 70 of a communications network 50 of communications set-up 55) using any suitable wired or wireless communications protocol. For example, first communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. First communications component 106 may be configured to enable first electronic device 100 to be electrically coupled to one or more other electronic subsystems, electronic devices, or servers (e.g., second electronic device 200 and/or server 70 of communications network 50 and/or a host computer or an accessory device) and to communicate with that other entity, either wirelessly or via a wired connection.

Second communications component 116 of first electronic device 100 may be provided to allow first electronic device 100 to communicate with one or more other devices of first electronic subsystem 10 (e.g., a first accessory device 180) using any suitable wired or wireless communications protocol. For example, second communications component 116 may support any one or more of the protocols described above with respect to first communications component 106. Second communications component 116 may be configured to enable first electronic device 100 to be electrically coupled to one or more other devices of first electronic subsystem 10 and to communicate with that other device, either wirelessly or via a wired connection.

Power supply 108 of first electronic device 100 may provide power to one or more of the components of first electronic device 100. In some embodiments, power supply 108 can be coupled to a power grid (e.g., when first electronic device 100 is not a portable device, such as a desktop computer). In some embodiments, power supply 108 can include one or more batteries for providing power (e.g., when first electronic device 100 is a portable device, such as a cellular telephone). As another example, power supply 108 can be configured to generate power from a natural source (e.g., solar power using solar cells).

One or more input components 110 of first electronic device 100 may be provided to permit a user to interact or interface with first electronic device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, motion sensor, proximity sensor, light detector, and combinations thereof. Each input component 110 can be configured to provide one or more dedicated control functions for making selections or issuing commands associated with operating first electronic device 100.

First electronic device 100 may also include one or more output components that may present information (e.g., visual, audible, and/or tactile information) to a user of first electronic device 100. An output component of first electronic device 100 may take various forms, including, but not limited to, audio speakers, headphones, audio lines-out, visual displays, video lines-out, antennas, infrared ports, rumblers, vibrators, or combinations thereof.

For example, as shown in FIG. 1, first electronic device 100 may include media playback component 112 as an output component. Media playback component 112 may include any suitable type of output interface for presenting aural and/or visual data to a user. In some embodiments, media playback component 112 may include any suitable type of visual display, including, but not limited to, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, media playback component 112 can include a movable display or a projecting system for providing a display of content on a surface remote from first electronic device 100, such as, for example, a video projector, a head-up display, or a three-dimensional (e.g., holographic) display. As another example, media playback component 112 may include a digital or mechanical viewfinder, such as a viewfinder of the type found in compact digital cameras, reflex cameras, or any other suitable still or video camera. Alternatively or additionally, in some embodiments, media playback component 112 may include any suitable type of aural output, including, but not limited to, a loudspeaker, a headphone, or combination thereof. In some embodiments, media playback component 112 may include driver circuitry, circuitry for driving output drivers, or both. Media playback component 112 can be operative to output the playback media content that may be under the direction of processor 102 to an environment external to first electronic device 100 for receipt by a user.

It should be noted that one or more input components 110 and one or more output components 112 may sometimes be referred to collectively herein as an input/output ("I/O") component or I/O interface (e.g., input component 110 and display 112 as I/O component or I/O interface 111). For example, input component 110 and media playback component 112 may sometimes be a single I/O component 111, such as a touch screen, that may receive input information through a user's touch of a display screen and that may also provide visual information to a user via that same display screen.

Sensor 114 of first electronic device 100 may include any suitable sensor that may be operative to determine the value of one or more characteristics of played back media that may be detected in the environment of first electronic device 100. For example, sensor 114 may be a microphone or any other suitable audio sensor that may be configured to detect the value of one or more characteristics of played back audio media, such as the volume level, the spectral content, and the like. Additionally or alternatively, sensor 114 may be a light sensor or any other suitable video sensor that may be configured to detect the value of one or more characteristics of played back video media, such as the brightness level, white point, the spectral content, and the like.

Processor 102 of first electronic device 100 may include any processing circuitry that may be operative to control the operations and performance of one or more components of first electronic device 100. For example, processor 102 may receive input signals from input component 110 and/or drive output signals through media playback component 112. In some embodiments, as shown in FIG. 1, processor 102 may be used to run one or more applications, such as an application 103. Application 103 may include, but is not limited to, one or more operating system applications, firmware applications, media playback applications, media editing applications, or any other suitable applications. For example, processor 102 may load application 103 as a user interface program to determine how instructions or data received via an input component 110 or other component of device 100 may manipulate the way in which information is stored and/or provided to the user via an output component 112 (e.g., media playback component 112). Application 103 may be accessed by processor 102 from any suitable source, such as from memory 104 (e.g., via bus 118), from second electronic subsystem 20 (e.g., via communications set-up 55 and first communications component 106) or from server 70 of communications network 50 (e.g., via first communications component 106), or from any other suitable source.

First electronic device 100 may also be provided with a housing 101 that may at least partially enclose one or more of the components of first electronic device 100 for protection from debris and other degrading forces external to first electronic device 100. In some embodiments, one or more of the components of first electronic device 100 may be provided within its own housing (e.g., input component 110 may be an independent keyboard or mouse within its own housing that may wirelessly or through a wire communicate with processor 102, which may be provided within its own housing).

As also shown in FIG. 1, for example, second electronic device 200 of second electronic subsystem 20 may include a processor 202, memory 204, first communications component 206, power supply 208, input component 210, media playback component 212, sensor 214, and second communications component 216. In some embodiments, input component 210 and media playback component 212 of second electronic device 200 may sometimes be a single I/O interface or I/O component 211. Second electronic device 200 may also include a housing 201 as well as a bus 218 that may provide one or more wired or wireless communications links or paths for transferring data and/or power to, from, or between various other components of second electronic device 200. As also shown in FIG. 1, processor 202 may be used to run an application 203 that may include, but is not limited to, one or more operating system applications, firmware applications, media playback applications, media editing applications, or any other suitable applications. Application 203 may be accessed by processor 202 from any suitable source, such as from memory 204 (e.g., via bus 218), from first electronic subsystem 10 or from server 70 of communications network 50 (e.g., via communications set-up 55 and first communications component 206), or from any other suitable source. In some embodiments, one or more components of second electronic device 200 may be combined or omitted. Moreover, second electronic device 200 may include other components not combined or included in FIG. 1 and/or several instances of the components shown in FIG. 1. For the sake of simplicity, only one of each of the components of second electronic device 200 is shown in FIG. 1.

Each one of housing 201, processor 202, application 203, memory 204, first communications component 206, power supply 208, input component 210, I/O component 211, media playback component 212, sensor 214, second communications component 216, and bus 218 of second electronic device 200 may be the same as or substantially similar to a respective one of housing 101, processor 102, application 103, memory 104, first communications component 106, power supply 108, input component 110, I/O component 111, media playback component 112, sensor 114, second communications component 116, and bus 118 of first electronic device 100 and, therefore, may not be independently described in greater detail. While, in some embodiments, first electronic device 100 and second electronic device 200 may be the same or substantially similar devices, in other embodiments, first electronic device 100 may have one or more different and/or additional components that second electronic device 200 does not have, and vice versa.

In some embodiments, first communications component 106 of first electronic device 100 and first communications component 206 of second electronic device 200 may communicate with one another directly, such as, for example, via a shared communications link 51 of communications set-up 55. Shared communications link 51 may include one or more wired and/or wireless communications links or paths for transferring any suitable data and/or power between first electronic device 100 and second electronic device 200. Alternatively or additionally, in some embodiments, system 1 may include communications network 50, with which one or both of first electronic device 100 and second electronic device 200 may communicate. For example, a first electronic device communications link 61 of communications set-up 55 may include one or more wired and/or wireless communications links or paths for transferring any suitable data and/or power between first communications component 106 of first electronic device 100 and communications network 50. Similarly, a second electronic device communications link 71 of communications set-up 55 may include one or more wired and/or wireless communications links or paths for transferring any suitable data and/or power between first communications component 206 of second electronic device 200 and communications network 50. In some embodiments, as an alternative or in addition to communicating with one another directly via shared communications link 51, first electronic device 100 and second electronic device 200 may communicate with one another via communications network 50 and communications links 61 and 71.

Any suitable circuitry, device, system, or combination of these (e.g., a wireless communications infrastructure including one or more communications towers, telecommunications servers, or the like) operative to create a communications network may be used to provide communications network 50. Communications network 50 may be capable of providing communications using any suitable wired or wireless communications protocol. For example, communications network 50 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Moreover, in some embodiments, communications network 50 may include one or more servers 70 or any other suitable components (e.g., any suitable cloud computing components) that may communicate with first electronic device 100 and/or second electronic device 200 via communications network 50. In some embodiments, server 70 may be a source of one or more files, applications, media, or any other suitable resource (e.g., application 103 and/or application 203) that may be provided to and utilized by first electronic device 100 and/or second electronic device 200. For example, server 70 may be configured as a media store that may provide first electronic device 100 and/or second electronic device 200 with various resources or media items including, but not limited to, audio media files, video media files, text files, graphical object files, various other multimedia files, various applications (e.g., a media playback balancing application), various types of metadata or playback control data (e.g., data that may at least partially dictate the volume, brightness, white point, or value of any other playback characteristic of media to be played back by subsystem 10 and/or subsystem 20), and the like. An example of such a media store that may be provided by server 70 may be the iTunes™ Store and/or the App Store™, each of which is made available by Apple Inc. of Cupertino, Calif.

It should be noted that any mechanism or combination of mechanisms for enabling communication between first communications component 106 of first electronic device 100 and first communications component 206 of second electronic device 200 may sometimes be referred to collectively herein as a communications set-up. For example, as shown in FIG. 1, shared communications link 51, first electronic device communications link 61, second electronic device communications link 71, communications network 50, and/or server 70 may be referred to individually and/or collectively as communications set-up 55.

System 1 may be configured in various ways and may include various combinations of various devices while still providing a consistent user experience when transitioning media playback between multiple electronic devices (e.g., while still providing a consistent experience for a user proximate to first electronic subsystem 10 as the playback of media is switched from first electronic subsystem 10 to second electronic subsystem 20). For example, in some embodiments, first electronic subsystem 10 may only include first electronic device 100 without any accessory device (e.g., without first accessory device 180, described in more detail below) and second electronic subsystem 20 may only include second electronic device 200 without any accessory device (e.g., without second accessory device 280, described in more detail below).

In such embodiments, first electronic device 100 may include any suitable device that may be configured to playback media and determine a first value of a playback characteristic of the media played back by first electronic device 100 that may be detected in the environment of first electronic device 100 at a first moment in time before a media playback transition. First electronic device 100 may also be configured to share certain initial information with second electronic device 200 for dictating an initial value of the playback characteristic for media initially played back by second electronic device 200 at a second moment in time initially after the media playback transition. Moreover, first electronic device 100 may also be configured to determine a second value of the playback characteristic of the media initially played back by second electronic device 200 that may be detected in the environment of first electronic device 100 at a third moment in time after the media playback transition, and then share certain adjustment information with second electronic device 200 based on the determined first and second values for dictating an adjusted value of the playback characteristic for media played back by second electronic device 200 at a fourth moment in time after the media playback transition. While, in such embodiments, second electronic device 200 to initially playback media with a certain initial playback characteristic value based on the shared initial information and then adjust the playback characteristic value of the media played back by second electronic device 200 based on the shared adjustment information. For example, in such embodiments, first electronic device 100 may be any suitable device having media playback component 112, media sensor 114, and first communications component 106 that can share information via communications set-up 55 with first communications component 206 of second electronic device 200, which may also include media playback component 212 (e.g., as shown in FIGS. 2 and 3).

Figure 2:
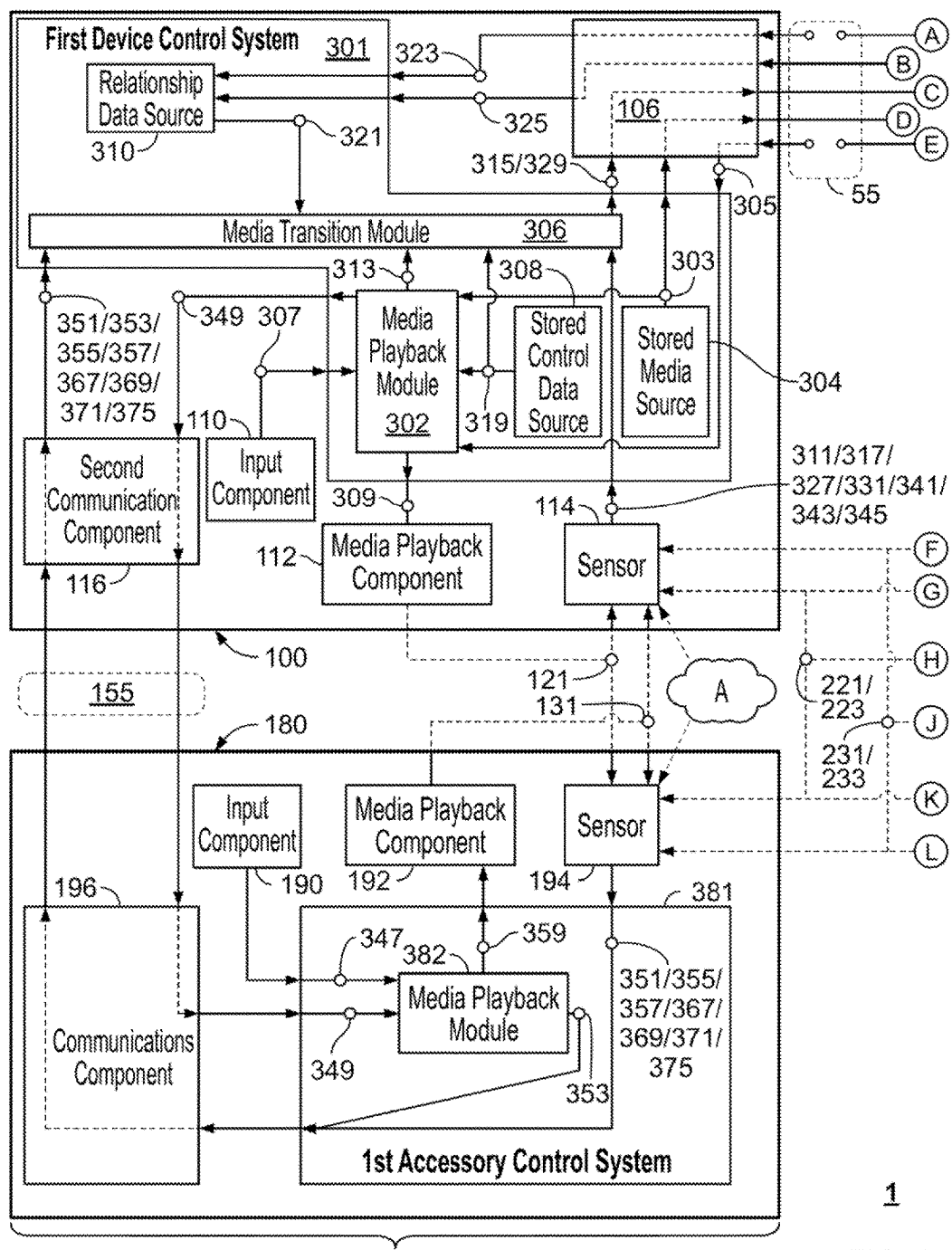
FIG. 2 is a schematic view of illustrative portions of the system of FIG. 1, in accordance with some embodiments.
Figure 2:
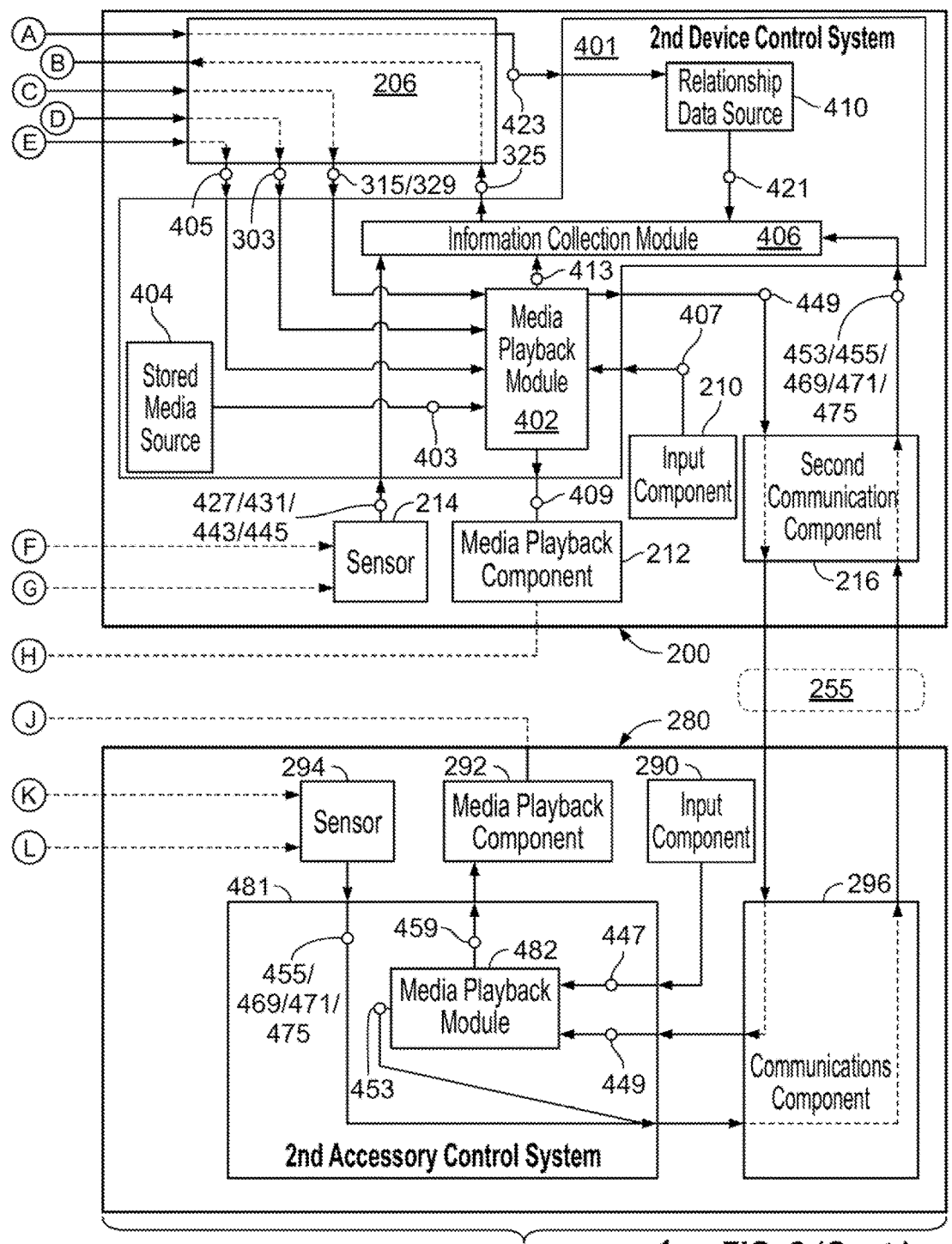
Figure 3:
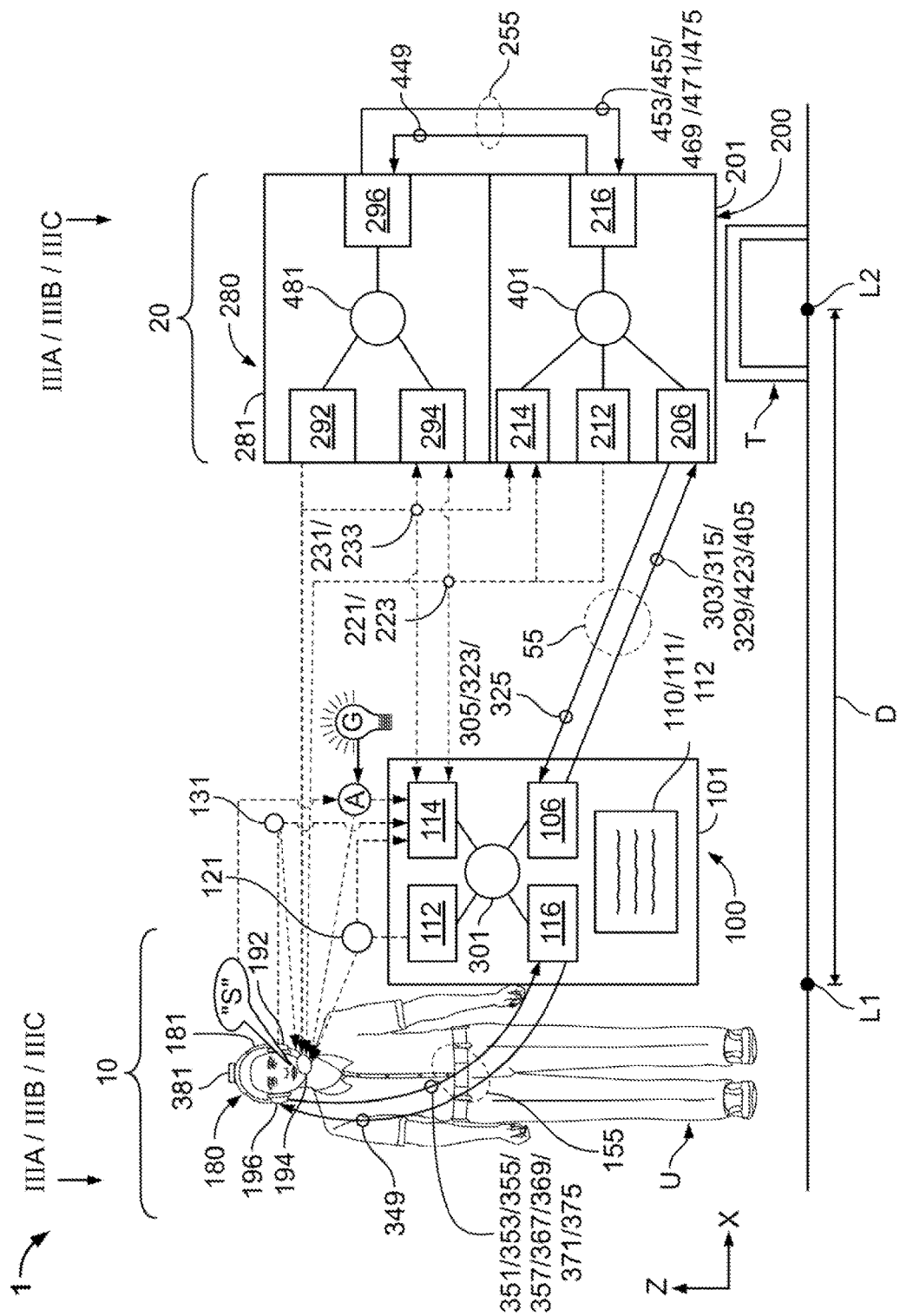
FIG. 3 is an additional view of the system of FIGS. 1 and 2, in accordance with some embodiments.

FIG. 2 shows a schematic view of a first device control system 301 of first electronic device 100 that may be provided to at least partially control not only the playback of media by first electronic device 100 but also the playback of media by second electronic device 200 during a media playback transition of system 1. For example, in some embodiments, first device control system 301 may at least partially dictate the value of one or more media playback characteristics of media being played back by media playback component 112 of first electronic device 100 before a media playback transition from first electronic subsystem 10 to second electronic subsystem 20. Moreover, in some embodiments, first device control system 301 may also at least partially dictate the value of one or more media playback characteristics of media being played back by media playback component 212 of second electronic device 200 after the media playback transition (e.g., based on a media playback characteristic value sensed by first device control system 301). This may enable a consistent user experience for a user within system 1 when the playback of media is transitioned from first electronic subsystem 10 to second electronic subsystem 20 (e.g., a user who is proximate to first electronic subsystem 10 within system 1). For example, as shown in FIG. 3, a user U of system 1 may be holding first electronic device 100 of subsystem 10 at a first location L1 while second electronic device 200 of second subsystem 20 may be positioned on a stationary table T at a second location L2 that may be separated from first location L1 by a distance D, and first device control system 301 of first electronic device 100 may be configured to dictate and sense media playback characteristic values of media 121 played back by first electronic device 100 as well as sense and dictate media playback characteristic values of media 221 played back by second electronic device 200.

With continued reference to FIG. 2, first device control system 301 of first electronic device 100 may include a media playback module 302 that may be configured to receive media for playback from one or more media sources. Media playback module 302 may also be configured to receive playback control data from one or more control sources. Moreover, media playback module 302 may also be configured to process such received media and such received control data in order to provide controlled media information to media playback component 112 for output to a user of first electronic subsystem 10.

Media playback module 302 may receive media for playback from various media sources accessible to first electronic device 100. For example, as shown in FIG. 2, media playback module 302 may receive stored media 303 for playback from a stored media source 304, which may be a source of media local to first electronic device 100 (e.g., media source 304 may be memory 104 of first electronic device 100 and stored media 303 may be any suitable media stored thereon). As another example, media playback module 302 may receive first streamed media 305 for playback from any suitable streaming media source accessible via first communications component 106 from communications set-up 55 (e.g., server 70 or second electronic device 200 may be a streaming media source that may provide first streamed media 305 to media playback module 302 of first electronic device 100). The received media may be any suitable media for playback by first electronic device 100, such as video media, audio media, graphical media, and the like.

Media playback module 302 may receive playback control data from various control sources accessible to first electronic device 100. For example, as shown, media playback module 302 may receive inputted playback control data 307 from input component 110 of first electronic device 100 (e.g., inputted playback control data 307 may be determined by a user's interaction with a user interface of first electronic device 100, such as a user's pressing of a "volume up" button 110 of first electronic device 100). As another example, as shown in FIG. 2, media playback module 302 may receive stored control data 319 from a stored control data source 308, which may be a source of control data local to first electronic device 100 (e.g., control data source 308 may be memory 104 of first electronic device 100 and stored control data 319 may be any suitable control data stored thereon). Therefore, such playback control data may be based on the one or more applications being run by first electronic device 100 (e.g., application 103) and/or based on any input instructions being received by first electronic device 100 (e.g., via input component 110). The received playback control data may be any suitable instructions for controlling the value of any suitable media playback characteristic, such as the volume level of played back audio media, the brightness or white point of played back video media, and/or the spectral content of the played back media.

Media playback module 302 may process the received media and the received playback control data to generate and transmit controlled media information to media playback component 112 for output to a user of first electronic device 100. For example, as shown, regardless of the source or type of media received by media playback module 302, and regardless of the source or type of playback control data received by media playback module 302, controlled media information 309 may be generated by media playback module 302 and transmitted to media playback component 112. This controlled media information 309 may be received by media playback component 112 and may be outputted by media playback component 112 as first played back media 121, which may be experienced by a user of first electronic device 100 (e.g., a user may hear first played back audio media 121 via a loud speaker media playback component 112 and/or a user may see first played back video media 121 via a display media play back component 112). Media playback module 302 may continuously update controlled media information 309 with different playback control data as new playback control data is received by media playback module 302, such that the value of one or more playback characteristics of first played back media 121 may be continuously changed during playback of media to a user using first electronic device 100.

As mentioned, at some point, system 1 may be configured to transition the playback of media from first electronic subsystem 10 to second electronic subsystem 20 (e.g., from first electronic device 100 to second electronic device 200). So that the value of at least one playback characteristic of the media played back by first electronic subsystem 10 before the transition may be maintained (e.g., at a particular location of first electronic subsystem 10) for the media played back by second electronic subsystem 20 after the transition, first device control system 301 of first electronic device 100 may also be configured to determine the value of a media playback characteristic of first played back media 121 before the transition, and then at least partially dictate the value of that media playback characteristic for second played back media 221 being played back by media playback component 212 of second electronic device 200 after the transition. This may provide for a consistent user experience for a user proximate to first electronic subsystem 10 within system 1 (e.g., user U that may be carrying first electronic device 100 within a space that may also include second electronic device 200 on table T, as shown in FIG. 3).

A media playback transition from first electronic subsystem 10 to second electronic subsystem 20 may be initiated in response to any suitable media playback transition initiation event. For example, a transition initiation event may be an instruction received by first electronic device 100 from a user via input component 110, from second electronic device 200, from server 70, or from any other suitable source. For example, a transition initiation event may occur in response to a user of first electronic device 100 requesting via input component 110 that media be played back from second electronic subsystem 20 rather than first electronic subsystem 10. Alternatively, a transition initiation event may occur automatically in response to system 1 detecting that first electronic subsystem 10 and second electronic subsystem 20 are within a certain distance of one another (e.g., automatically once user U carries first electronic device 100 within a particular distance D of second electronic device 200, such as automatically once a user listening to music on his portable media player device 100 gets in his car equipped with a car stereo subsystem 20). Therefore, such a media playback transition initiation event may be provided based on one or more applications being run by first electronic device 100 (e.g., application 103), based on any input instructions being received by first electronic device 100 (e.g., via input component 110), based on one or more applications being run by second electronic device 200 (e.g., application 203), based on any input instructions being received by second electronic device 200 (e.g., via input component 210), based on any instruction generated by server 70, or any combination thereof.

A media playback transition initiation event may occur at any suitable time. For example, a transition initiation event may occur while media is being played back by first electronic subsystem 10 (e.g., while first played back media 121 is being output by media playback component 110) or after media has stopped being played back by first electronic subsystem 10 (e.g., after the completion of first played back media 121 being outputted by media playback component 110). Media being played back by first electronic subsystem 10 before the transition (e.g., first played back media 121) and media being played back by second electronic subsystem 20 after the transition (e.g., second played back media 221) may be accessed from the same media source or different media sources. In response to a media playback transition initiation event, system 1 may be configured to initiate the playback of media at second electronic subsystem 20 (e.g., the playback of second played back media 221 outputted from media playback component 212 of second electronic device 200 may be initiated). Moreover, in some embodiments, in response to a media playback transition initiation event, system 1 may be configured to terminate the playback of media at first electronic subsystem 20 (e.g., the playback of first played back media 121 outputted from media playback component 112 of first electronic device 100 may be terminated).

As shown in FIG. 2, for example, first device control system 301 of first electronic device 100 may also include a media transition module 306 that may be configured to determine a first playback characteristic value of media played back by first electronic subsystem 10 before a media playback transition from first electronic subsystem 10 to second electronic subsystem 20. Media transition module 306 may also be configured to dictate an initial playback characteristic value of media played back by second electronic subsystem 20 after the media playback transition. Moreover, media transition module 306 may also be configured to determine a second playback characteristic value of media played back by second electronic subsystem 20 after the media playback transition and then dictate an adjustment to the playback characteristic value of the media played back by second electronic subsystem 20 based on the determined first and second playback characteristic values.

Media transition module 306 may determine a first playback characteristic value of media played back by first electronic subsystem 10 before a media playback transition from first electronic subsystem 10 to second electronic subsystem 20. For example, as shown, media transition module 306 may be configured to receive first sensed playback characteristic value data 311 from sensor 114 of first electronic device 100. First sensed playback characteristic value data 311 may be generated by sensor 114 based on the sensed value of a playback characteristic of first played back media 121 before a media playback transition. For example, sensor 114 may be a microphone configured to sense the volume of first played back audio media 121 and transmit first sensed playback characteristic value data 311 indicative of that sensed volume to media transition module 306. As another example, sensor 114 may be a light sensor configured to sense the brightness or white point or any other suitable characteristic of first played back video media 121 and transmit first sensed playback characteristic value data 311 indicative of that sensed brightness or white point or any other suitable characteristic to media transition module 306.

Additionally or alternatively, media transition module 306 may be configured to receive first internal playback characteristic value data 313 from within first device control system 301. For example, first internal playback characteristic value data 313 may be internally generated by media playback module 302 based on a playback characteristic value of controlled media information 309 before a media playback transition. For example, media playback module 302 may be configured to determine what a sensed playback characteristic value of controlled media information 309 would be when outputted by media playback component 112 without requiring that value to be physically sensed by sensor 114 (e.g., media playback module 302 may leverage known controlled media information 309 with known characteristics of media playback component 112 to internally determine a playback characteristic value of first played back media 121 outputted by component 112 and thereby generate first internal playback characteristic value data 313).

Media transition module 306 may be configured to determine at least a first playback characteristic value of first played back media 121 played back by first electronic subsystem 10 at any suitable time (e.g., using received first sensed playback characteristic value data 311 and/or received first internal playback characteristic value data 313). For example, in response to first electronic subsystem 10 detecting a media playback transition initiation event from any suitable component of system 1, media transition module 306 may be configured to determine the most recent playback characteristic value of first played back media 121 played back by first electronic subsystem 10 based on the most recently received first sensed playback characteristic value data 311 and/or the most recently received first internal playback characteristic value data 313. Such playback characteristic value data may be configured to be generated and transmitted to media transition module 306 on a frequent basis so that the playback characteristic value data most recently received by media transition module 306 may be indicative of at least the first playback characteristic value of the current or most recently played back media 121.

Media transition module 306 may also be configured to dictate an initial playback characteristic value of media played back by second electronic subsystem 20 after the media playback transition (e.g., in response to first electronic subsystem 10 detecting a media playback transition initiation event from any suitable component of system 1). For example, as shown, media transition module 306 may be configured to generate and transmit shared initial playback control data 315 to second electronic subsystem 20 (e.g., using communications set-up 55 via first communications component 106). Shared initial playback control data 315 may be generated by media transition module 306 based on various factors and may be received by second electronic subsystem 20 to dictate how second electronic subsystem 20 initially plays back second played back media 221 in response to the media playback transition.

Media transition module 306 may receive information from various sources and may generate appropriate shared initial playback control data 315 in response to analyzing the received information. For example, in some embodiments, media transition module 306 may generate shared initial playback control data 315 at least partially based on a first playback characteristic value of first played back media 121 played back by first electronic subsystem 10 (e.g., based on received first sensed playback characteristic value data 311 and/or received first internal playback characteristic value data 313). That is, shared initial playback control data 315 may be determined at least in part by the most recent playback characteristic value of first played back media 121 played back by first electronic subsystem 10 before the media playback transition, such that a playback characteristic value of second played back media 221 that may be initially played back by second electronic subsystem 20 after the media playback transition may be at least partially dictated by (e.g., similar to) the value of that playback characteristic of first played back media 121 played back by first electronic subsystem 10 before the media playback transition. For example, media transition module 306 may be configured to generate shared initial playback control data 315 that may be utilized by second electronic subsystem 20 to output second played back media 221 with a playback characteristic value substantially equal to or otherwise related to a first playback characteristic value of first played back media 121 played back by first electronic subsystem 10 (e.g., based on received first sensed playback characteristic value data 311 and/or received first internal playback characteristic value data 313). This may help enable a consistent user experience for a user of system 1 experiencing the media during the media playback transition.

Alternatively or additionally, media transition module 306 may generate shared initial playback control data 315 at least partially based on one or more characteristics of an ambient condition A sensed within system 1 during the media playback transition. Ambient condition A may be any condition (e.g., sound and/or light) in the environment of system 1 that is not generated by a media playback component. For example, ambient condition A may be generated by user U or any other entity that may be present within the environment of system 1 (e.g., user U may be utilizing system 1 at a party where the user wishes to playback music from a stereo second electronic device 200 rather than from a portable media player first electronic device 100, and where ambient condition A may be conversational audio noise generated by the attendees of the party). As shown in FIG. 2, for example, media transition module 306 may be configured to receive sensed ambient characteristic value data 317 from sensor 114 of first electronic device 100. Sensed ambient characteristic value data 317 may be generated by sensor 114 based on the sensed value of a characteristic of ambient condition A during a media playback transition. For example, sensor 114 may be a microphone configured to sense the volume of an audio component of ambient condition A (e.g., speech S from user U of FIG. 3) and transmit sensed ambient characteristic value data 317 indicative of that sensed volume to media transition module 306. As another example, sensor 114 may be a light sensor configured to sense the brightness or white point or any other suitable characteristic of a light component of ambient condition A (e.g., a light source G of FIG. 3) and transmit sensed ambient characteristic value data 317 indicative of that sensed brightness or white point or any other suitable characteristic to media transition module 306.

Media transition module 306 may be configured to determine one or more characteristics of an ambient condition A at any suitable time (e.g., using received sensed ambient characteristic value data 317). For example, in response to first electronic subsystem 10 detecting a media playback transition initiation event from any suitable component of system 1, media transition module 306 may be configured to determine sensed ambient characteristic value data 317 just before second electronic subsystem 20 initiates media playback of second played back media 221 in accordance with the media playback transition. In some embodiments, media transition module 306 may be configured to determine sensed ambient characteristic value data 317 just after first electronic device 100 terminates media playback of first played back media 121 and just before second electronic device 20 initiates media playback of second played back media 221 in accordance with the media playback transition. This may enable system 1 to determine the ambient conditions in system 1 that exist during the media playback transition but that are not generated by a media playback component of system 1. Media transition module 306 may generate shared initial playback control data 315 at least partially based on sensed ambient characteristic value data 317 such that a playback characteristic value of second played back media 221 initially played back by second electronic subsystem 20 after the media playback transition may take into account any ambient conditions in system 1.

In some embodiments, media transition module 306 may generate shared initial playback control data 315 based on sensed ambient characteristic value data 317 during the transition as well as based on playback characteristic value data of first played back media 121 played back by first electronic subsystem 10 before the transition (e.g., based on first sensed playback characteristic value data 311 and/or first internal playback characteristic value data 313). For example, media transition module 306 may generate shared initial playback control data 315 to be the aggregate of sensed ambient characteristic value data 317 and first sensed playback characteristic value data 311 or the aggregate of sensed ambient characteristic value data 317 and first internal playback characteristic value data 313. This may enable the initial playback characteristic value of second played back media 221 outputted by second electronic subsystem 20 after the transition to be equal to the sum of the playback characteristic value of first played back media 121 played back by first electronic subsystem 10 as determined by first electronic device 100 just before the transition and the characteristic value of ambient condition A as determined by first electronic device 100 during the transition.

Alternatively or additionally, media transition module 306 may generate shared initial playback control data 315 at least partially based on one or more stored settings. For example, as shown, media transition module 306 may receive stored playback control data 319 from stored control data source 308, which may be any source of stored control data accessible to media transition module 306. In some embodiments, stored control data source 308 may be memory 104 of first electronic device 100 and stored playback control data 319 may be any suitable playback control data stored thereon. Alternatively, stored control data source 308 may be provided to media transition module 306 by server 70 or second electronic subsystem 20 via communications set-up 55 and first communications component 106.

Stored playback control data 319 may be any suitable control data that may be defined independent of any current sensed playback characteristic value of system 1, but may be defined based on predetermined or predefined settings of system 1. In some embodiments, stored playback control data 319 may be a value (e.g., a value of a playback characteristic) that has been previously defined by a user of system 1 and that may be used by media transition module 306 for generating shared initial playback control data 315. For example, user U of first electronic device 100 may define stored playback control data 319 with a specific value (e.g., a zero or "mute" value) that be used by media transition module 306 for generating shared initial playback control data 315 that may dictate a specific playback characteristic value for second played back media 221 that may be initially outputted by second electronic subsystem 20 (e.g., a specific playback characteristic value that may initially zero or mute the media played back by second electronic device 200). That is, stored playback control data 319 may be used by media transition module 306 for generating shared initial playback control data 315 that may cause second played back media 221 initially outputted by second electronic subsystem 20 to be mute (e.g., to have a zero value for its loudness playback characteristic).

Additionally or alternatively, stored playback control data 319 may be a value that is determined based on specific calendar data or other application data (e.g., text message or e-mail data from a messaging application) accessible by system 1. For example, if a calendar application of first electronic device 100 indicates that user U is at a party at a specific location during the transition initiation event, then a value for stored playback control data 319 that may be specific to a party at that location may be used by media transition module 306 for generating shared initial playback control data 315 appropriate for a party at that specific location. As another example, if a calendar application of first electronic device 100 indicates that it is a specific time of day during the transition initiation event, then a value for stored playback control data 319 that may be specific to that time of day may be used by media transition module 306 for generating shared initial playback control data 315 appropriate for that time of day. Therefore, stored playback control data 319 may be indicative of any suitable data that may at least partially dictate the value of shared initial playback control data 315 based on any suitable condition and/or any suitable application being run by system 1.

Alternatively or additionally, media transition module 306 may generate shared initial playback control data 315 at least partially based on the value of any appropriate relationship between first electronic subsystem 10 and second electronic subsystem 20 within system 1. For example, as shown, media transition module 306 may receive relationship playback control data 321 from a relationship data source 310, which may be any source of control data accessible to media transition module 306. In some embodiments, relationship data source 310 may be memory 104 of first electronic device 100 and relationship playback control data 321 may be any suitable playback control data stored thereon. Alternatively or additionally, relationship data source 310 may be provided to media transition module 306 by server 70 or second electronic subsystem 20 via communications set-up 55 and first communications component 106.

Relationship playback control data 321 may be any suitable control data that may be defined based on the value of any appropriate relationship characteristic between first electronic subsystem 10 and second electronic subsystem 20. For example, relationship playback control data 321 may be control data determined by the value of a distance between first electronic subsystem 10 and second electronic subsystem 20 during the transition (e.g., the length of distance D between location L1 of user U and first electronic subsystem 10 and location L2 of table T and second electronic subsystem 20 of FIG. 3). Such distance relationship playback control data 321 may be generated by relationship data source 310 using various pieces of information that may be accessed from various sources. For example, server 70 may be able to determine locations L1 and L2 based on information shared by each subsystem with server 70 (e.g., global positioning system ("GPS") data), and server 70 may be able to send this information to relationship data source 310 as first server relationship data 323. Then relationship data source 310 may be able to leverage this first server relationship data 323 to determine distance D for generating relationship playback control data 321. Alternatively, second electronic subsystem 20 may be able to determine its own location L2 (e.g., using a location sensor of second electronic device 200), and second electronic subsystem 20 may be able to send this information to relationship data source 310 as second subsystem relationship data 325 (e.g., via communications set-up 55). Then relationship data source 310 may be able to leverage this second subsystem relationship data 325 with location L1 information determined locally by first electronic device 100 to determine distance D for generating relationship playback control data 321.

Relationship playback control data 321 that is indicative of a known distance between subsystems 10 and 20 of system 1 may be taken into account by media transition module 306 when determining shared initial playback control data 315. This may enable a consistent user experience for user U during the media playback transition. For example, shared initial playback control data 315 that dictates the initial volume playback characteristic value of second played back audio media 221 initially outputted by second electronic subsystem 20 may be at least partially based on such relationship playback control data 321 so that the initial volume playback characteristic value of second played back audio media 221 may be proportional to the distance D between subsystems 10 and 20. This may enable the volume of second played back audio media 221 initially outputted by second electronic subsystem 20 after the transition to be loud enough to traverse a long distance D (or quiet enough to traverse a short distance D) from second subsystem location L2 to user U at first subsystem location L1, such that the volume of that second played back audio media 221 when it reaches L1 (e.g., sensor 114) may be similar to the volume of first played back audio media 121 outputted by first electronic subsystem 10 before the transition (e.g., as determined by first sensed playback characteristic value data 311 and/or first internal playback characteristic value data 313).

Figure 3A:
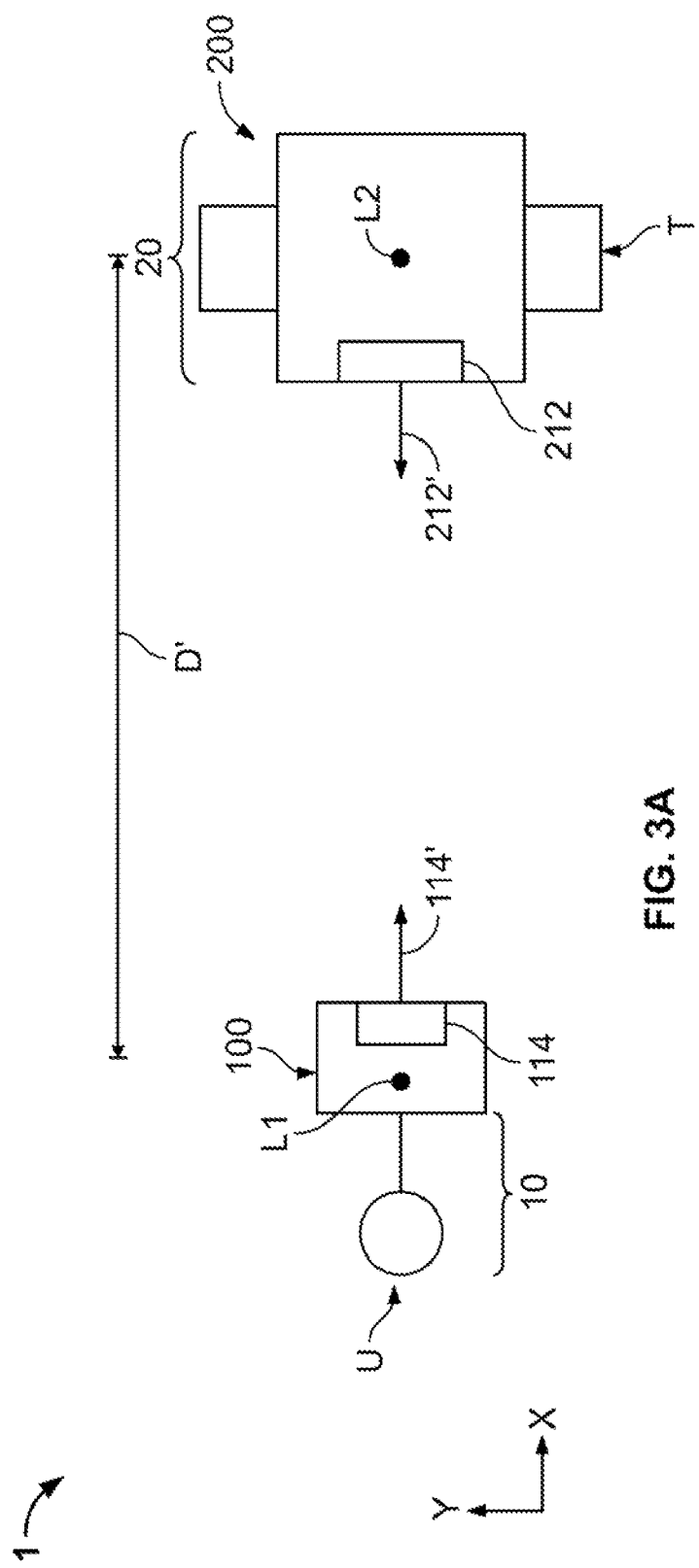
FIG. 3A is an overhead views of the system of FIGS. 1-3, taken from line IIIA-IIIA of FIG. 3, in accordance with some embodiments.
Figure 3B:
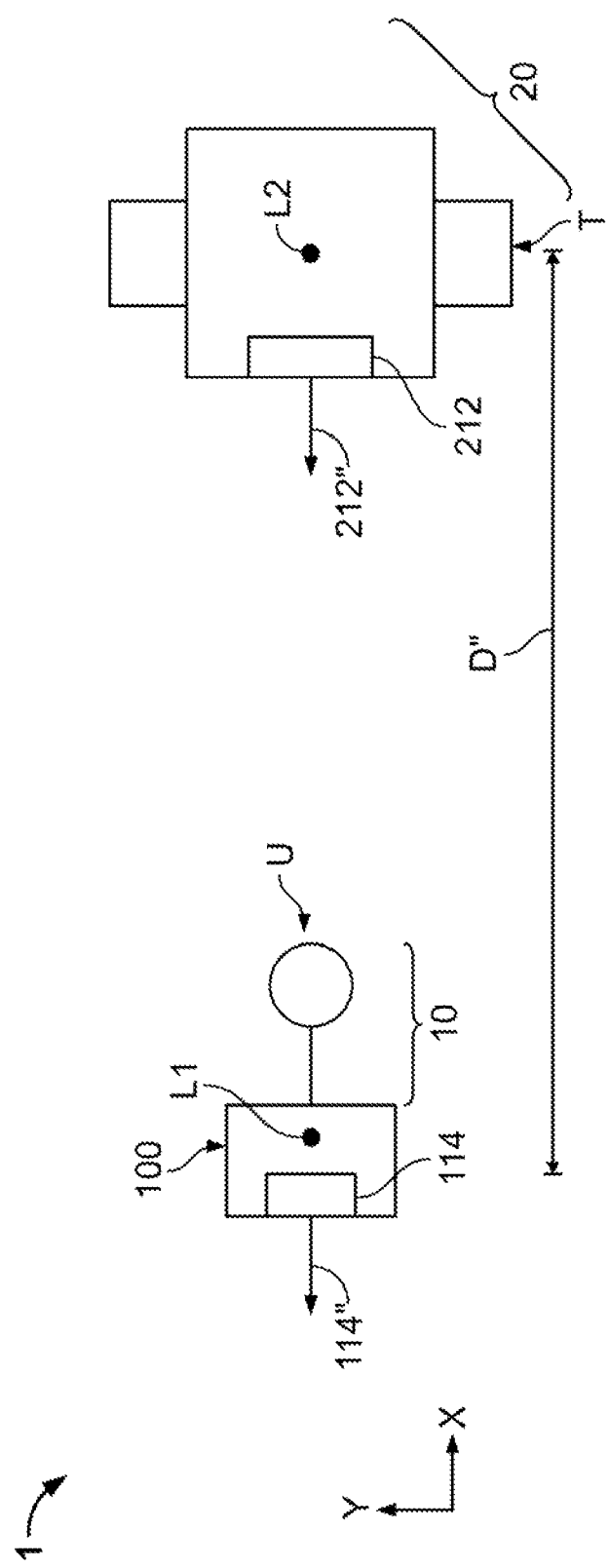
FIG. 3B is an overhead views of the system of FIGS. 1-3, taken from line IIIB-IIIB of FIG. 3, in accordance with some embodiments.

Relationship playback control data 321 may be any suitable control data that may be defined based on the value of any relationship characteristic between first electronic subsystem 10 and second electronic subsystem 20 other than distance. For example, relationship playback control data 321 may be control data determined by the value of an orientation between first electronic subsystem 10 and second electronic subsystem 20 during the transition. An orientation between first electronic subsystem 10 and second electronic subsystem 20 may be an angle or any other suitable orientation value that may be determined using one or more sensors of system 1, such as a compass or gyroscope sensor of first electronic subsystem 10 and/or a compass or gyroscope of second electronic subsystem 20. Such an orientation value may be distinct from and independent of any distance value between first electronic subsystem 10 and second electronic subsystem 20. For example, in a first embodiment of system 1, as shown in FIG. 3A, there may be a distance D' between location L1 of user U and first electronic subsystem 10 and location L2 of table T and second electronic subsystem 20, while a directionality 114' of sensor 114 may be facing directly towards a directionality 212' of media playback component 212 (e.g., along the X-axis of FIG. 3A). Comparatively, in a second embodiment of system 1, as shown in FIG. 3B, there may be a distance D" between location L1 of user U and first electronic subsystem 10 and location L2 of table T and second electronic subsystem 20, while a directionality 114" of sensor 114 may be facing directly away from a directionality 212" of media playback component 212 (e.g., along the X-axis of FIG. 3B). While the distance D' may be equal to the distance D" (e.g., 20 feet), the orientation between directionality 114' and directionality 212' may be a polar opposite of the orientation between directionality 114" and directionality 212" (e.g., 0° versus 180°). Directionality may refer to the polar pattern or sensitivity or orientation or any other suitable characteristic of a sensor or media playback component.

Such orientation relationship playback control data 321 may be generated by relationship data source 310 using various pieces of information that may be accessed from various sources. For example, server 70 may be able to determine directionalities of a sensor and a media playback component based on information shared by each subsystem with server 70 (e.g., global positioning system ("GPS") data), and server 70 may be able to send this information to relationship data source 310 as first server relationship data 323. Then relationship data source 310 may be able to leverage this first server relationship data 323 to determine an orientation between first electronic subsystem 10 and second electronic subsystem 20 for generating relationship playback control data 321. Alternatively, second electronic subsystem 20 may be able to determine its own directionality (e.g., using an orientation sensor of second electronic device 200, such as a compass), and second electronic subsystem 20 may be able to send this information to relationship data source 310 as second subsystem relationship data 325 (e.g., via communications set-up 55). Then relationship data source 310 may be able to leverage this second subsystem relationship data 325 with its own directionality information determined locally by first electronic device 100 to determine orientation information between first electronic subsystem 10 and second electronic subsystem 20 for generating relationship playback control data 321.

Relationship playback control data 321 may be defined based on any other suitable relationship between first electronic subsystem 10 and second electronic subsystem 20 besides separation distance or orientation. For example, relationship playback control data 321 may be indicative of a relationship between a specific type of sensor of first electronic subsystem 10 (e.g., sensor 114) and a specific type of media playback component of second electronic subsystem 20 (e.g., media playback component 212). This may enable any known responses (e.g., frequency responses) by a particular sensor to media played back by a particular playback component to be taken into account by media transition module 306 when determining shared initial playback control data 315.

Therefore, media transition module 306 may generate shared initial playback control data 315 at least partially based on one or more of first sensed playback characteristic value data 311, first internal playback characteristic value data 313, sensed ambient characteristic value data 317, stored playback control data 319, relationship playback control data 321, and any combination thereof. This shared initial playback control data 315 may then be transmitted by media transition module 306 to second electronic subsystem 20 for at least partially dictating at least one playback characteristic value of second played back media 221 initially outputted by second electronic subsystem 20 after the transition. In other embodiments, media transition module 306 may not transmit any shared initial playback control data 315 to second electronic subsystem 20. Instead, various other sources of control data that may be generated internally by second electronic subsystem 20 and/or by server 70 may be used by system 1 to dictate a playback characteristic value of second played back media 221 initially outputted by second electronic subsystem 20 after the media playback transition. For example, as described below, inputted playback control data 407 from input component 210 of second electronic device 200 (e.g., a user's setting of a volume control knob 210 of second electronic device 200) and/or internal data sources of second electronic device 200 (e.g., predetermined control data stored in memory 204) may alone dictate a playback characteristic value of second played back media 221 initially outputted by second electronic subsystem 20 after the media playback transition.

FIG. 2 also shows a schematic view of a second device control system 401 of second electronic device 200 that may be provided to at least partially control the playback of media by second electronic device 200. For example, in some embodiments, second device control system 401 may at least partially dictate the value of one or more media playback characteristics of media being played back by media playback component 212 of second electronic device 200 (e.g., based on shared initial playback control data 315 that may be received by first electronic subsystem 10). This may enable a consistent user experience for a user proximate to first electronic subsystem 10 within system 1 when the playback of media is transitioned from first electronic subsystem 10 to second electronic subsystem 20.

As shown in FIG. 2, for example, second device control system 401 of second electronic device 200 may include a media playback module 402 that may be configured to receive media for playback from one or more media sources. Media playback module 402 may also be configured to receive playback control data from one or more control sources. Moreover, media playback module 402 may also be configured to process such received media and such received control data in order to provide controlled media information to media playback component 212 for output to a user of system 1.

Media playback module 402 may receive media for playback from various media sources accessible to second electronic device 200. For example, as shown, media playback module 402 may receive stored media 403 for playback from stored media source 404, which may be a source of media local to second electronic device 200 (e.g., media source 404 may be memory 204 of second electronic device 200 and stored media 403 may be any suitable media stored thereon). As another example, media playback module 402 may receive second streamed media 405 for playback from any suitable streaming media source accessible by first communications component 206 from communications set-up 55 (e.g., server 70 may be a streaming media source that may provide second streamed media 405 to media playback module 402 of second electronic device 200). In some embodiments, second streamed media 405 may be the same as first streamed media 305, and both first streamed media 305 and second streamed media 405 may be provided by the same streaming media source (e.g., server 70). As yet another example, media playback module 402 may receive a stream of stored media 303 for playback from stored media source 304 of first electronic device 100 (e.g., via communications set-up 55). The media received by media playback module 402 may be any suitable media for playback by second electronic device 200, such as video media, audio media, graphical media, and the like.

Media playback module 402 may receive playback control data from various control sources accessible to second electronic device 200. For example, as shown, media playback module 402 may receive inputted playback control data 407 from input component 210 of second electronic device 200 (e.g., inputted playback control data 407 may be determined by a user's interaction with a user interface of second electronic device 200, such as a user's pressing of a "volume up" button 210 of second electronic device 200). As another example, media playback module 402 may receive inputted playback control data from internal data sources of second electronic device 200 (e.g., predetermined control data stored in memory 204). Therefore, such playback control data may be based on the one or more applications being run by second electronic device 200 (e.g., application 203) and/or based on any input instructions being received by second electronic device 200 (e.g., via input component 210). Moreover, as described above, first electronic subsystem 10 may generate and transmit shared initial playback control data 315 to media playback module 402 of second electronic subsystem 20 for at least partially dictating an initial playback characteristic value of media played back by second electronic subsystem 20 in response to a media playback transition. For example, as shown in FIG. 2, media playback module 402 may receive shared initial playback control data 315 from first electronic subsystem 10 via communications set-up 55 and first communications component 206. The playback control data received by media playback module 402 may be any suitable instructions that can be utilized for controlling the value of any suitable media playback characteristic of media played back by second electronic subsystem 20, such as the volume level of played back audio media, the brightness or white point of played back video media, and/or the spectral content of the played back media.

Media playback module 402 may process the received media and the received playback control data to generate and transmit controlled media information to media playback component 212 for output to a user of system 1 (e.g., user U). For example, as shown, controlled media information 409 may be generated by media playback module 402 and transmitted to media playback component 212 based on the media and playback control data received by media playback module 402. This controlled media information 409 may be received by media playback component 212 and may be outputted by media playback component 212 as initial second played back media 221, which may be experienced by a user of system 1 (e.g., user U may hear second played back audio media 221 via a loud speaker media playback component 212 and/or user U may see second played back video media 221 via a display media play back component 212). Media playback module 402 may continuously update controlled media information 409 with different playback control data as new playback control data is received by media playback module 402, such that the value of one or more playback characteristics of second played back media 221 may be continuously changed during playback of media by second electronic subsystem 20 to a user of system 1.

As mentioned, during a media playback transition from first electronic subsystem 10 to second electronic subsystem 20, shared initial playback control data 315 may be used to at least partially dictate an initial playback characteristic value of second played back media 221 outputted by second electronic subsystem 20. For example, in some embodiments, during such a media playback transition, controlled media information 409 may be generated by media playback module 402 based on shared initial playback control data 315 alone (e.g., not also based on control data 407). In other embodiments, during such a media playback transition, controlled media information 409 may be generated by media playback module 402 based on shared initial playback control data 315 in combination with one or more other types of received control data (e.g., control data 407). When shared initial playback control data 315 is received by media playback module 402, controlled media information 409 generated by media playback module 402 may cause media playback component 212 to output initial second played back media 221 as initially played back media with a playback media characteristic at least partially dictated by shared initial playback control data 315.

As shown in FIG. 2, for example, second device control system 401 of second electronic device 200 may also include an information collection module 406 that may be configured to determine one or more types of information about second electronic subsystem 20 that may be utilized by system 1 during a media playback transition. For example, information collection module 406 may be configured to determine at least one playback characteristic value of media played back by second electronic subsystem 20. Moreover, information collection module 406 may be configured to collect certain relationship playback control data 421 that may be at least partially indicative of a relationship between first electronic subsystem 10 and second electronic subsystem 20. Based on some or all of the received data, information collection module 406 may generate and transmit second subsystem relationship data 325 to first electronic subsystem 10 (e.g., to relationship data source 310 of first electronic device 100 via communications set-up 55 and first communication components 106 and 206).

Information collection module 406 may determine at least one playback characteristic value of second played back media 221 initially played back by second electronic subsystem 20 during a media playback transition from first electronic subsystem 10 to second electronic subsystem 20. For example, as shown, information collection module 406 may be configured to receive second sensed playback characteristic value data 427 from sensor 214 of second electronic device 200. Second sensed playback characteristic value data 427 may be generated by sensor 214 based on the sensed value of a playback characteristic of second played back media 221 initially outputted by media playback component 212 during a media playback transition in response to shared initial playback control data 315. For example, sensor 214 may be a microphone configured to sense the volume of second played back audio media 221 and transmit second sensed playback characteristic value data 427 indicative of that sensed volume to information collection module 406. As another example, sensor 214 may be a light sensor configured to sense the brightness or white point or any other suitable characteristic of second played back video media 221 and transmit second sensed playback characteristic value data 427 indicative of that sensed brightness or white point or any other suitable characteristic to information collection module 406.

Additionally or alternatively, information collection module 406 may be configured to receive second internal playback characteristic value data 413 from within second device control system 401. For example, second internal playback characteristic value data 413 may be internally generated by media playback module 402 based on a playback characteristic value of controlled media information 409 initially generated during a media playback transition in response to shared initial playback control data 315. For example, media playback module 402 may be configured to determine what a sensed playback characteristic value of controlled media information 409 would be when outputted by media playback component 212 as second played back media 221 without requiring that value to be physically sensed by sensor 214 (e.g., media playback module 402 may leverage known controlled media information 409 with known characteristics of media playback component 212 to internally determine a playback characteristic value of second played back media 221 outputted by component 212 and thereby generate second internal playback characteristic value data 413).

Alternatively or additionally, information collection module 406 may be configured to receive relationship playback control data 421 from a relationship data source 410, which may be any source of control data accessible to information collection module 406. In some embodiments, relationship data source 410 may be memory 204 of second electronic device 200 and relationship playback control data 421 may be any suitable playback control data stored thereon. Alternatively or additionally, relationship data source 410 may be provided to information collection module 406 by server 70 or first electronic subsystem 10 via communications set-up 55 and first communications component 206.

Relationship playback control data 421 may be any suitable control data that may be defined based on a relationship between first electronic subsystem 10 and second electronic subsystem 20. For example, relationship playback control data 421 may be control data determined by the distance between first electronic subsystem 10 and second electronic subsystem 20 during the transition (e.g., distance D between location L1 of user U and first electronic subsystem 10 and location L2 of table T and second electronic subsystem 20 of FIG. 3). Such distance relationship playback control data 421 may be generated by relationship data source 410 using various pieces of information that may be accessed from various sources. For example, server 70 may be able to determine locations L1 and L2 based on information shared by each subsystem with server 70, and server 70 may be able to send this information to relationship data source 410 as second server relationship data 423. Then relationship data source 410 may be able to leverage this second server relationship data 423 to determine distance D for generating relationship playback control data 421. Alternatively, relationship playback control data 421 may be generated entirely based on data determined locally by second subsystem 20 (e.g., about its own location or other features that may be shared by second subsystem 20).

Therefore, information collection module 406 may generate second subsystem relationship data 325 at least partially based on one or more of second sensed playback characteristic value data 427, second internal playback characteristic value data 413, relationship playback control data 421, and any combination thereof. This second subsystem relationship data 325 may then be transmitted by information collection module 406 to first electronic subsystem 10 for helping enable a consistent user experience for user U during the media playback transition (e.g., for at least partially dictating the generation of shared initial playback control data 315). In other embodiments, information collection module 406 may not transmit any second subsystem relationship data 325 to first electronic subsystem 10. Instead, various other control data that may be generated internally by first electronic subsystem 10 and/or by server 70 may be used to dictate how first electronic subsystem 10 may enable a consistent user experience for user U during the media playback transition from subsystem 10 to subsystem 20.

Once second played back media 221 is initially outputted by media playback component 212 in response to shared initial playback control data 315 being received by media playback module 402 during a media playback transition, such second played back media 221 may be detected by first electronic subsystem 10 in order to determine whether any additional playback control data is needed to adjust the playback of media from second electronic subsystem 20. For example, media transition module 306 of first device control system 301 may sense at least one playback characteristic value of second played back media 221 outputted by second electronic subsystem 20 in response to shared initial playback control data 315 being received by media playback module 402 during a media playback transition. As shown in FIG. 2, for example, media transition module 306 may be configured to receive second sensed playback characteristic value data 327 from sensor 114 of first electronic device 100. Second sensed playback characteristic value data 327 may be generated by sensor 114 based on the sensed value of a playback characteristic of second played back media 221 initially outputted by media playback component 212 during a media playback transition in response to shared initial playback control data 315. For example, sensor 114 may be a microphone configured to sense the volume of second played back audio media 221 and transmit second sensed playback characteristic value data 327 indicative of that sensed volume to media transition module 306. As another example, sensor 114 may be a light sensor configured to sense the brightness or white point or any other suitable characteristic of second played back video media 221 and transmit second sensed playback characteristic value data 327 indicative of that sensed brightness or white point or any other suitable characteristic to media transition module 306.

Media transition module 306 may also be configured to generate shared adjustment playback control data 329 based on second sensed playback characteristic value data 327 in combination with any additional data that may be available to media transition module 306. Therefore, media transition module 306 may generate shared adjustment playback control data 329 at least partially based on one or more of first sensed playback characteristic value data 311, first internal playback characteristic value data 313, sensed ambient characteristic value data 317, second sensed playback characteristic value data 327, stored playback control data 319, relationship playback control data 321, and any combination thereof, where such relationship playback control data 321 may be at least partially based on second subsystem relationship data 325 from information collection control module 406, where such second subsystem relationship data 325 may be at least partially based on second sensed playback characteristic value data 427, second internal playback characteristic value data 413, and/or relationship playback control data 421. Such shared adjustment playback control data 329 may then be transmitted by media transition module 306 to second electronic subsystem 20 for adjusting at least one playback characteristic value of media being played back by second electronic subsystem 20 after the transition.

For example, in some embodiments, media transition module 306 may be configured to generate and transmit shared adjustment playback control data 329 based on a comparison of first sensed playback characteristic value data 311 with second sensed playback characteristic value data 327. For example, by comparing first sensed playback characteristic value data 311 with second sensed playback characteristic value data 327, media transition module 306 may be able to determine the difference between a playback characteristic value of first played back media 121 played back by first electronic subsystem 10 as sensed by first electronic subsystem 10 before the transition and a playback characteristic value of second played back media 221 initially played back by second electronic subsystem 20 as sensed by first electronic subsystem 10 after the transition. This comparison may be indicative of the difference in volume between previously played back audio media 121 sensed by microphone sensor 114 at location L1 of first electronic subsystem 10 and user U before the transition and initially played back audio media 221 sensed by microphone 114 at location L1 of first electronic subsystem 10 and user U after the transition. Then, media transition module 306 may be configured to generate and transmit shared adjustment playback control data 329 at least partially based on this detected difference, for example, such that shared adjustment playback control data 329 may be configured to adjust the volume of audio media currently played back by second electronic subsystem 20 to match the volume of audio media 121 previously played back by first electronic subsystem 10. This may allow for the volume of media played back by second electronic subsystem 20 to be measured and modified iteratively by media transition module 306 until the volume of media played back by second electronic subsystem 20 as measured by first electronic subsystem 10 after the transition is equal to the target volume (e.g., the volume of previously played back audio media 121 sensed by microphone sensor 114 at location L1 of user U and first electronic subsystem 10 before the transition).

In some embodiments, media transition module 306 may also generate shared adjustment playback control data 329 using a more adaptive approach that may be at least partially based on sensed ambient characteristic value data 317. For example, shared adjustment playback control data 329 may be generated based on the difference between the volume of second played back audio media 221 sensed by microphone 114 at location L1 of user U and first electronic subsystem 10 after the transition (e.g., second sensed playback characteristic value data 327) and the volume sum of the volume of previously played back audio media 121 sensed by microphone sensor 114 at location L1 of user U and first electronic subsystem 10 before the transition (e.g., first sensed playback characteristic value data 311) and the volume of ambient condition A sensed by microphone sensor 114 at location L1 of user U and first electronic subsystem 10 during the transition (e.g., sensed ambient characteristic value data 317). That is, shared adjustment playback control data 329 may be generated based on the equation of second sensed playback characteristic value data 327−first sensed playback characteristic value data 311+sensed ambient characteristic value data 317. This may allow for the volume of media played back by second electronic subsystem 20 to be measured and modified iteratively by media transition module 306 until the volume of media played back by second electronic subsystem 20 as measured by first electronic subsystem 10 after the transition is the sum of the target volume (e.g., the volume of previously played back audio media 121 sensed by microphone sensor 114 at location L1 of user U and first electronic subsystem 10 before the transition) and the ambient volume (e.g., the volume of ambient condition A sensed by microphone sensor 114 at location L1 of user U and first electronic subsystem 10 during the transition).

Alternatively or additionally, various other types of data available to media transition module 306 may be leveraged to at least partially generate shared adjustment playback control data 329. For example, any suitable relationship playback control data 321, including any suitable data provided to first electronic subsystem 10 from second electronic subsystem 20 as second subsystem relationship data 325, may be utilized by media transition module 306 when determining shared adjustment playback control data 329 for adjusting a playback characteristic value of media played back by second electronic subsystem 20. For example, shared adjustment playback control data 329 may be generated at least partially based on some combination of the volume of second played back audio media 221 sensed by microphone 114 at location L1 of user U and first electronic subsystem 10 after the transition (e.g., second sensed playback characteristic value data 327) and the volume of second played back audio media 221 sensed by microphone 214 at location L2 of second electronic subsystem 20 after the transition (e.g., second sensed playback characteristic value data 427).

Relationship playback control data 321 that is indicative of a known orientation between subsystems 10 and 20 of system 1 (e.g., as described above with respect to FIGS. 3A and 3B) may be taken into account by media transition module 306 when determining shared initial playback control data 315 and/or shared adjustment playback control data 329. This may enable a consistent user experience for user U during the media playback transition. For example, shared adjustment playback control data 329 may be at least partially based on such orientational relationship playback control data 321 so that the volume playback characteristic value of adjusted third played back audio media 223 may take into account how sensor 114 may sense the volume of second played back audio media 221. For example, this may enable media transition module 306 to take into account whether the directionality of sensor 114 is facing towards or away from the directionality of media playback component 212 when sensor 114 may have sensed the volume playback characteristic value of second played back audio media 221 (e.g., that sensed volume value would necessarily be louder if the directionalities were facing towards one another rather than away from one another). By taking into account the one or more relationships between the sensors and playback components of system 1 (e.g., distances, orientations, responses, etc.) when generating shared initial playback control data 315 and/or shared adjustment playback control data 329 may allow for system 1 to provide a more consistent user experience for user U when the playback of media is transitioned from first electronic subsystem 10 to second electronic subsystem 20.

In some embodiments, system 1 may instruct user U to maintain a particular sensor in a particular fashion (e.g., orientation or distance) with respect to a particular media playback component in order to more precisely transition the playback of media with a consistent user experience. For example, I/O component 111 of first electronic device 100 may instruct user U to maintain sensor 114 at a constant distance from media playback component 212 for a particular duration of time (e.g., during at least a portion of the process of transitioning media playback from first subsystem 10 to second subsystem 20), such that the calculation of shared initial playback control data 315 and/or shared adjustment playback control data 329 may not have to take into account the possibility of a varying distance between the two subsystems. As another example, I/O component 111 of first electronic device 100 may instruct user U to orient sensor 114 directly towards media playback component 212 and maintain that orientation for a particular duration of time (e.g., during the process of transitioning media playback from first subsystem 10 to second subsystem 20) such that the calculation of shared initial playback control data 315 and/or shared adjustment playback control data 329 may not have to take into account the possibility of varying orientations between the two subsystems.

After the initial media playback transition from first electronic subsystem 10 to second electronic subsystem 20, shared adjustment playback control data 329 may be used to at least partially adjust a current playback characteristic value of media played back by second electronic subsystem 20. For example, in some embodiments, after the initial media playback transition (e.g., after second played back media 221 is initially outputted by media playback component 212 in response to initial controlled media information 409 that may be at least partially based on shared initial playback control data 315), controlled media information 409 may be adjusted or otherwise updated by media playback module 402 at least partially based on shared adjustment playback control data 329. When shared adjustment playback control data 329 is received by media playback module 402, adjusted controlled media information 409 generated by media playback module 402 at least partially based on shared adjustment playback control data 329 may cause media playback component 212 to output adjusted third played back media 223 as adjusted played back media with a playback media characteristic at least partially dictated by shared adjustment playback control data 329. Adjusted third played back media 223 may then be sensed by second electronic subsystem 20 similarly to initial second played back media 221 for defining adjusted third sensed playback characteristic value data 431, which may then be similarly leveraged by information collection module 406 for updating second subsystem relationship data 325. Moreover, adjusted third played back media 223 may then be sensed by first electronic subsystem 10 similarly to initial second played back media 221 for defining adjusted third sensed playback characteristic value data 331, which may then be similarly leveraged by media transition module 306 for updating shared adjustment playback control data 329. Therefore, first electronic subsystem 10 may sense and iteratively and/or adaptively adjust a playback characteristic value of media played back by second electronic subsystem 20 after a transition.

In other embodiments, media transition module 306 may not transmit any shared adjustment playback control data 329 to second electronic subsystem 20. Instead, various other control data that may be generated internally by second electronic subsystem 20 and/or by server 70 may be used to dictate how second electronic subsystem 20 may adjust one or more playback characteristics of media being played back by second electronic subsystem 20 after the media playback transition. For example, inputted playback control data 407 from input component 210 of second electronic device 200 (e.g., a user's setting of a volume control knob 210 of second electronic device 200) or internal data sources of second electronic device 200 (e.g., predetermined control data stored in memory 204) may dictate how second electronic subsystem 20 adjusts one or more playback characteristics of media after the initial media playback transition.

Therefore, by generating shared initial playback control data 315 based on how first played back media 121 may be sensed by sensor 114 of first electronic subsystem 10 before a transition and/or based on a relationship between subsystems 10 and 20, and then by dictating how initial second played back media 221 may be played back by second electronic subsystem 20 initially after a transition based on such shared initial playback control data 315, system 1 may help provide a consistent user experience during the initial transition. Additionally or alternatively, by generating shared adjustment playback control data 329 based on how initial second played back media 221 may be sensed by sensor 114 of first electronic subsystem 10 after an initial transition and/or based on a relationship between subsystems 10 and 20, and then by dictating how adjusted third played back media 223 may be played back by second electronic subsystem 20 after the transition based on such shared adjustment playback control data 329, system 1 may help provide a consistent user experience during the transition.

System 1 may be configured in various other ways and may include various other combinations of various devices while still providing a consistent experience for a user of system 1 (e.g., user U proximate to first electronic subsystem 10) as the playback of media is switched from first electronic subsystem 10 to second electronic subsystem 20. For example, in some embodiments, first electronic subsystem 10 may include first electronic device 100 as well as a first accessory device, while second electronic system 20 may include second electronic device 200 as well as a second accessory device. In other embodiments, only one of first electronic subsystem 10 and second electronic subsystem 20 may include an accessory device. Yet in other embodiments, neither first electronic subsystem 10 nor second electronic subsystem 20 may include an accessory device.

In some embodiments, as shown in FIGS. 1-3, first electronic subsystem 10 may also include a first accessory device 180 and a communications set-up 155 through which first accessory device 180 and first electronic device 100 may communicate with one another within first electronic subsystem 10, while, alternatively or additionally, second electronic subsystem 20 may include a second accessory device 280 and a communications set-up 255 through which second accessory device 280 and second electronic device 200 may communicate with one another within second electronic subsystem 20. Either one or both of first accessory device 180 and second accessory device 280 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, boom box, modem, router, printer, or any combination thereof. Either one or both of first accessory device 180 and second accessory device 280 may be any portable, mobile, hand-held, or miniature electronic device that may be configured to playback media wherever a user travels. Alternatively, either one or both of first accessory device 180 and second accessory device 280 may not be portable at all, but may instead be generally stationary.

First accessory device 180 may be any suitable accessory device that may be used in conjunction with first electronic device 100 to enrich or enhance the capabilities of first electronic subsystem 10, including the capabilities of first electronic subsystem 10 on its own and independent of the capabilities of first electronic subsystem 10 when used in conjunction with second electronic subsystem 20 of system 1. For example, first accessory device 180 may include a set of headphones that may receive audio media from an audio line-out or audio signal transmitter of first electronic device 100 via communications set-up 155 and then output that received audio media as sound waves that may be heard by a user of first electronic subsystem 10. As another example, first accessory device 180 may additionally or alternatively include a display that may receive video media from a video line-out or video signal transmitter of first electronic device 100 via communications set-up 155 and then output that received video media as light waves that may be seen by a user of first electronic subsystem 10. As yet another example, first accessory device 180 may additionally or alternatively include a media sensor that may detect characteristic value data about certain played back media or ambient conditions in the environment of first electronic subsystem 10 and then transmit that detected characteristic value data to a data line-in or data signal receiver of first electronic device 100 via communications set-up 155. Similarly, second accessory device 280 may be any suitable accessory device that may be used in conjunction with second electronic device 200 to enrich or enhance the capabilities of second electronic subsystem 20 (e.g., a set of headphones or loudspeakers, a display, and/or a media sensor).

As shown in FIG. 1, for example, first accessory device 180 of first electronic subsystem 10 may include a processor 182, memory 184, power supply 188, input component 190, media playback component 192, sensor 194, and communications component 196. In some embodiments, input component 190 and media playback component 192 of first accessory device 180 may sometimes be a single I/O interface or I/O component 191. First accessory device 180 may also include a housing 181 and a bus 198 that may provide one or more wired or wireless communications links or paths for transferring data and/or power to, from, or between various other components of first accessory device 180. As also shown in FIG. 1, processor 182 may be used to run an application 183 that may include, but is not limited to, one or more operating system applications, firmware applications, media playback applications, media editing applications, or any other suitable applications. Application 183 may be accessed by processor 182 from any suitable source, such as from memory 184 (e.g., via bus 198), from first electronic device 100 or from a server of communications set-up 155 (e.g., via communications component 196), or from any other suitable source. In some embodiments, one or more components of first accessory device 180 may be combined or omitted. Moreover, first accessory device 180 may include other components not combined or included in FIG. 1 and/or several instances of the components shown in FIG. 1. For the sake of simplicity, only one of each of the components of first accessory device 180 is shown in FIG. 1.

Each one of housing 181, processor 182, application 183, memory 184, communications component 196, power supply 188, input component 190, I/O component 191, media playback component 192, sensor 194, and bus 198 of first accessory device 180 may be the same as or substantially similar to a respective one of housing 101, processor 102, application 103, memory 104, second communications component 116, power supply 108, input component 110, I/O component 111, media playback component 112, sensor 114, and bus 118 of first electronic device 100 and, therefore, may not be independently described in greater detail. While, in some embodiments, first electronic device 100 and first accessory device 180 may be the same or substantially similar devices, in other embodiments, first electronic device 100 may have one or more different and/or additional components that first accessory device 180 does not have, and vice versa.

In some embodiments, second communications component 116 of first electronic device 100 and communications component 196 of first accessory device 180 may communicate with one another directly, such as, for example, via a shared communications link 151 of communications set-up 155 that may include one or more wired and/or wireless communications links or paths for transferring any suitable data and/or power between first electronic device 100 and first accessory device 180 within first electronic subsystem 10. Alternatively or additionally, in some embodiments, communications set-up 155 of first electronic subsystem 10 may include a communications network 150, with which one or both of first electronic device 100 and first accessory device 180 may communicate (e.g., via respective communications links 161 and 171). Communications network 150 may include a server 170, which may be similar to server 70. Therefore, in some embodiments, communications set-up 155 may be substantially similar to communications set-up 55.

As also shown in FIG. 1, for example, second accessory device 280 of second electronic subsystem 20 may include a processor 282, memory 284, power supply 288, input component 290, media playback component 292, sensor 294, and communications component 296. In some embodiments, input component 290 and media playback component 292 of second accessory device 280 may sometimes be a single I/O interface or I/O component 291. Second accessory device 280 may also include a housing 281 and a bus 298 that may provide one or more wired or wireless communications links or paths for transferring data and/or power to, from, or between various other components of second accessory device 280. As also shown in FIG. 1, processor 282 may be used to run an application 283 that may include, but is not limited to, one or more operating system applications, firmware applications, media playback applications, media editing applications, or any other suitable applications. Application 283 may be accessed by processor 282 from any suitable source, such as from memory 284 (e.g., via bus 298), from second electronic device 200 or from a server of communications set-up 255 (e.g., via communications component 296), or from any other suitable source. In some embodiments, one or more components of second accessory device 280 may be combined or omitted. Moreover, second accessory device 280 may include other components not combined or included in FIG. 1 and/or several instances of the components shown in FIG. 1. For the sake of simplicity, only one of each of the components of second accessory device 280 is shown in FIG. 1.

Each one of housing 281, processor 282, application 283, memory 284, communications component 296, power supply 288, input component 290, I/O component 291, media playback component 292, sensor 294, and bus 298 of second accessory device 280 may be the same as or substantially similar to a respective one of housing 201, processor 202, application 203, memory 204, second communications component 216, power supply 208, input component 210, I/O component 211, media playback component 212, sensor 214, and bus 218 of second electronic device 200 and, therefore, may not be independently described in greater detail. While, in some embodiments, second electronic device 200 and second accessory device 280 may be the same or substantially similar devices, in other embodiments, second electronic device 200 may have one or more different and/or additional components that second accessory device 280 does not have, and vice versa.

In some embodiments, second communications component 216 of second electronic device 200 and communications component 296 of second accessory device 280 may communicate with one another directly, such as, for example, via a shared communications link 251 of communications set-up 255 that may include one or more wired and/or wireless communications links or paths for transferring any suitable data and/or power between second electronic device 200 and second accessory device 280 within second electronic subsystem 20. Alternatively or additionally, in some embodiments, communications set-up 255 of second electronic subsystem 20 may include a communications network 250, with which one or both of second electronic device 200 and second accessory device 280 may communicate (e.g., via respective communications links 261 and 271). Communications network 250 may include a server 270, which may be similar to server 70. Therefore, in some embodiments, communications set-up 255 may be substantially similar to communications set-up 55.

Each subsystem of system 1 may be configured in various ways and may include various combinations of various devices while still providing a consistent user experience when transitioning media playback between multiple electronic devices (e.g., while still providing a consistent experience for a user proximate to first electronic subsystem 10 as the playback of media is switched from first electronic subsystem 10 to second electronic subsystem 20). For example, in some embodiments, first electronic subsystem 10 may include first electronic device 100 and at least one accessory device (e.g., first accessory device 180), and second electronic subsystem 20 may include second electronic device 200 and at least one accessory device (e.g., second accessory device 280).

In such embodiments, first electronic subsystem 10 may include any suitable first electronic device 100 and any suitable first accessory device 180 that together may be configured to playback media and determine a first value of a playback characteristic of the media played back by first electronic subsystem 10 that may be detected in the environment of first electronic subsystem 10 at a first moment in time before a media playback transition. The combination of first electronic device 100 and first accessory device 180 may also be configured to share certain initial information with second electronic subsystem 20 for dictating an initial value of the playback characteristic for media initially played back by second electronic subsystem 20 at a second moment in time initially after the media playback transition. Moreover, the combination of first electronic device 100 and first accessory device 180 may also be configured to determine a second value of the playback characteristic of the media initially played back by second electronic subsystem 20 that may be detected in the environment of first electronic subsystem 10 at a third moment in time after the media playback transition, and then share certain adjustment information with second electronic subsystem 20 (e.g., based on the determined first and second values) for dictating an adjusted value of the playback characteristic for media played back by second electronic subsystem 20 at a fourth moment in time after the media playback transition. While, in such embodiments, the combination of second electronic device 200 and second accessory device 280 may be configured to initially playback media with a certain initial playback characteristic value based on the shared initial information and then adjust the playback characteristic value of the media played back by second electronic subsystem 20 based on the shared adjustment information. For example, in such embodiments, as shown in FIGS. 2 and 3, first electronic subsystem 10 may include at least one media playback component (e.g., media playback component 112 of first electronic device 100 and/or media playback component 192 of first accessory device 180), at least one media sensor (e.g., media sensor 114 of first electronic device 100 and/or media sensor 194 of first accessory device 180), and first communications component 106 that can share information via communications set-up 55 with first communications component 206 of second electronic subsystem 20, which may also include a media playback component (e.g., media playback component 212 of second electronic device 200 and/or media playback component 292 of second accessory device 280).

In some embodiments, rather than or in addition to utilizing media playback component 112 of first electronic device 100 to playback media before a transition, first electronic subsystem 10 may utilize media playback component 192 of first accessory device 180 to playback media before a transition. For example, in some embodiments, as shown in FIG. 2, first device control system 301 may at least partially dictate the value of one or more media playback characteristics of media being played back by media playback component 192 of first accessory device 180 before a media playback transition from first electronic subsystem 10 to second electronic subsystem 20. This may enable first electronic subsystem 10 to function when first electronic device 100 does not include its own media playback component (e.g., if first electronic device 100 does not include media playback component 112 capable of outputting media to user U on its own). For example, as shown in FIG. 3, first accessory device 180 may include at least one headphone media playback component 192 that may output media to user U, which may be desired if media playback component 112 of first electronic device 100 is not capable of outputting certain media to user U (e.g., if the media to be outputted by first electronic subsystem 10 is audio media but media playback component 112 of first electronic device 100 is only configured to output video media without accompanying audio).

With continued reference to FIG. 2, media playback module 302 of first device control system 301 may be configured to receive media for playback from one or more media sources, to receive playback control data from one or more control sources, and to process such received media and such received control data in order to provide controlled media information to media playback component 192 of first accessory device 180 for output to a user of system 1. As mentioned above, media playback module 302 may receive media for playback from various media sources, such as stored media 303 and/or first streamed media 305. Moreover, as mentioned above, media playback module 302 may receive playback control data from various control sources, such as inputted playback control data 307 and/or stored control data 319. Media playback module 302 may process the received media and the received playback control data to generate and transmit controlled media information to media playback component 192 for output to a user of first accessory device 180. For example, as shown, regardless of the source or type of media received by media playback module 302, and regardless of the source or type of playback control data received by media playback module 302, controlled media information 349 may be generated by media playback module 302 and transmitted to first accessory device 180 (e.g., via second communications component 116, communications set-up 155 and communications component 196).

As also shown in FIG. 2, first accessory device 180 may include a first accessory control system 381 that may optionally be used to at least partially dictate the value of one or more media playback characteristics of media being played back by media playback component 192 of first accessory device 180 before a media playback transition from first electronic subsystem 10 to second electronic subsystem 20. For example, first accessory control system 381 of first accessory device 180 may include a media playback module 382 that may be configured to receive controlled media information 349 from media playback module 302 of first electronic device 100. Moreover, media playback module 382 may be configured to receive playback control data from various control sources, such as inputted playback control data 347 from input component 190 of first accessory device 180 (e.g., inputted playback control data 347 may be determined by a user's interaction with a user interface of first accessory device 180, such as a user's pressing of a "volume up" button 190 of first accessory device 180). The received playback control data may be any suitable instructions for controlling the value of any suitable media playback characteristic, such as the volume level of played back audio media, the brightness or white point of played back video media, and/or the spectral content of the played back media. Media playback module 382 may process the received media and the received playback control data of controlled media information 349 along with any other received playback control data (e.g., inputted playback control data 347) to generate and transmit accessory controlled media information 359 to media playback component 192 for output to a user of first accessory device 180.

For example, as shown in FIG. 2, media playback module 382 of first accessory control system 381 may generate and transmit accessory controlled media information 359 to media playback component 192, and media playback component 192 may in turn output first played back accessory media 131, which may be experienced by a user of first accessory device 180 (e.g., a user may hear first played back accessory audio media 131 via a headphone media playback component 192 and/or a user may see first played back accessory video media 131 via a display media play back component 192). Media playback module 302 of first electronic device 100 may continuously update controlled media information 349 with different playback control data as new playback control data is received by media playback module 302, and/or media playback module 382 of first accessory device 180 may continuously update accessory controlled media information 359 with different playback control data as new playback control data is received by media playback module 382, such that the value of one or more playback characteristics of first played back accessory media 131 may be continuously changed during playback of media to a user using first accessory device 180 of first electronic subsystem 10.

As described above, at some point, system 1 may be configured to transition the playback of media from first electronic subsystem 10 to second electronic subsystem 20. So that the value of at least one playback characteristic of the media played back by first electronic subsystem 10 before the transition may be maintained for the media played back by second electronic subsystem 20 after the transition, first device control system 301 of first electronic device 100 may also be configured to determine the value of a media playback characteristic of first played back accessory media 131 before the transition, and then at least partially dictate the value of that media playback characteristic for media being played back by second electronic subsystem 20 after the transition (e.g., second played back media 221 being played back by media playback component 212 of second electronic device 200). This may provide for a consistent user experience for a user proximate to first electronic subsystem 10 within system 1 (e.g., user U that may be wearing first accessory device 180 within a space that may also include second electronic device 200 on table T, as shown in FIG. 3).

As mentioned, media transition module 306 of first device control system 301 may be configured to determine a first playback characteristic value of media played back by first electronic subsystem 10 before a media playback transition from first electronic subsystem 10 to second electronic subsystem 20. Media transition module 306 may also be configured to dictate an initial playback characteristic value of media played back by second electronic subsystem 20 after the media playback transition. Moreover, media transition module 306 may also be configured to determine a second playback characteristic value of media played back by second electronic subsystem 20 after the media playback transition and then dictate an adjustment to the playback characteristic value of the media played back by second electronic subsystem 20 based on the determined first and second playback characteristic values.

Media transition module 306 may determine a first playback characteristic value of media played back by first electronic subsystem 10 before a media playback transition from first electronic subsystem 10 to second electronic subsystem 20. For example, as shown, media transition module 306 may be configured to receive first accessory sensed playback characteristic value data 357 from sensor 194 of first accessory device 180 (e.g., via communications component 196, communications set-up 155, and second communications component 116). First accessory sensed playback characteristic value data 357 may be generated by sensor 194 based on the sensed value of a playback characteristic of first played back media 121 before a media playback transition. For example, sensor 194 may be a microphone configured to sense the volume of first played back audio media 121 and transmit first accessory sensed playback characteristic value data 357 indicative of that sensed volume to media transition module 306. As another example, sensor 194 may be a light sensor configured to sense the brightness or white point or any other suitable characteristic of first played back video media 121 and transmit first accessory sensed playback characteristic value data 357 indicative of that sensed brightness or white point or any other suitable characteristic to media transition module 306. This may be useful when first media played back by first electronic subsystem 10 before a media playback transition is outputted as first played back media 121 by media playback component 112 of first electronic device 100, but first electronic device 100 does not include a suitable sensor 114, such that first electronic subsystem 10 may rely on sensor 194 of first accessory device 180.

Even when media is played back by first accessory device 180, media transition module 306 may determine a first playback characteristic value of media played back by first electronic subsystem 10 before a media playback transition from first electronic subsystem 10 to second electronic subsystem 20. For example, as shown, media transition module 306 may be configured to receive first sensed accessory playback characteristic value data 341 from sensor 114 of first electronic device 100. First sensed accessory playback characteristic value data 341 may be generated by sensor 114 based on the sensed value of a playback characteristic of first played back accessory media 131 at first electronic device 100 before a media playback transition. For example, sensor 114 may be a microphone configured to sense the volume of first played back accessory audio media 131 and transmit first sensed accessory playback characteristic value data 341 indicative of that sensed volume to media transition module 306. As another example, sensor 114 may be a light sensor configured to sense the brightness or white point or any other suitable characteristic of first played back accessory video media 131 and transmit first sensed accessory playback characteristic value data 341 indicative of that sensed brightness or white point or any other suitable characteristic to media transition module 306.

Additionally or alternatively, as shown, media transition module 306 may be configured to receive first sensed accessory playback characteristic value data 351 from sensor 194 of first accessory device 180. First sensed accessory playback characteristic value data 351 may be generated by sensor 194 based on the sensed value of a playback characteristic of first played back accessory media 131 at first accessory device 180 before a media playback transition. For example, sensor 194 may be a microphone configured to sense the volume of first played back accessory audio media 131 and transmit first sensed accessory playback characteristic value data 351 indicative of that sensed volume to media transition module 306 (e.g., via communications component 196, communications set-up 155, and second communications component 116). As another example, sensor 194 may be a light sensor configured to sense the brightness or white point of first played back accessory video media 131 and transmit first sensed accessory playback characteristic value data 351 indicative of that sensed brightness or white point to media transition module 306 (e.g., via communications component 196, communications set-up 155, and second communications component 116).

Additionally or alternatively, media transition module 306 may be configured to receive first internal accessory playback characteristic value data 353 from within first accessory control system 381. For example, first internal accessory playback characteristic value data 353 may be internally generated by media playback module 382 of first accessory control system 381 based on a playback characteristic value of accessory controlled media information 359 before a media playback transition. Media playback module 382 may be configured to determine what a sensed playback characteristic value of accessory controlled media information 359 would be when outputted by media playback component 192 without requiring that value to be physically sensed by sensor 114 and/or by sensor 194 (e.g., media playback module 382 may leverage known accessory controlled media information 359 with known characteristics of media playback component 192 to internally determine a playback characteristic value of first played back accessory media 131 outputted by media playback component 192 of first accessory device 180, and thereby generate first internal accessory playback characteristic value data 353). First accessory control system 381 of first accessory device 180 may be configured to transmit first internal accessory playback characteristic value data 353 to media transition module 306 of first electronic device 100 (e.g., via communications component 196, communications set-up 155, and second communications component 116).

Media transition module 306 may be configured to determine at least a first playback characteristic value of first played back accessory media 131 played back by first electronic subsystem 10 at any suitable time (e.g., using first sensed accessory playback characteristic value data 341 received from device sensor 114 and/or using first sensed accessory playback characteristic value data 351 received from accessory sensor 194 and/or using first internal accessory playback characteristic value data 353 received from media playback module 382). Therefore, in response to first electronic subsystem 10 detecting a media playback transition initiation event from any suitable component of system 1, media transition module 306 may be configured to determine the most recent playback characteristic value of first played back media 121 and/or of first played back accessory media 131 as played back by first electronic subsystem 10 (e.g., based on the most recently received playback characteristic value data 311, 313, 341, 351, 353, and/or 357). Such playback characteristic value data may be configured to be generated and transmitted to media transition module 306 on a frequent basis so that the playback characteristic value data most recently received by media transition module 306 may be indicative of at least the first playback characteristic value of the current or most recently played back media 121/131 of first electronic subsystem 10.

Media transition module 306 may then be configured to generate and transmit shared initial playback control data 315 to second electronic subsystem 20 (e.g., using communications set-up 55 via first communications component 106) to dictate an initial playback characteristic value of media played back by second electronic subsystem 20 after the media playback transition (e.g., in response to first electronic subsystem 10 detecting a media playback transition initiation event from any suitable component of system 1). As mentioned, media transition module 306 may generate shared initial playback control data 315 at least partially based on one or more of first sensed playback characteristic value data 311, first internal playback characteristic value data 313, sensed ambient characteristic value data 317, stored playback control data 319, relationship playback control data 321, and any combination thereof. Alternatively or additionally, media transition module 306 may generate shared initial playback control data 315 at least partially based on a first playback characteristic value of first played back accessory media 131 played back by first electronic subsystem 10 (e.g., based on first sensed accessory playback characteristic value data 341 received from device sensor 114 and/or based on first sensed accessory playback characteristic value data 351 received from accessory sensor 194 and/or based on first internal accessory playback characteristic value data 353 received from media playback module 382). That is, shared initial playback control data 315 may be determined at least in part by the most recent playback characteristic value of first played back accessory media 131 played back by first accessory device 180 of first electronic subsystem 10 before the media playback transition, such that a playback characteristic value of second played back media that may be initially played back by second electronic subsystem 20 after the media playback transition may be at least partially dictated by (e.g., similar to) the value of that playback characteristic of first played back accessory media 131 played back by first accessory device 180 of first electronic subsystem 10 before the media playback transition. For example, media transition module 306 may be configured to generate shared initial playback control data 315 that may be utilized by second electronic subsystem 20 to output second played back media 221 with a playback characteristic value substantially equal to or otherwise related to a first playback characteristic value of first played back accessory media 131 played back by first accessory device 180 of first electronic subsystem 10 (e.g., based on received first sensed accessory playback characteristic value data 341 and/or received first sensed accessory playback characteristic value data 351 and/or received first internal accessory playback characteristic value data 353). This may help enable a consistent user experience for a user of system 1 experiencing a media playback transition from first media played back and/or sensed by first accessory device 180 of first electronic subsystem 10 to second media played back by second electronic subsystem 20.

Alternatively or additionally, media transition module 306 may generate shared initial playback control data 315 at least partially based on one or more characteristics of ambient condition A sensed within system 1 during the media playback transition. As shown in FIG. 2, for example, media transition module 306 may be configured to receive sensed ambient characteristic value data 367 from sensor 194 of first accessory device 180. Sensed ambient characteristic value data 367 may be generated by sensor 194 based on the sensed value of a characteristic of ambient condition A during a media playback transition. For example, sensor 194 may be a microphone configured to sense the volume of an audio component of ambient condition A (e.g., speech S from user U of FIG. 3) and transmit sensed ambient characteristic value data 367 indicative of that sensed volume to media transition module 306 (e.g., via communications set-up 155). As another example, sensor 194 may be a light sensor configured to sense the brightness or white point or any other suitable characteristic or other suitable characteristic of a light component of ambient condition A (e.g., a light source G of FIG. 3) and transmit sensed ambient characteristic value data 367 indicative of that sensed brightness or white point or any other suitable characteristic to media transition module 306 (e.g., via communications set-up 155).

Media transition module 306 may be configured to determine one or more characteristics of an ambient condition A at any suitable time (e.g., using received sensed ambient characteristic value data 317 and/or sensed ambient characteristic value data 367). For example, in response to first electronic subsystem 10 detecting a media playback transition initiation event from any suitable component of system 1, media transition module 306 may be configured to determine sensed ambient characteristic value data 367 just before second electronic subsystem 20 initiates media playback of second played back media 221 in accordance with the media playback transition. In some embodiments, media transition module 306 may be configured to determine sensed ambient characteristic value data 367 just after first electronic device 100 terminates media playback of first played back media 121 and/or 131 and just before second electronic device 20 initiates media playback of second played back media 221 in accordance with the media playback transition. This may enable system 1 to determine the ambient conditions in system 1 that exist during the media playback transition but that are not generated by a media playback component of system 1. Media transition module 306 may generate shared initial playback control data 315 at least partially based on sensed ambient characteristic value data 367 such that a playback characteristic value of second played back media 221 initially played back by second electronic subsystem 20 after the media playback transition may take into account any ambient conditions in system 1.

In some embodiments, media transition module 306 may generate shared initial playback control data 315 based on sensed ambient characteristic value data 367 during the transition as well as based on playback characteristic value data of first played back media 121 played back by first electronic subsystem 10 before the transition (e.g., based on playback characteristic value data 311 and/or 313 and/or 353 and/or 357). For example, media transition module 306 may generate shared initial playback control data 315 to be the aggregate of sensed ambient characteristic value data 367 and sensed playback characteristic value data 357 or the aggregate of sensed ambient characteristic value data 367 and playback characteristic value data 353. This may enable the initial playback characteristic value of second played back media 221 outputted by second electronic subsystem 20 after the transition to be equal to the sum of the playback characteristic value of first played back media 121 played back by first electronic subsystem 10 as determined by first accessory device 180 just before the transition and the characteristic value of ambient condition A as determined by first accessory device 180 during the transition.

Once second played back media 221 is initially outputted by second electronic subsystem 20 in response to shared initial playback control data 315 being received by media playback module 402 during a media playback transition, such second played back media 221 may be detected by first electronic subsystem 10 in order to determine whether any additional playback control data is needed to adjust the playback of media from second electronic subsystem 20. For example, media transition module 306 of first device control system 301 may sense at least one playback characteristic value of second played back media 221 outputted by second electronic subsystem 20 in response to shared initial playback control data 315 being received by media playback module 402 during a media playback transition. As mentioned, media transition module 306 may be configured to receive second sensed playback characteristic value data 327 from sensor 114 of first electronic device 100. Additionally or alternatively, as shown in FIG. 2, for example, media transition module 306 may be configured to receive second accessory sensed playback characteristic value data 369 from accessory sensor 194 of first accessory device 180. Second accessory sensed playback characteristic value data 369 may be generated by sensor 194 based on the sensed value of a playback characteristic of second played back media 221 initially outputted by media playback component 212 during a media playback transition in response to shared initial playback control data 315. For example, sensor 194 may be a microphone configured to sense the volume of second played back audio media 221 and transmit second accessory sensed playback characteristic value data 369 indicative of that sensed volume to media transition module 306 (e.g., via communications set-up 155). As another example, sensor 194 may be a light sensor configured to sense the brightness or white point or any other suitable characteristic of second played back video media 221 and transmit second accessory sensed playback characteristic value data 369 indicative of that sensed brightness or white point or any other suitable characteristic to media transition module 306 (e.g., via communications set-up 155).

Media transition module 306 may also be configured to generate shared adjustment playback control data 329 based on second sensed playback characteristic value data 327 and/or second accessory sensed playback characteristic value data 369 in combination with any additional data that may be available to media transition module 306. Therefore, media transition module 306 may generate shared adjustment playback control data 329 at least partially based on one or more of first sensed playback characteristic value data 311, first internal playback characteristic value data 313, sensed ambient characteristic value data 317, second sensed playback characteristic value data 327, stored playback control data 319, relationship playback control data 321, first accessory sensed playback characteristic value data 357, first internal accessory playback characteristic value data 353, sensed ambient accessory characteristic value data 367, second accessory sensed playback characteristic value data 369, and any combination thereof, where such relationship playback control data 321 may be at least partially based on second subsystem relationship data 325 from information collection control module 406, where such second subsystem relationship data 325 may be at least partially based on second sensed playback characteristic value data 427, second internal playback characteristic value data 413, and/or relationship playback control data 421. Such shared adjustment playback control data 329 may then be transmitted by media transition module 306 to second electronic subsystem 20 for adjusting at least one playback characteristic value of media being played back by second electronic subsystem 20 after the transition. Media transition module 306 may be configured to generate shared adjustment playback control data 329 based on second accessory sensed playback characteristic value data 369 in addition to or as an alternative to generating shared adjustment playback control data 329 based on second sensed playback characteristic value data 327 (e.g., when subsystem 10 only includes sensor 194 for sensing second played back media 221 as second accessory sensed playback characteristic value data 369).

Information collection module 406 may determine at least one playback characteristic value of second played back media 221 initially played back by second electronic subsystem 20 during a media playback transition from first electronic subsystem 10 to second electronic subsystem 20. For example, as shown, information collection module 406 may be configured to receive second accessory sensed playback characteristic value data 469 from accessory sensor 294 of second accessory device 280 second electronic subsystem 20 (e.g., via communications set-up 255). Second accessory sensed playback characteristic value data 469 may be generated by sensor 294 based on the sensed value of a playback characteristic of second played back media 221 initially outputted by media playback component 212 during a media playback transition in response to shared initial playback control data 315. For example, sensor 294 may be a microphone configured to sense the volume of second played back audio media 221 and transmit second accessory sensed playback characteristic value data 469 indicative of that sensed volume to information collection module 406 (e.g., via communications set-up 255). As another example, sensor 294 may be a light sensor configured to sense the brightness or white point or any other suitable characteristic of second played back video media 221 and transmit second accessory sensed playback characteristic value data 469 indicative of that sensed brightness or white point or any other suitable characteristic to information collection module 406 (e.g., via communications set-up 255).

Therefore, information collection module 406 may generate second subsystem relationship data 325 at least partially based on one or more of second sensed playback characteristic value data 427, second internal playback characteristic value data 413, relationship playback control data 421, second accessory sensed playback characteristic value data 469, and any combination thereof. This second subsystem relationship data 325 may then be transmitted by information collection module 406 to first electronic subsystem 10 for helping enable a consistent user experience for user U during the media playback transition (e.g., for at least partially dictating the generation of shared initial playback control data 315). In other embodiments, information collection module 406 may not transmit any second subsystem relationship data 325 to first electronic subsystem 10. Instead, various other control data that may be generated internally by first electronic subsystem 10 and/or by server 70 may be used to dictate how first electronic subsystem 10 may enable a consistent user experience for user U during the media playback transition from subsystem 10 to subsystem 20.

After the initial media playback transition from first electronic subsystem 10 to second electronic subsystem 20, shared adjustment playback control data 329 may be used to at least partially adjust a current playback characteristic value of media played back by second electronic subsystem 20. For example, in some embodiments, after the initial media playback transition (e.g., after second played back media 221 is initially outputted by media playback component 212 in response to initial controlled media information 409 that may be at least partially based on shared initial playback control data 315), controlled media information 409 may be adjusted or otherwise updated by media playback module 402 at least partially based on shared adjustment playback control data 329. When shared adjustment playback control data 329 is received by media playback module 402, adjusted controlled media information 409 generated by media playback module 402 at least partially based on shared adjustment playback control data 329 may cause media playback component 212 to output adjusted third played back media 223 as adjusted played back media with a playback media characteristic at least partially dictated by shared adjustment playback control data 329. Adjusted third played back media 223 may then be sensed by accessory sensor 294 of second accessory device 280 of second electronic subsystem 20 similarly to initial second played back media 221 for defining adjusted third accessory sensed playback characteristic value data 471, which may then be similarly leveraged by information collection module 406 (e.g., via communications set-up 255) for updating second subsystem relationship data 325. Additionally or alternatively, adjusted third played back media 223 may then be sensed by accessory sensor 194 of first accessory device 180 of first electronic subsystem 10 similarly to initial second played back media 221 for defining adjusted third accessory sensed playback characteristic value data 371, which may then be similarly leveraged by media transition module 306 (e.g., via communications set-up 155) for updating shared adjustment playback control data 329. Therefore, first electronic subsystem 10 may sense and iteratively and/or adaptively adjust a playback characteristic value of media played back by second electronic subsystem 20 after a transition.

In some embodiments, rather than or in addition to utilizing media playback component 212 of second electronic device 200 to playback media after a transition, second electronic subsystem 20 may utilize media playback component 292 of second accessory device 280 to playback media after a transition. For example, in some embodiments, as shown in FIG. 2, second device control system 401 of second electronic device 200 of second electronic subsystem 20 may at least partially dictate the value of one or more media playback characteristics of media being played back by media playback component 292 of second accessory device 280 after a media playback transition from first electronic subsystem 10 to second electronic subsystem 20 (e.g., based on shared initial playback control data 315 that may be received by first electronic subsystem 10). This may enable second electronic subsystem 20 to function when second electronic device 200 does not include its own media playback component (e.g., if second electronic device 200 does not include media playback component 212 capable of outputting media to user U on its own).

For example, as shown in FIG. 3, second accessory device 280 may include at least one speaker and/or display media playback component 292 that may output media to user U, which may be desired if media playback component 212 of second electronic device 200 is not capable of outputting certain media to user U. For example, in some embodiments, the media to be outputted by second electronic subsystem 20 may be audio media but media playback component 212 of second electronic device 200 may only configured to output video media without accompanying audio. Alternatively, in some embodiments, media playback component 212 may not be configured to output any media capable of being detected by user U. Instead, second electronic device 200 may be an AirPlay™ receiver, such as an AirPort Express™ made available by Apple Inc., that may include an audio output connector media playback component 212 that may not be able to output audible audio waves but that may only be able to communicate audio signals to a loudspeaker accessory device (e.g., second accessory device 280) that may be configured to convert those audio signals to audible audio waves that may be output to and heard by a user (e.g., via accessory media playback component 292). As another example, second electronic device 200 may be an AirPlay™ receiver, such as Apple TV™ made available by Apple Inc., that may include an audio/video output connector media playback component 212 that may not be able to output audible audio waves and visible video waves but that may only be able to communicate audio/video signals to a television accessory device (e.g., second accessory device 280) that may be configured to convert those audio/video signals to audible audio waves and visible video waves that may be output to and experienced by a user (e.g., via accessory media playback component 292). This may enable a consistent user experience for user U proximate to first electronic subsystem 10 within system 1 when the output of played back media is transitioned from first electronic subsystem 10 to second accessory device 280 of second electronic subsystem 20 (e.g., in addition to or as an alternative to when the output of played back media is transitioned from first electronic subsystem 10 to second electronic device 200 of second electronic subsystem 20).

As shown in FIG. 2, for example, media playback module 402 of second device control system 401 of second electronic device 200 may be configured to receive media for playback from one or more media sources, to receive playback control data from one or more control sources, and to process such received media and such received control data in order to provide controlled media information to media playback component 292 of second accessory device 280 for output to a user of system 1. As mentioned, media playback module 402 may receive media for playback from various media sources, such as stored media 403, second streamed media 405, and/or stream of stored media 303. Moreover, media playback module 402 may receive playback control data from various control sources, such as inputted playback control data 407, inputted playback control data from internal data sources of second electronic device 200 (e.g., predetermined control data stored in memory 204), and/or shared initial playback control data 315 for at least partially dictating an initial playback characteristic value of media played back by second electronic subsystem 20 in response to a media playback transition. The playback control data received by media playback module 402 may be any suitable instructions that can be utilized for controlling the value of any suitable media playback characteristic of media played back by second electronic subsystem 20, such as the volume level of played back audio media, the brightness or white point of played back video media, and/or the spectral content of the played back media.

Media playback module 402 may process the received media and the received playback control data to generate and transmit controlled media information to second accessory device 280 for output to a user of system 1 (e.g., user U). For example, as shown, controlled media information 449 may be generated by media playback module 402 based on the media and playback control data received by media playback module 402, and controlled media information 449 may be then be transmitted to second accessory device 280 (e.g., via second communications component 216, communications set-up 255 and communications component 296).

As also shown in FIG. 2, second accessory device 280 may include a second accessory control system 481 that may optionally be used to at least partially dictate the value of one or more media playback characteristics of media being played back by media playback component 292 of second accessory device 280 after a media playback transition from first electronic subsystem 10 to second electronic subsystem 20. For example, second accessory control system 481 of second accessory device 280 may include a media playback module 482 that may be configured to receive controlled media information 449 from media playback module 402 of second electronic device 200. Moreover, media playback module 482 may be configured to receive playback control data from various control sources, such as inputted playback control data 447 from input component 290 of second accessory device 280 (e.g., inputted playback control data 447 may be determined by a user's interaction with a user interface of second accessory device 280, such as a user's pressing of a "volume up" button 290 of second accessory device 280). The received playback control data may be any suitable instructions for controlling the value of any suitable media playback characteristic, such as the volume level of played back audio media, the brightness or white point of played back video media, and/or the spectral content of the played back media. Media playback module 482 may process the received media and the received playback control data of controlled media information 449 from second electronic device 200 along with any other received playback control data (e.g., inputted playback control data 447) to generate and transmit accessory controlled media information 459 to media playback component 292 for output to a user of second accessory device 280.

For example, as shown in FIG. 2, media playback module 482 of second accessory control system 481 may generate and transmit accessory controlled media information 459 to media playback component 292, and media playback component 292 may in turn output second played back accessory media 231 that may be initially played back by second electronic subsystem 20 after the media playback transition and that may be experienced by a user of first electronic subsystem 10 (e.g., user U may hear second played back accessory audio media 231 via a loud speaker media playback component 292 and/or user U may see second played back accessory video media 231 via a display media play back component 292). Media playback module 402 of second electronic device 200 may continuously update controlled media information 449 with different playback control data as new playback control data is received by media playback module 402, and/or media playback module 482 of second accessory device 280 may continuously update accessory controlled media information 459 with different playback control data as new playback control data is received by media playback module 482, such that the value of one or more playback characteristics of second played back accessory media 231 may be continuously changed during playback of media to a user of system 1.

During a media playback transition from first electronic subsystem 10 to second electronic subsystem 20, shared initial playback control data 315 may be used to at least partially dictate an initial playback characteristic value of second played back accessory media 231 outputted by second electronic subsystem 20. For example, in some embodiments, during such a media playback transition, controlled media information 449 may be generated by media playback module 402 based on shared initial playback control data 315 alone (e.g., not also based on control data 407). In other embodiments, during such a media playback transition, controlled media information 449 may be generated by media playback module 402 based on shared initial playback control data 315 in combination with one or more other types of received control data (e.g., control data 407). When shared initial playback control data 315 is received by media playback module 402, controlled media information 449 generated by media playback module 402 may cause media playback component 292 to output initial second played back accessory media 231 as initially played back media with a playback media characteristic at least partially dictated by shared initial playback control data 315.

As mentioned, information collection module 406 of second device control system 401 of second electronic device 200 may be configured to determine one or more types of information about second electronic subsystem 20 that may be utilized by system 1 during a media playback transition. For example, information collection module 406 may be configured to determine at least one playback characteristic value of media played back by second electronic subsystem 20. Moreover, information collection module 406 may be configured to collect certain relationship playback control data 421 that may be at least partially indicative of a relationship between first electronic subsystem 10 and second electronic subsystem 20. Based on some or all of the received data, information collection module 406 may generate and transmit second subsystem relationship data 325 to first electronic subsystem 10 (e.g., to relationship data source 310 of first electronic device 100 via communications set-up 55 and first communication components 106 and 206).

Information collection module 406 may determine at least one playback characteristic value of second played back accessory media 231 initially played back by second accessory device 280 during a media playback transition from first electronic subsystem 10 to second electronic subsystem 20. For example, as shown, information collection module 406 may be configured to receive second sensed accessory playback characteristic value data 443 from sensor 214 of second electronic device 200. Second sensed accessory playback characteristic value data 443 may be generated by sensor 214 based on the sensed value of a playback characteristic of second played back accessory media 231 initially outputted by media playback component 292 of second accessory device 280 during a media playback transition in response to shared initial playback control data 315. For example, sensor 214 may be a microphone configured to sense the volume of second played back accessory audio media 231 and transmit second sensed accessory playback characteristic value data 443 indicative of that sensed volume to information collection module 406. As another example, sensor 214 may be a light sensor configured to sense the brightness or white point or any other suitable characteristic of second played back accessory video media 231 and transmit second sensed accessory playback characteristic value data 443 indicative of that sensed brightness or white point or any other suitable characteristic to information collection module 406.

Additionally or alternatively, information collection module 406 may be configured to receive second sensed accessory playback characteristic value data 455 from sensor 294 of second accessory device 280. Second sensed accessory playback characteristic value data 455 may be generated by sensor 294 based on the sensed value of a playback characteristic of second played back accessory media 231 initially outputted by media playback component 292 of second accessory device 280 during a media playback transition in response to shared initial playback control data 315. For example, sensor 294 may be a microphone configured to sense the volume of second played back accessory audio media 231 and transmit second sensed accessory playback characteristic value data 455 indicative of that sensed volume to information collection module 406. As another example, sensor 294 may be a light sensor configured to sense the brightness or white point or any other suitable characteristic of second played back accessory video media 231 and transmit second sensed accessory playback characteristic value data 455 indicative of that sensed brightness or white point or any other suitable characteristic to information collection module 406.

Additionally or alternatively, information collection module 406 may be configured to receive second internal accessory playback characteristic value data 453 from within second accessory control system 481. For example, second internal accessory playback characteristic value data 453 may be internally generated by media playback module 482 of second accessory control system 481 based on a playback characteristic value of accessory controlled media information 459 initially generated during a media playback transition in response to shared initial playback control data 315. For example, media playback module 482 may be configured to determine what a sensed playback characteristic value of controlled media information 459 would be when outputted by media playback component 292 as second played back accessory media 231 without requiring that value to be physically sensed by sensor 294 (e.g., media playback module 482 may leverage known controlled media information 459 with known characteristics of media playback component 292 to internally determine a playback characteristic value of second played back accessory media 231 outputted by media playback component 292 and thereby generate second internal accessory playback characteristic value data 453).

Therefore, information collection module 406 may generate second subsystem relationship data 325 at least partially based on one or more of second sensed playback characteristic value data 427, second internal playback characteristic value data 413, relationship playback control data 421, second sensed accessory playback characteristic value data 443, second sensed accessory playback characteristic value data 455, second internal accessory playback characteristic value data 453, and any combination thereof. This second subsystem relationship data 325 may then be transmitted by information collection module 406 to first electronic subsystem 10 for helping enable a consistent user experience for user U during the media playback transition (e.g., for at least partially dictating the generation of shared initial playback control data 315).

Once second played back accessory media 231 is initially outputted by media playback component 292 of second accessory device 280 (e.g., rather than or in addition to second played back media 221 being initially outputted by media playback component 212 of second electronic device 200) in response to shared initial playback control data 315 being received by media playback module 402 during a media playback transition, such second played back accessory media 231 may be detected by first electronic subsystem 10 in order to determine whether any additional playback control data is needed to adjust the playback of media from second electronic subsystem 20. For example, media transition module 306 of first device control system 301 may sense at least one playback characteristic value of second played back accessory media 231 outputted by second electronic subsystem 20 in response to shared initial playback control data 315 being received by media playback module 402 during a media playback transition. As shown in FIG. 2, for example, media transition module 306 may be configured to receive second sensed accessory playback characteristic value data 343 from sensor 114 of first electronic device 100. Second sensed accessory playback characteristic value data 343 may be generated by sensor 114 based on the sensed value of a playback characteristic of second played back accessory media 231 initially outputted by media playback component 292 during a media playback transition in response to shared initial playback control data 315. For example, sensor 114 may be a microphone configured to sense the volume of second played back accessory audio media 231 and transmit second sensed accessory playback characteristic value data 343 indicative of that sensed volume to media transition module 306. As another example, sensor 114 may be a light sensor configured to sense the brightness or white point or any other suitable characteristic of second played back accessory video media 231 and transmit second sensed accessory playback characteristic value data 343 indicative of that sensed brightness or white point or any other suitable characteristic to media transition module 306.

Additionally or alternatively, media transition module 306 may be configured to receive second sensed accessory playback characteristic value data 355 from sensor 194 of first accessory device 180 (e.g., via communications component 196, communications set-up 155, and second communications component 116). Second sensed accessory playback characteristic value data 355 may be generated by sensor 194 based on the sensed value of a playback characteristic of second played back accessory media 231 initially outputted by media playback component 292 of second accessory device 280 during a media playback transition in response to shared initial playback control data 315. For example, sensor 194 may be a microphone configured to sense the volume of second played back accessory audio media 231 and transmit second sensed accessory playback characteristic value data 355 indicative of that sensed volume to media transition module 306. As another example, sensor 194 may be a light sensor configured to sense the brightness or white point or any other suitable characteristic of second played back accessory video media 231 and transmit second sensed accessory playback characteristic value data 355 indicative of that sensed brightness or white point or any other suitable characteristic to media transition module 306.

After the initial media playback transition from first electronic subsystem 10 to second electronic subsystem 20, shared adjustment playback control data 329 may be used to at least partially adjust a current playback characteristic value of media played back by second electronic subsystem 20. For example, in some embodiments, after the initial media playback transition (e.g., after second played back media 231 is initially outputted by accessory media playback component 292 in response to initial controlled media information 449 that may be at least partially based on shared initial playback control data 315), controlled media information 449 may be adjusted or otherwise updated by media playback module 402 at least partially based on shared adjustment playback control data 329. When shared adjustment playback control data 329 is received by media playback module 402, adjusted controlled media information 449 generated by media playback module 402 at least partially based on shared adjustment playback control data 329 may cause accessory media playback component 292 to output adjusted third played back media 233 as adjusted played back media with a playback media characteristic at least partially dictated by shared adjustment playback control data 329.

Adjusted third played back media 233 may then be sensed by sensor 214 of second electronic device 200 of second electronic subsystem 20 for defining adjusted third sensed accessory playback characteristic value data 445, which may then be leveraged by information collection module 406 for updating second subsystem relationship data 325. Additionally or alternatively, adjusted third played back media 233 may then be sensed by sensor 294 of second accessory device 280 of second electronic subsystem 20 for defining adjusted third sensed accessory playback characteristic value data 475, which may then be leveraged by information collection module 406 (e.g., via communications set-up 255) for updating second subsystem relationship data 325. Additionally or alternatively, adjusted third played back media 233 may then be sensed by sensor 114 of first electronic device 100 of first electronic subsystem 10 for defining adjusted third sensed accessory playback characteristic value data 345, which may then be leveraged by media transition module 306 for updating shared adjustment playback control data 329. Additionally or alternatively, adjusted third played back media 233 may then be sensed by sensor 194 of first accessory device 180 of first electronic subsystem 10 for defining adjusted third sensed accessory playback characteristic value data 375, which may then be leveraged by media transition module 306 (e.g., via communications set-up 155) for updating shared adjustment playback control data 329. Therefore, first electronic subsystem 10 may sense and iteratively and/or adaptively adjust a playback characteristic value of media played back by second electronic subsystem 20 after a transition.

In other embodiments, first electronic subsystem 10 may only include first electronic device 100 without any first accessory device 180, yet second electronic system 20 may include not only second electronic device 200 but also second accessory device 280. In such embodiments, first electronic device 100 may include any suitable device that may be configured to playback media, determine a first value of a characteristic of media played back by first electronic device 100 that may be detected in the environment of first electronic device 100, determine a second value of the characteristic of media played back by second electronic subsystem 20 that may be detected in the environment of first electronic device 100, and share certain information with second electronic subsystem 20 based on the determined first and second values, while second electronic device 200 may include any suitable device that may be configured to receive the shared information from first electronic device 100 but that may require second accessory device 280 in order for second electronic subsystem 20 to playback media and/or adjust the value of the characteristic of the media played back by second electronic subsystem 20 based on the shared information. For example, in such embodiments, first electronic device 100 may be an iPhone™ or any other suitable device having a media playback component 112, a media sensor 114, and first communications component 106 that can share information via communications set-up 55 with first communications component 206 of second electronic device 200, while second electronic device 200 may be a "limited smart" media playback device or residential gateway or any other suitable gateway or media receiver (e.g., an AirPort Express™, an AirPort Extreme™, or an Apple TV™ made available by Apple Inc.) having a first communications component 206 for receiving the shared information from first electronic device 100 and a second communications component 216 for communicating with second accessory device 280, but such a second electronic device 200 may not have or use a media playback component that actually outputs media to a user of system 1. In such embodiments, second electronic device 200 may be configured to instruct second accessory component 280 (e.g., via communications set-up 255) to playback media and adjust the value of the characteristic of the media played back by second accessory component 280 based on the shared information received by second electronic device 200 from first electronic device 100. Such a second accessory device 280 may be any media playback device, such as a stereo or television, having a media playback component 292 and communications component 296 (e.g., an audio and/or video line-in port).

Additionally or alternatively, in some embodiments, first electronic subsystem 10 may not only include first electronic device 100 but also first accessory device 180, while second electronic system 20 may include second electronic device 200 with or without second accessory device 280. In such embodiments, first accessory device 180 may include a media playback sensor 194 (e.g., when first electronic device 100 does not include or does not use a media playback sensor 114), such that media playback sensor 194 may be configured to determine a first value of a characteristic of media played back by first electronic subsystem 10 that may be detected in the environment of first electronic subsystem 10, determine a second value of the characteristic of media played back by second electronic subsystem 20 that may be detected in the environment of first electronic subsystem 10, and share these determined values with first electronic device 100 via communications set-up 155, while first electronic device 100 may be configured to share certain information based on the determined first and second values with second electronic subsystem 20 via communications set-up 55. For example, first accessory device 180 may be a microphone or light sensor that may be coupled via a wire to first electronic device 100, which may be an iPod Nano™ or any other suitable electronic device that does not have a built-in microphone or light sensor. Additionally or alternatively, in such embodiments, first accessory device 180 may include a media playback component 192 (e.g., when first electronic device 100 does not include or use a media playback component 112), such that media playback component 192 may be configured to playback media for first electronic subsystem 10. For example, first accessory device 180 may be headphones or a head mounted display that may be coupled to first electronic device 100, which may be an iPod Shuffle™ or any other suitable electronic device that does not have or use a built-in loud speaker or display.

Therefore, first electronic subsystem 10 of system 1 may include any suitable first electronic device 100 with or without any suitable first accessory device 180, and second electronic subsystem 20 of system 1 may include any suitable second electronic device 200 with or without any suitable second accessory device 280. By generating shared initial playback control data 315 based on how first played back media 121 and/or 131 played back by first electronic subsystem 10 may be sensed by a sensor of first electronic subsystem 10 before a transition and/or based on a relationship between subsystems 10 and 20, and then by dictating how initial second played back media 221 and/or 331 may be played back by second electronic subsystem 20 initially after a transition based on such shared initial playback control data 315, such a system 1 may help provide a consistent user experience during the initial transition. Additionally or alternatively, by generating shared adjustment playback control data 329 based on how initial second played back media 221 and/or 331 may be sensed by a sensor of first electronic subsystem 10 after an initial transition and/or based on a relationship between subsystems 10 and 20, and then by dictating how adjusted third played back media 223 and/or 233 may be played back by second electronic subsystem 20 after the transition based on such shared adjustment playback control data 329, such a system 1 may help provide a consistent user experience during the transition.

Figure 3C:
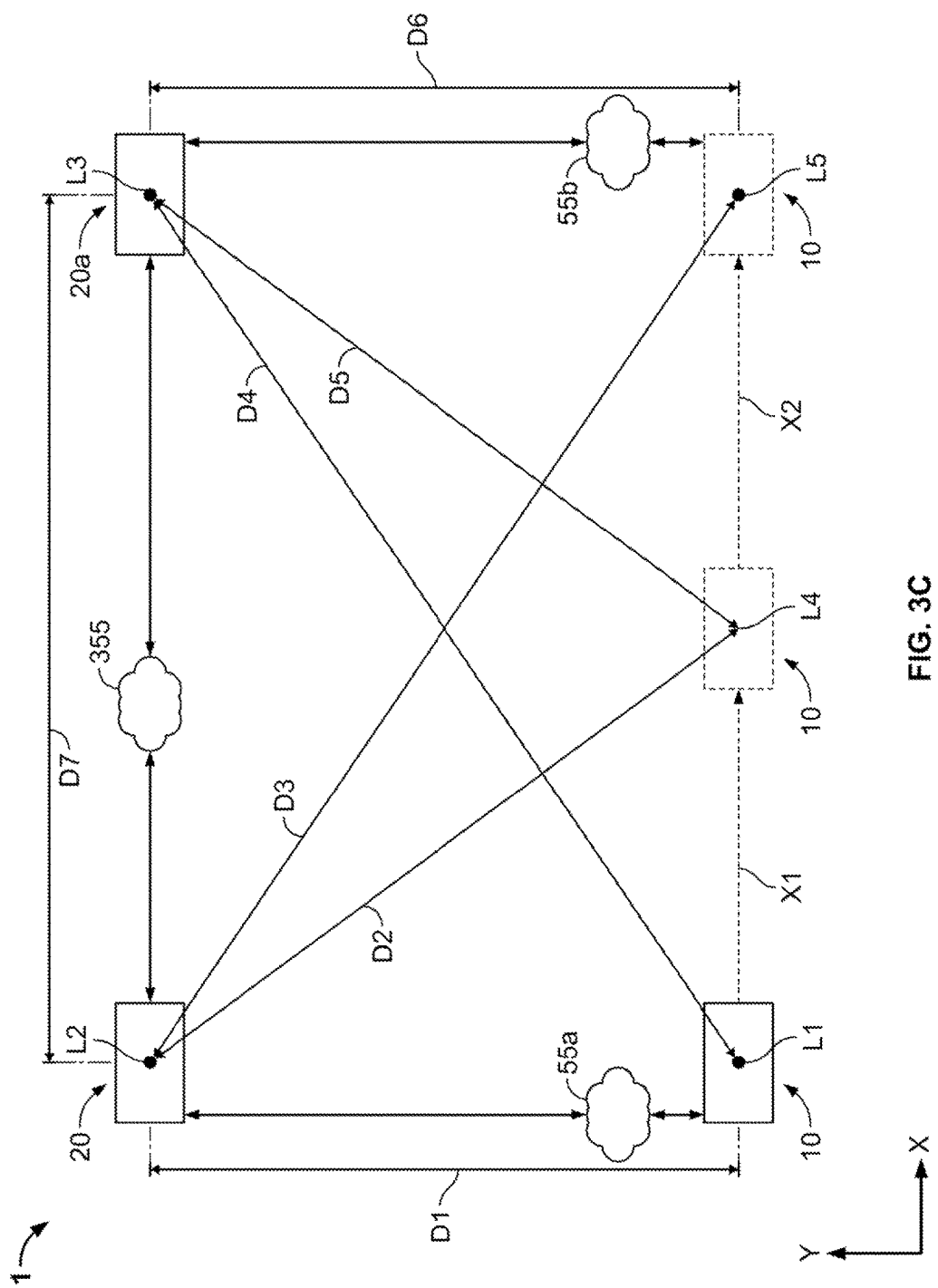
FIG. 3C is an overhead views of the system of FIGS. 1-3, taken from line IIIC-IIIC of FIG. 3, in accordance with some embodiments.

System 1 may also be configured in various other ways and may include various other combinations of various devices while still providing a consistent experience for a user of system 1 (e.g., user U proximate to first electronic subsystem 10) as the playback of media is switched from first electronic subsystem 10 to second electronic subsystem 20. For example, in some embodiments, as shown in FIG. 3C, system 1 may include first electronic subsystem 10 and not only original second electronic subsystem 20 but also another second electronic subsystem 20a. Other second electronic subsystem 20a may be any suitable electronic subsystem and may be substantially identical to original second electronic subsystem 20. However, as shown in FIG. 3C, original second electronic subsystem 20 and other second electronic subsystem 20a may be positioned at different locations from one another. For example, original second electronic subsystem 20 may be positioned at location L2, while other second electronic subsystem 20a may be positioned at location L3, and locations L2 and L3 may be separated by a distance D7.

When first electronic subsystem 10 moves (e.g., along with user U) from a first location to a second location within system 1, the playback of media may be at least partially transitioned from original second electronic subsystem 20 to other second electronic subsystem 20a. For example, as shown in FIG. 3C, first electronic subsystem 10 may be moved from an initial location L1 along arrow X1 to an intermediate location L4 and then along arrow X2 to a final location L5 within system 1. When at initial location L1, first electronic subsystem 10 may be a distance D1 from original second electronic subsystem 20 but also a distance D4 from other second electronic subsystem 20a. Moreover, when at intermediate location L4, first electronic subsystem 10 may be a distance D2 from original second electronic subsystem 20 but also a distance D5 from other second electronic subsystem 20a. Furthermore, when at final location L5, first electronic subsystem 10 may be a distance D3 from original second electronic subsystem 20 but also a distance D6 from other second electronic subsystem 20a. Due to these varying distances between first electronic subsystem 10 and each one of second electronic subsystems 20 and 20a, system 1 may be configured to provide a consistent experience for a user of system 1 (e.g., user U that may be holding first electronic subsystem 10) as the playback of media is switched from first electronic subsystem 10 to original second electronic subsystem 20 and then to other second electronic subsystem 20a.

For example, once the playback of media has been switched from first electronic subsystem 10 at location L1 to original second electronic subsystem 20 at location L2 (e.g., as described above with respect to FIGS. 1-3B), first electronic subsystem 10 may be moved from initial location L1 towards final location L5. During this movement, the distance between first electronic subsystem 10 and original second electronic subsystem 20 may change (e.g., from distance D1 to D2). As this distance changes, so may change distance relationship playback control data 321 that may be provided to media transition module 306 (e.g., as described above with respect to distance D of FIG. 3), and, therefore so may change shared adjustment playback control data 329 that may control an adjustment of adjusted third sensed playback characteristic value data 331 for adjusting a playback characteristic value of media played back by second electronic subsystem 20. In some embodiments, system 1 may have one or more limits that may prevent a playback characteristic value of media played back by second electronic subsystem 20 from going beyond a certain cut-off value. For example, as the distance between first electronic subsystem 10 and second electronic subsystem 20 increases, a volume playback characteristic value of media played back by second electronic subsystem 20 may also be increased in order to maintain a consistent user experience of the played back media. However, system 1 may be configured such that a volume playback characteristic value of media played back by second electronic subsystem 20 may only be increased up to a certain cut-off volume so that a media playback component (e.g., a loud speaker media playback component 212) of second electronic subsystem 20 does not burst or break or otherwise damage itself. In such embodiments, in order to maintain the consistent user experience of the played back media, system 1 may be configured to at least partially transition the playback of media from original second electronic subsystem 20 to other second electronic subsystem 20a.

Original second electronic subsystem 20 may be configured to communicate directly with other second electronic subsystem 20a via a communications set-up 355, which may be similar to either communications set-up 55, 155, and/or 255. Additionally or alternatively, original second electronic subsystem 20 may be configured to communicate with other second electronic subsystem 20a via first electronic subsystem 10 (e.g., via communications set-up 55a between subsystems 10 and 20, and via communications set-up 55b between subsystems 10 and 20a). In any of such embodiments, the distance between subsystem 10 and each one of subsystems 20 and 20a may be known by all subsystems of system 1. As a particular playback characteristic value (e.g., volume) of media played back by second electronic subsystem 20 approaches a certain cut-off value, system 1 may be configured to identify at least one additional second electronic subsystem (e.g., other second electronic subsystem 20a) that may be utilized by system 1 to playback media for user U. Additionally or alternatively, as a particular relationship value (e.g., distance) between first electronic subsystem 10 and other second electronic subsystem 20a approaches a certain threshold value (e.g., as subsystem 10 is moved to within at least a certain distance of other second electronic subsystem 20a), system 1 may be configured to at least partially utilize that other second electronic subsystem 20a to playback media for user U. Either reaching a certain cut-off value of a playback characteristic value of original second electronic subsystem 20 and/or reaching a certain threshold value of a relationship value between first electronic subsystem 10 and other second electronic subsystem 20a may be collectively referred to herein as a subsystem transition event. In response to detecting a subsystem transition event, system 1 may be configured to achieve the initial playback and/or adjust the further playback of media by other second electronic subsystem 20a similarly to the initial playback and/or further playback of media by original second electronic subsystem 20 (e.g., as described above with respect to FIGS. 1-3B).

Therefore, in response to detecting a subsystem transition event, system 1 may be configured to adjust a playback characteristic value of media played back by original second electronic subsystem 20 in conjunction with adjustments to that playback characteristic value of media played back by other second electronic subsystem 20a, such that the combined playback characteristic value of the media played back by each one of second electronic subsystems 20 and 20a as sensed by first electronic subsystem 10 may be consistent as first electronic subsystem 10 may move (e.g., from initial location L1, to intermediate location L4, and then to final location L5). This may be useful when user U carries first electronic subsystem 10 from a first room containing original second electronic subsystem 20 to a second room containing other second electronic subsystem 20a, such that the playback of media may be at least partially transition from being played back by original second electronic subsystem 20 to being played back by other second electronic subsystem 20a while maintaining a consistent user experience for user U (e.g., while maintaining a constant volume playback characteristic value of the played back media as experienced by user U at first electronic subsystem 10). This may be useful in any situation where a user may want a consistent user experience when the playback of media is transitioned from a first subsystem to a second subsystem due to the user's movement within a system (e.g., movement from one location to another within a grocery store or an amusement park or anywhere else that may have multiple subsystems configured to playback media to a moving user). In other embodiments, rather than at least partially transitioning media playback between second subsystems 20 and 20a due to a subsystem transition event based on a change in a distance relationship between first electronic subsystem 10 and original second electronic subsystem 20, media playback may be transitioned between second subsystems 20 and 20a due to a subsystem transition event based on a change in any other suitable relationship characteristic, such as orientation or frequency response, between first electronic subsystem 10 and original second electronic subsystem 20.

Although system 1 is only shown to include two electronic subsystems in FIGS. 1-3B, it is to be understood that system 1 may include three or more electronic subsystems as shown in FIG. 3C, each of which may communicate with one another directly or indirectly. The network architecture of system 1 may be configured in many suitable ways. For example, in some embodiments, when data is transmitted from a particular electronic subsystem, that particular electronic subsystem may broadcast the data to all of the other synched electronic subsystems within system 1 that it may be in communication with (e.g., system 1 may be decentralized). In another embodiment, when data is transmitted from a particular electronic subsystem, that particular electronic subsystem may share the data to a particular "master" electronic subsystem within system 1, and that master electronic subsystem may then share the received data with any other synched electronic subsystems within system 1. Such a configuration may reduce the number of communication channels between electronic subsystems and bandwidth in the system but may increase the latency.

Figure 4:
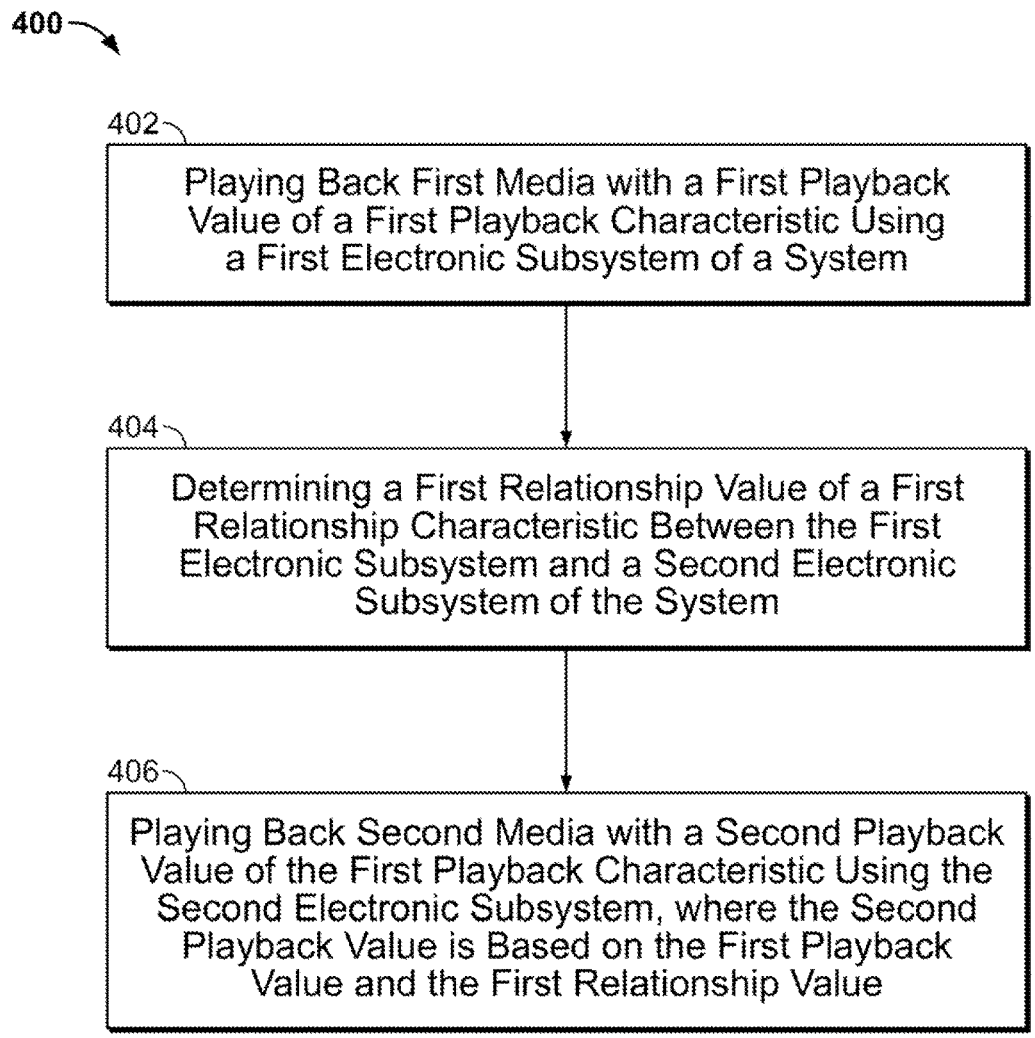
FIGS. 4-7 are flowcharts of illustrative processes for transitioning media playback between multiple electronic devices, in accordance with various embodiments.

FIG. 4 is a flowchart of an illustrative process 400 for transitioning the playback of media. Process 400 may begin at step 402 by playing back first media with a first playback value of a first playback characteristic using a first electronic subsystem of a system. For example, as described above with respect to FIGS. 1-3B, first electronic subsystem 10 of system 1 may be configured to playback first played back media 121 and/or first played back accessory media 131 with a first playback value of a first playback characteristic (e.g., a first volume value or a first brightness value). Next, at step 404, process 400 may include determining a first relationship value of a first relationship characteristic between the first electronic subsystem and a second electronic subsystem of the system. For example, as described above, system 1 (e.g., media transition module 306) may be configured to determine a distance value or an orientation value or a frequency response value between first electronic subsystem 10 and second electronic subsystem 20 of system 1 (e.g., using relationship playback control data 321). Then, at step 406, process 400 may include playing back second media with a second playback value of the first playback characteristic using the second electronic subsystem, where the second playback value is based on the first playback value and the first relationship value. For example, as described above, second electronic subsystem 20 may playback second media with a second playback value of the first playback characteristic based on shared initial playback control data 315, where shared initial playback control data 315 may be based on relationship playback control data 321 and the first playback value (e.g., first sensed playback characteristic value data 311, first accessory sensed playback characteristic value data 357, first internal playback characteristic value data 313, first internal accessory playback characteristic value data 353, first sensed accessory playback characteristic value data 341, and/or first sensed accessory playback characteristic value data 351).

In some embodiments, the first relationship characteristic determined at step 404 may include one of a distance and an orientation between the first electronic subsystem and the second electronic subsystem. In some embodiments, the first playback characteristic may include one of a volume, a brightness, a white point, and a spectral content. In some embodiments, process 400 may also include sensing a third playback value of the first playback characteristic of the second media using the first electronic subsystem when the second media is being played back by the second electronic subsystem, comparing the first playback value and the sensed third playback value, and then, after the comparing, adjusting the playback value of the first playback characteristic of the second media using the second electronic subsystem when the second media is being played back by the second electronic subsystem, where the adjusting is based on the comparing. Alternatively, process 400 may also include sensing a third playback value of the first playback characteristic of the second media using the first electronic subsystem when the second media is being played back by the second electronic subsystem, comparing the first playback value and the sensed third playback value, and then, after the comparing, adjusting the playback value of the first playback characteristic of the second media using the second electronic subsystem when the second media is being played back by the second electronic subsystem, where the adjusting is based on the comparing and the first relationship value.

It is to be understood that the steps shown in process 400 of FIG. 4 is merely illustrative and that existing steps may be modified or omitted, additional steps may be added, and the order of certain steps may be altered.

Figure 5:
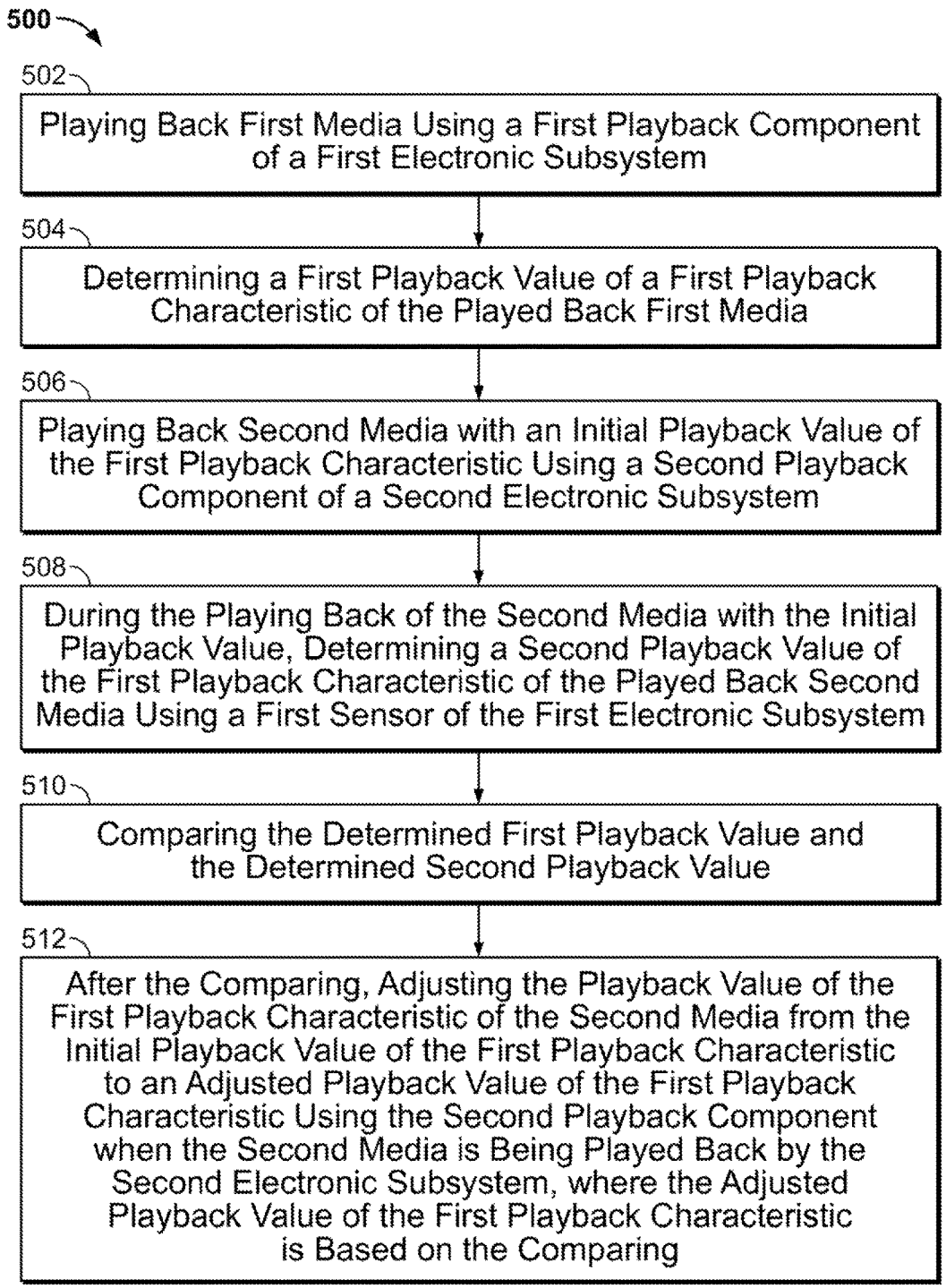

FIG. 5 is a flowchart of an illustrative process 500 for transitioning the playback of media. Process 500 may begin at step 502 by playing back first media using a first playback component of a first electronic subsystem. For example, as described above with respect to FIGS. 1-3B, first electronic subsystem 10 of system 1 may be configured to playback first played back media 121 and/or first played back accessory media 131. Next, at step 504, process 500 may include determining a first playback value of a first playback characteristic of the played back first media. For example, as described above, system 1 may determine the first playback value with first sensed playback characteristic value data 311, first accessory sensed playback characteristic value data 357, first internal playback characteristic value data 313, first internal accessory playback characteristic value data 353, first sensed accessory playback characteristic value data 341, and/or first sensed accessory playback characteristic value data 351.

Next, at step 506, process 500 may include playing back second media with an initial playback value of the first playback characteristic using a second playback component of a second electronic subsystem. For example, as described above, system 1 may include using shared initial playback control data 315 to dictate an initial playback value of the first playback characteristic of second played back audio media 221 and/or second played back accessory media 231 by second electronic subsystem 20. Then, during the playing back of the second media with the initial playback value at step 506, process 500 may also include step 508 that may determine a second playback value of the first playback characteristic of the played back second media using a first sensor of the first electronic subsystem. For example, as described above, first electronic subsystem 10 may determine a second playback value of the first playback characteristic of the played back second media using second sensed playback characteristic value data 327, second accessory sensed playback characteristic value data 369, second sensed accessory playback characteristic value data 343, second sensed accessory playback characteristic value data 355, second sensed playback characteristic value data 427, second accessory sensed playback characteristic value data 469, second internal playback characteristic value data 413, second internal accessory playback characteristic value data 453, second sensed accessory playback characteristic value data 443, and/or second sensed accessory playback characteristic value data 455).

Next, at step 510, process 500 may include comparing the determined first playback value and the determined second playback value. For example, as described above, system 1 may include comparing the first playback value and the second playback value to generate shared adjustment playback control data 329. Then, after the comparing of step 510, process 500 may include step 512 that may include adjusting the playback value of the first playback characteristic of the second media from the initial playback value of the first playback characteristic to an adjusted playback value of the first playback characteristic using the second playback component when the second media is being played back by the second electronic subsystem, where the adjusted playback value of the first playback characteristic is based on the comparing. For example, as described above, shared adjustment playback control data 329 may adjust the playback value of the first playback characteristic of the second media from the initial playback value of the first playback characteristic to an adjusted playback value of the first playback characteristic using media playback component 212 and/or media playback component 292 when the second media is being played back by second electronic subsystem 20 as adjusted third played back media 223 and/or adjusted third played back media 233.

In some embodiments, the first playback characteristic of process 500 may include one of a volume, a brightness, a white point, and a spectral content. Prior to the playing back the second media with the initial playback value of the first playback characteristic of step 506, process 500 may also include determining a first relationship value of a first relationship characteristic between the first electronic subsystem and the second electronic subsystem, and the initial playback value of the first playback characteristic may be based on at least one of the first playback value and the first relationship value. In such embodiments, the first relationship characteristic may include one of a distance and an orientation between the first electronic subsystem and the second electronic subsystem. In some embodiments, the determining the first playback value of the first playback characteristic of step 504 may include using the first sensor. Alternatively, the determining the first playback value of the first playback characteristic of step 504 may not include using the first sensor. In yet other embodiments, the determining the first playback value of the first playback characteristic of step 504 may include using a calendar application of the first electronic subsystem.

In some particular embodiments, process 500 may also include, after step 502 but before step 506, determining an ambient value of the first playback characteristic, where the adjusted playback value of the first playback characteristic may be based on the determined ambient value and the comparing of step 510. In yet other embodiments, process 500 may also include detecting an occurrence of a subsystem transition event and, in response to the detection of the occurrence, playing back third media with a third playback value of the first playback characteristic using a third playback component of a third electronic subsystem. In such embodiments, the occurrence of the subsystem transition event may include at least one of the adjusted playback value of the first playback characteristic reaching a cut-off value and a relationship value between the first electronic subsystem and the third electronic subsystem reaching a threshold value.

It is to be understood that the steps shown in process 500 of FIG. 5 is merely illustrative and that existing steps may be modified or omitted, additional steps may be added, and the order of certain steps may be altered.

Figure 6:
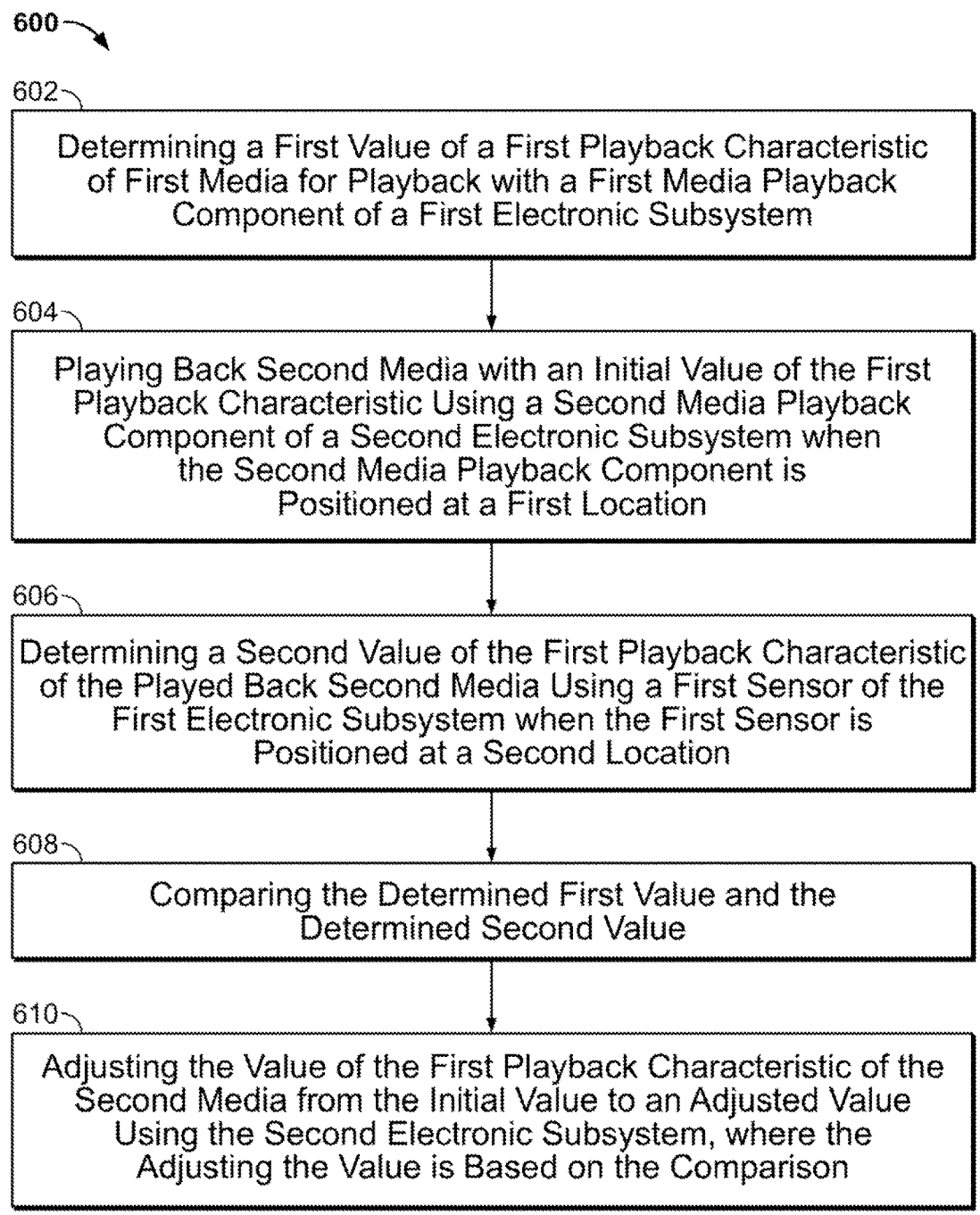

FIG. 6 is a flowchart of an illustrative process 600 for transitioning the playback of media. Process 600 may begin at step 602 by determining a first value of a first playback characteristic of first media for playback with a first media playback component of a first electronic subsystem. For example, as described above with respect to FIGS. 1-3B, system 1 may determine the first playback value with first sensed playback characteristic value data 311, first accessory sensed playback characteristic value data 357, first internal playback characteristic value data 313, first internal accessory playback characteristic value data 353, first sensed accessory playback characteristic value data 341, and/or first sensed accessory playback characteristic value data 351. Next, at step 604, process 600 may include playing back second media with an initial value of the first playback characteristic using a second media playback component of a second electronic subsystem when the second media playback component is positioned at a first location. For example, as described above, system 1 may include an initial playback value of the first playback characteristic of second played back audio media 221 and/or of second played back accessory media 231 as played back by second electronic subsystem 20 at location L2. Then, at step 606, process 600 may also include determining a second value of the first playback characteristic of the played back second media using a first sensor of the first electronic subsystem when the first sensor is positioned at a second location. For example, as described above, sensor 114 and/or sensor 194 of first electronic subsystem 10 at location L1 may determine a second value of the first playback characteristic of second played back media 221 and/or second played back accessory media 231.

Next, at step 608, process 600 may include comparing the determined first value and the determined second value. For example, as described above, system 1 may include comparing the first playback value and the second playback value to generate shared adjustment playback control data 329. Then, after the comparing of step 608, process 600 may include step 610 that may include adjusting the value of the first playback characteristic of the second media from the initial value to an adjusted value using the second electronic subsystem, where the adjusting the value is based on the comparison. For example, as described above, shared adjustment playback control data 329 may adjust the playback value of the first playback characteristic of the second media from the initial playback value of the first playback characteristic to an adjusted playback value of the first playback characteristic using media playback component 212 and/or media playback component 292 when the second media is being played back by second electronic subsystem 20 as adjusted third played back media 223 and/or adjusted third played back media 233.

In some embodiments, process 600 may also include determining a distance between the first location and the second location, where the adjusting the value may include adjusting the value based on the comparison and based on the determined distance. In other embodiments, process 600 may include determining an orientation of the first sensor with respect to the second media playback component when the first sensor is positioned at the second location and when the second media playback component is positioned at the first location, where the adjusting the value may include adjusting the value based on the comparison and based on the determined orientation. In yet other embodiments, process 600 may also include determining a distance between the first location and the second location and determining an orientation of the first sensor with respect to the second media playback component when the first sensor is positioned at the second location and when the second media playback component is positioned at the first location, where the adjusting the value may include adjusting the value based on the comparison, the determined distance, and the determined orientation. In still yet other embodiments, before step 606, process 600 may also include instructing a user to maintain the first sensor in a particular fashion with respect to the second media playback component.

In some embodiments, prior to the playing back the second media of step 604, process 600 may also include playing back the first media with the first media playback component, where the playing back the first media may include streaming the first media from a server with the first media playback component and the playing back the second media may include streaming the second media from the server with the second media playback component. In some other embodiments, prior to the playing back the second media of step 604, process 600 may also include playing back the first media with the first media playback component, where the playing back the first media may include playing back the first media from a local memory of the first electronic subsystem with the first media playback component and the playing back the second media may include streaming the second media from the local memory of the first electronic subsystem with the second media playback component. In still yet other embodiments, prior to the playing back the second media of step 604, process 600 may also include playing back the first media with the first media playback component, where the playing back the first media may include playing back the first media from a first local memory of the first electronic subsystem with the first media playback component and the playing back the second media may include playing back the second media from a second local memory of the second electronic subsystem with the second media playback component.

In some embodiments, after the adjusting of step 610, process 600 may also include determining a third value of the first playback characteristic of the played back second media using the first sensor when the first sensor is positioned at the second location, where the adjusting may ensure that the determined first value is equal to the determined third value. In other embodiments, before playing back the second media at step 604, process 600 may also include determining an ambient value of the first playback characteristic, where the adjusting the value of the first playback characteristic of the second media of step 610 may be based on the comparison and the determined ambient value.

It is to be understood that the steps shown in process 600 of FIG. 6 is merely illustrative and that existing steps may be modified or omitted, additional steps may be added, and the order of certain steps may be altered.

Figure 7:
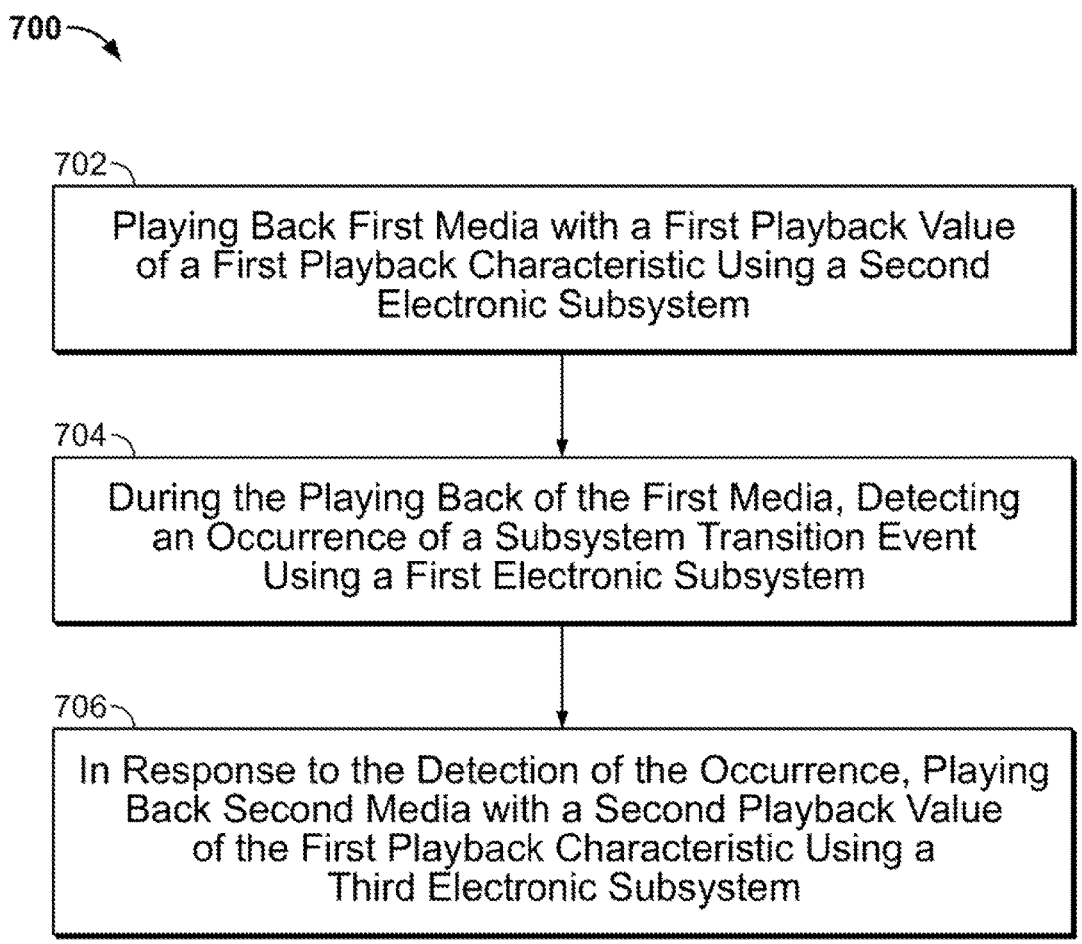

FIG. 7 is a flowchart of an illustrative process 700 for transitioning the playback of media. Process 700 may begin at step 702 by playing back first media with a first playback value of a first playback characteristic using a second electronic subsystem. For example, as described above with respect to FIGS. 1-3C, original second electronic subsystem 20 may playback media 221 and/or media 231 with a first playback value of a first playback characteristic. Then, during the playing back of the first media at step 702, process 700 may also include detecting an occurrence of a subsystem transition event using a first electronic subsystem at step 704. For example, as described above, first electronic subsystem 10 of system 1 may be configured to detect an occurrence of a subsystem transition event (e.g., when a certain cut-off value of a playback characteristic value of output media 121/131 of original second electronic subsystem 20 is reached and/or when a certain threshold value of a relationship value between first electronic subsystem 10 and other second electronic subsystem 20a is reached). Then, in response to the detection of the occurrence at step 704, process 700 may also include playing back second media with a second playback value of the first playback characteristic using the third electronic subsystem. For example, as described above, in response to the detection of an occurrence of a subsystem transition event, media 121, 131, 221, and/or 231 may be played back by other second electronic subsystem 20a with a second playback value of the first playback characteristic.

In some embodiments, the occurrence of the subsystem transition event of process 700 may include the first playback value reaching a cut-off value. In such embodiments, the first playback characteristic may include a volume and the cut-off value may include an upper threshold or a lower threshold of a volume output level of the second electronic subsystem. In other embodiments, the occurrence of the subsystem transition event of process 700 may include a relationship value between the first electronic subsystem and the third electronic subsystem reaching a threshold value. In such embodiments, the relationship value may include one of a distance and an orientation between the first electronic subsystem and the third electronic subsystem.

It is to be understood that the steps shown in process 700 of FIG. 7 is merely illustrative and that existing steps may be modified or omitted, additional steps may be added, and the order of certain steps may be altered.

Moreover, the processes described with respect to FIGS. 1-7, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104, memory 184, memory 204, memory 284, server 70, server 170, and/or server 270 of FIG. 1). The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol (e.g., the computer-readable medium may be communicated to first electronic subsystem 10 via communications circuitry 106 from server 70 and/or second electronic subsystem 20. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of first device control system 301, first accessory control system 381, second device control system 401, and second accessory control system 481 may be provided as a software construct, firmware construct, one or more hardware components, or a combination thereof. For example, any one or more of first device control system 301, first accessory control system 381, second device control system 401, and second accessory control system 481 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of first device control system 301, first accessory control system 381, second device control system 401, and second accessory control system 481 are merely illustrative, and that the number, configuration, functionality, and interconnection of existing modules may be modified or omitted, additional modules may be added, and the interconnection of certain modules may be altered.

At least a portion of one or more of the modules of any one or more of first device control system 301, first accessory control system 381, second device control system 401, and second accessory control system 481 may be stored in or otherwise accessible to first electronic subsystem 10 and/or second electronic subsystem 20 in any suitable manner (e.g., in memory 104 of device 100, in memory 184 of device 180, in memory 204 of device 200, in memory 284 of device 280, in server 70, in server 170, and/or in server 270). Any or each module of any one or more of first device control system 301, first accessory control system 381, second device control system 401, and second accessory control system 481 may be implemented using any suitable technologies (e.g., as one or more integrated circuit devices), and different modules may or may not be identical in structure, capabilities, and operation. Any or all of the modules or other components of any one or more of first device control system 301, first accessory control system 381, second device control system 401, and second accessory control system 481 may be mounted on an expansion card, mounted directly on a system motherboard, or integrated into a system chipset component (e.g., into a "north bridge" chip). Any one or more of first device control system 301, first accessory control system 381, second device control system 401, and second accessory control system 481 may include any amount of dedicated media playback memory, may include no dedicated media playback memory and may rely on device memory or network memory (e.g., memory of server 70), or may use any combination thereof.

Any one or more of first device control system 301, first accessory control system 381, second device control system 401, and second accessory control system 481 may be a dedicated system implemented using one or more expansion cards adapted for various bus standards. For example, all of the modules of a system may be mounted on different interconnected expansion cards or all of the modules of a system may be mounted on one expansion card. With respect to first device control system 301, by way of example only, the modules of system 301 may interface with a motherboard or processor 102 of device 100 through an expansion slot (e.g., a peripheral component interconnect ("PCI") slot or a PCI express slot). Alternatively, system 301 need not be removable but may include one or more dedicated modules that may include memory (e.g., RAM) dedicated to the utilization of the module. In other embodiments, system 301 may be a system integrated into device 100. For example, a module of system 301 may utilize a portion of device memory 104 of device 100. One or more of the modules of first device control system 301 may include its own processing circuitry and/or memory. Alternatively each module of first device control system 301 may share processing circuitry and/or memory with any other module of first device control system 301 and/or processor 102 and/or memory 104 of device 100. Similar configurations may be provided for second device control system 401 with respect to device 200, for first accessory control system 381 with respect to device 380, and/or for second accessory control system 481 with respect to device 480.

One or more Application Programming Interfaces ("APIs") may be used in some embodiments (e.g., with respect to first device control system 301, first accessory control system 381, second device control system 401, second accessory control system 481, or any other suitable module or any other suitable portion of any suitable module of first device control system 301, first accessory control system 381, second device control system 401, and/or second accessory control system 481 of FIGS. 1-3C). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may define the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Figure 8:
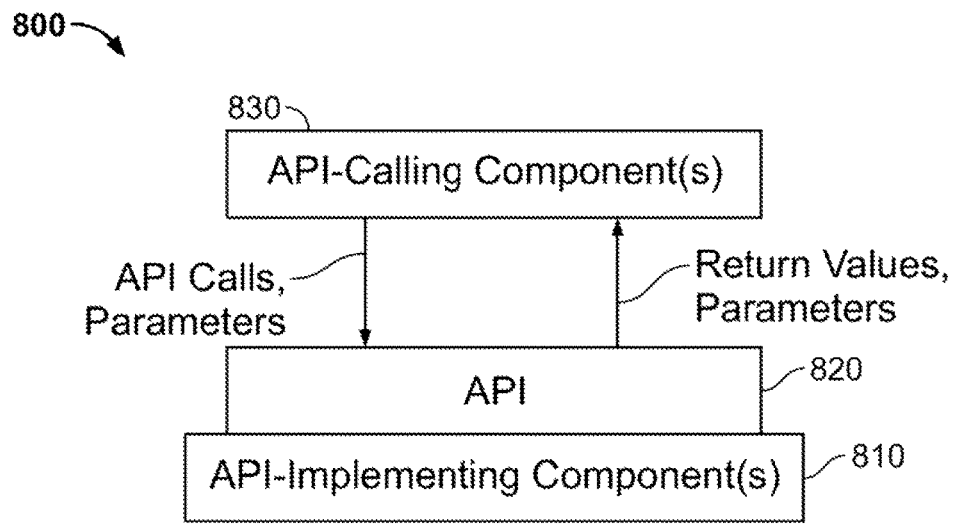
FIG. 8 is a block diagram of an illustrative application programming interface ("API") architecture, in accordance with some embodiments.

FIG. 8 is a block diagram illustrating an exemplary API architecture 800, which may be used in some embodiments of the invention. As shown in FIG. 8, the API architecture 800 may include an API-implementing component 810 (e.g., an operating system, a library, a device driver, an API, an application program, software, or other module) that may implements an API 820. API 820 may specify one or more functions, methods, classes, objects, protocols, data structures, formats, and/or other features of API-implementing component 810 that may be used by an API-calling component 830. API 820 can specify at least one calling convention that may specify how a function in API-implementing component 810 may receive parameters from API-calling component 830 and how the function may return a result to API-calling component 830. API-calling component 830 (e.g., an operating system, a library, a device driver, an API, an application program, software, or other module), may make API calls through API 820 to access and use the features of API-implementing component 810 that may be specified by API 820. API-implementing component 810 may return a value through API 820 to API-calling component 830 in response to an API call.

It is to be appreciated that API-implementing component 810 may include additional functions, methods, classes, data structures, and/or other features that may not be specified through API 820 and that may not be available to API-calling component 830. It is to be understood that API-calling component 830 may be on the same system as API-implementing component 810 or may be located remotely and may access API-implementing component 810 using API 820 over a network. While FIG. 8 illustrates a single API-calling component 830 interacting with API 820, it is to be understood that other API-calling components, which may be written in different languages than, or the same language as, API-calling component 830, may use API 820.

API-implementing component 810, API 820, and API-calling component 830 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104, memory 184, memory 204, memory 284, server 70, server 170, and/or server 270 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106 from server 70 and/or electronic device 200 of FIG. 1). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 9:
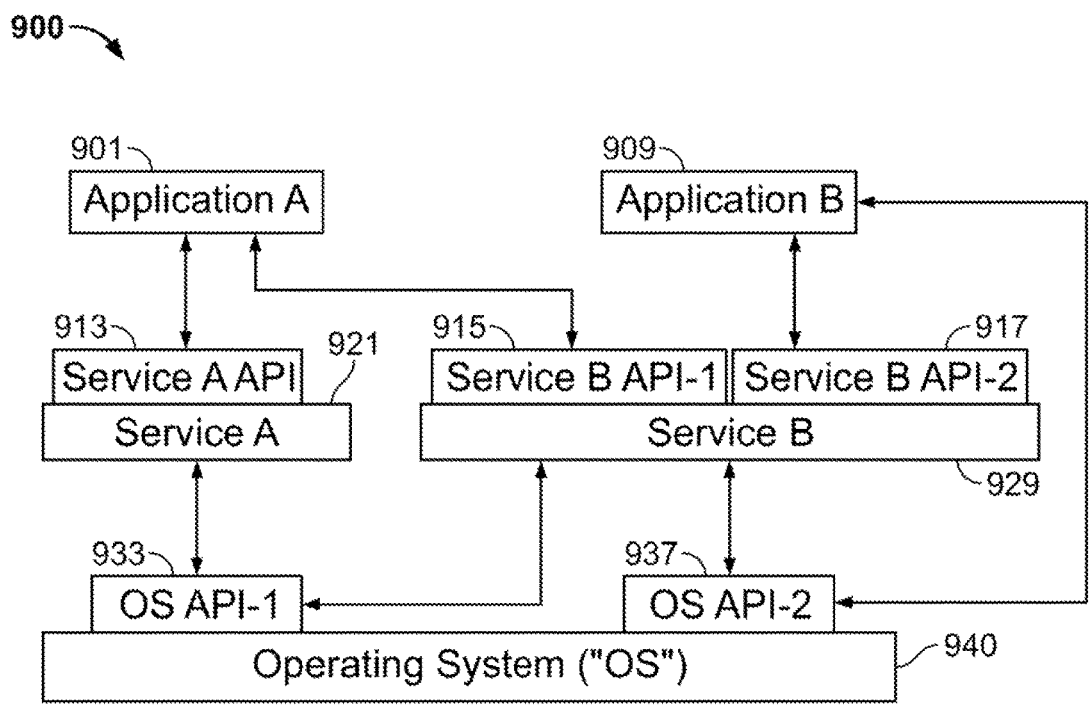
FIG. 9 is a block diagram of an illustrative API software stack, in accordance with some embodiments.

FIG. 9 is a block diagram illustrating an exemplary software stack 900, which may be used in some embodiments of the invention. As shown in FIG. 9, Application A 901 and Application B 909 can make calls to Service A 921 or Service B 929 using several Service APIs (e.g., Service APIs 913, 915, and 917) and to Operating System ("OS") 940 using several OS APIs (e.g., OS APIs 933 and 937). Service A 921 and Service B 929 can make calls to OS 940 using several OS APIs (e.g., OS APIs 933 and 937).

For example, as shown in FIG. 9, Service B 929 may include two APIs, one of which (i.e., Service B API-1 915) may receive calls from and return values to Application A 901 and the other of which (i.e., Service B API-2 917) may receive calls from and return values to Application B 909. Service A 921, which can be, for example, a software library, may make calls to and receive returned values from OS API-1 933, and Service B 929, which can be, for example, a software library, may make calls to and receive returned values from both OS API-1 933 and OS API-2 937. Application B 909 may make calls to and receive returned values from OS API-2 937.

While there have been described systems, methods, and computer-readable media for transitioning media playback between multiple electronic devices, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:
1. An electronic system comprising:
a sensor;
a processor;
a memory; and
a media playback component, wherein the memory comprises computer readable code which, when executed by the processor, causes the system to:
playback media, at a first moment in time and by the media playback component, with a first playback value of a playback characteristic, wherein the play- back characteristic comprises at least one of the following: volume level, spectral content, brightness level, or white point;

determine, at a second moment in time after the first moment in time, a relationship value of a relationship characteristic between the electronic system and a second electronic system, wherein the relationship characteristic comprises position information for the electronic system in relation to the second electronic system;

transition, at a third moment in time after the second moment in time, playback of the media to the second electronic system, wherein the transition comprises stopping the playback of the media by the media playback component and starting playback of the media by the second electronic system;

receive, at a fourth moment in time after the transition and from the sensor of the electronic system, a second playback value of the playback characteristic of the media, the sensor sensing the second playback value during playback of the media by the second electronic system after the transition;

generate an adjustment instruction based on the relationship value and a comparison of the first playback value and the second playback value; and transmit the adjustment instruction to the second electronic system, the adjustment instruction dictating an adjusted value of the playback characteristic for the media played back by the second electronic system at a fifth moment in time after the transition.

2. The system of claim 1, wherein the position information comprises one or more of:
a distance between the system and the second electronic system; and
an orientation between the system and the second electronic system.

3. The system of claim 1, wherein the relationship value is determined during playback of the media with the first playback value by the media playback component of the system.

4. The system of claim 1, wherein the computer readable code, when executed by the processor, further causes the system to:
determine, before the transition, an ambient value of the environment associated with the system, wherein the adjustment instruction is further based on the determined ambient value.

5. A method, comprising:
playing back media, at a first moment in time and by a media playback component of a first electronic system, with a first playback value of a playback characteristic, wherein the playback characteristic comprises at least one of the following: volume level, spectral content, brightness level, or white point;
determining, at a second moment in time after the first moment in time, a relationship value of a relationship characteristic between the first electronic system and a second electronic system, wherein the relationship characteristic comprises position information for the first electronic system in relation to the second electronic system;
transitioning, at a third moment in time after the second moment in time, playback of the media to the second electronic system, wherein the transition comprises stopping the playback of the media by the media playback component of the first electronic system and starting playback of the media by a media playback component of the second electronic system;
receiving, at a fourth moment in time after the transition and from a sensor of the first electronic system, a second playback value of the playback characteristic of the media, the sensor sensing the second playback value during playback of the media by the media playback component of the second electronic system after the transition;
generating an adjustment instruction that is based, at least in part, on the relationship value and a comparison of the first playback value and the second playback value; and
transmitting the adjustment instruction to the second electronic system, the adjustment instruction dictating an adjusted value of the playback characteristic for the media played back by the second electronic system at a fifth moment in time after the transition.

6. The method of claim 5, wherein the position information comprises one or more of:
a distance between the first and second electronic systems; and
an orientation between the first and second electronic systems.

7. The method of claim 5, wherein the relationship value is determined, at least partially, during playback of the media with the first playback value by the media playback component of the first electronic system.

8. The method of claim 5, further comprising:
determining, before the transition, an ambient value of the environment associated with the first electronic system, wherein the adjustment instruction is further based on the determined ambient value.

9. A non-transitory computer readable medium storing data comprising instructions, the instructions executable by one or more processors to cause the one or more processors to:
cause, at a first moment in time, a media playback component of a first electronic system to playback media with a first playback value of a playback characteristic, wherein the playback characteristic comprises at least one of the following: volume level, spectral content, brightness level, or white point;
determine, at a second moment in time after the first moment in time, a relationship value of a relationship characteristic between the first electronic system and a second electronic system, wherein the relationship characteristic comprises position information for the first electronic system in relation to the second electronic system;
cause, at a third moment in time after the second moment in time, the first electronic system to transition playback of the media to the second electronic system, wherein the transition comprises stopping the playback of the media by the media playback component of the first electronic system and starting playback of the media by a media playback component of the second electronic system;
receive, at a fourth moment in time after the transition and from a sensor of the first electronic system, a second playback value of the playback characteristic of the media, the sensor sensing the second playback value during playback of the media by the media playback component of the second electronic system after the transition;

generate an adjustment instruction that is based, at least in part, on the relationship value and a comparison of the first playback value and the second playback value; and transmit the adjustment instruction to the second electronic system, the adjustment instruction dictating an adjusted value of the playback characteristic for the media played back by the second electronic system at a fifth moment in time after the transition.

10. The non-transitory computer readable medium of claim 9, wherein the position information comprises one or more of:

a distance between the first electronic system and the second electronic system; and an orientation between the first electronic system and the second electronic system.

11. The non-transitory computer readable medium of claim 9, wherein the relationship value is determined, at least partially, during playback of the media with the first playback value by the media playback component of the first electronic system.

12. The non-transitory computer readable medium of claim 9, wherein the instructions, when executed by the one or more processors, further cause the one or more processors to:

determine, before the transition, an ambient value of the environment associated with the first electronic system, wherein the adjustment instruction is further based on the determined ambient value.

13. An electronic system, comprising:

a processor;

a memory; and a media playback component, wherein the memory comprises computer readable code which, when executed by the processor, causes the system to:

playback, by the media playback component, media at a first moment in time using a first playback value of a playback characteristic of the media in response to the playback of the media being transitioned to the electronic system from a second electronic system at a second moment in time that is earlier than the first moment in time, wherein the playback characteristic comprises at least one of the following: volume level, spectral content, brightness level, or white point, and wherein the transition comprises stopping the playback of the media by a media playback component of the second electronic system and starting playback of the media by the media playback component of the electronic system;

receive, by the system, an adjustment instruction at a third moment in time after the transition and during the playback of the media by the media playback component of the electronic system, the adjustment instruction being generated based, at least in part, on a relationship value of a relationship characteristic between the electronic system and the second electronic system and on a comparison of the first playback value of the playback characteristic and a second playback value of the playback characteristic that is associated with the second electronic system, wherein the relationship characteristic comprises position information for the electronic system in relation to the second electronic system; and adjust, during the playback of the media, the first playback value of the playback characteristic based on the adjustment instruction, wherein the adjustment instruction dictates an adjusted value of the playback characteristic for the media played back by the media playback component of the electronic system at a fourth moment in time after the transition.

14. The system of claim 13, wherein the position information comprises one or more of:

a distance between the system and the second electronic system.

15. The system of claim 13, wherein the position information comprises an orientation between the system and the second electronic system.

16. The system of claim 13, wherein the first playback value of the playback characteristic is sensed by a sensor of the second electronic system after the transition.

17. The system of claim 16, wherein the first playback value is sensed based, at least in part, on instructing a user to maintain the sensor in a particular fashion with respect to the media playback component.

18. The system of claim 16, wherein the first playback value of the playback characteristic is sensed by the sensor after the transition.

19. A method, comprising:

playing back, by a media playback component of a first electronic system, media at a first moment in time using a first playback value of a playback characteristic of the media in response to the playback of the media being transitioned to the first electronic system from a second electronic system at a second moment in time that is earlier than the first moment in time, wherein the playback characteristic comprises at least one of the following: volume level, spectral content, brightness level, or white point, and wherein the transition comprises stopping the playback of the media by a media playback component of the second electronic system and starting playback of the media by the media playback component of the first electronic system;

receiving, by the first electronic system, an adjustment instruction at a third moment in time after the transition and during the playback of the media by the media playback component of the first electronic system, the adjustment instruction being generated based, at least in part, on a relationship value of a relationship characteristic between the first and second electronic systems and on a comparison of the first playback value of the playback characteristic and a second playback value of the playback characteristic that is associated with the second electronic system, wherein the relationship characteristic comprises position information for the first electronic system in relation to the second electronic system; and adjusting, during the playback of the media, the first playback value of the playback characteristic based on the adjustment instruction, wherein the adjustment instruction dictates an adjusted value of the playback characteristic for the media played back by the media playback component of the first electronic system at a fourth moment in time after the transition.

20. The method of claim 19, wherein the position information comprises a distance between the media playback component and the second electronic system.

21. The method of claim 19, wherein the position information comprises an orientation between the first electronic system and the second electronic system.

22. The method of claim 19, wherein the first playback value of the playback characteristic is sensed by a sensor of the second electronic system.

23. The method of claim 22, wherein the first playback value is sensed based, at least in part, on instructing a user to maintain the sensor in a particular fashion with respect to the media playback component of the first electronic system.

24. The method of claim 22, wherein the first playback value of the playback characteristic is sensed by the sensor after the transition.

25. A non-transitory computer readable medium storing data comprising instructions, the instructions executable by one or more processors to cause the one or more processors to:
cause a media playback component of a first electronic system to playback media at a first moment in time using a first playback value of a playback characteristic of the media in response to the playback of the media being transitioned to the first electronic system from a second electronic system at a second moment in time that is earlier than the first moment, wherein the playback characteristic comprises at least one of the following: volume level, spectral content, brightness level, or white point, and wherein the transition comprises stopping the playback of the media by a media playback component of the second electronic system and starting playback of the media by the media playback component of the first electronic system;
receive an adjustment instruction at a third moment in time after the transition and during the playback of the media by the media playback component of the first electronic system, the adjustment instruction being generated based, at least in part, on a relationship value of a relationship characteristic between the first and second electronic systems and on a comparison of the first playback value of the playback characteristic and a second playback value of the playback characteristic that is associated with the second electronic system, wherein the relationship characteristic comprises position information for the first electronic system in relation to the second electronic system; and
adjust, during the playback of the media, the first playback value of the playback characteristic based on the adjustment instruction, wherein the adjustment instruction dictates an adjusted value of the playback characteristic for the media played back by the media playback component of the first electronic system at a fourth moment in time after the transition.

26. The non-transitory computer readable medium of claim 25, wherein the position information comprises a distance between the media playback component and the second electronic system.

27. The non-transitory computer readable medium of claim 25, wherein the position information comprises an orientation between the first electronic system and the second electronic system.

28. The non-transitory computer readable medium of claim 25, wherein the first playback value of the playback characteristic is sensed by a sensor of the second electronic system.

29. The non-transitory computer readable medium of claim 28, wherein the first playback value is sensed based, at least in part, on instructing a user to maintain the sensor in a particular fashion with respect to the media playback component of the first electronic system.

30. The non-transitory computer readable medium of claim 28, wherein the first playback value of the playback characteristic is sensed by the sensor after the transition.

* * * * *